US012586553B2

(12) United States Patent
Takeda et al.

(10) Patent No.: US 12,586,553 B2
(45) Date of Patent: Mar. 24, 2026

(54) INFORMATION PROCESSING METHOD AND ELECTRONIC MUSICAL INSTRUMENT

(71) Applicant: Roland Corporation, Shizuoka (JP)

(72) Inventors: Akihiro Takeda, Hamamatsu (JP); Takashi Akaike, Hamamatsu (JP)

(73) Assignee: Roland Corporation, Shizuoka (JP)

( * ) Notice: Subject to any disclaimer, the term of this patent is extended or adjusted under 35 U.S.C. 154(b) by 1112 days.

(21) Appl. No.: 17/625,770

(22) PCT Filed: Jul. 11, 2019

(86) PCT No.: PCT/JP2019/027616
    § 371 (c)(1),
    (2) Date: Jan. 9, 2022

(87) PCT Pub. No.: WO2021/005804
    PCT Pub. Date: Apr. 14, 2021

(65) Prior Publication Data
    US 2022/0277716 A1     Sep. 1, 2022

(51) Int. Cl.
    *G10H 1/00*      (2006.01)
    *H04B 5/24*      (2024.01)
    *H04W 12/06*     (2021.01)

(52) U.S. Cl.
    CPC ......... *G10H 1/0083* (2013.01); *G10H 1/0008* (2013.01); *H04W 12/06* (2013.01); (Continued)

(58) Field of Classification Search
    CPC .............. G10H 1/0083; G10H 1/0008; G10H 2220/101; G10H 2240/281; H04W 12/06
    See application file for complete search history.

(56) References Cited

U.S. PATENT DOCUMENTS 8,420,923  B1      4/2013   Choi et al.
2014/0181297  A1*  6/2014   Nakatsugawa ..... H04L 67/1097
                                                    709/224
2020/0111461  A1*  4/2020   Dron ...................... G10H 3/146

FOREIGN PATENT DOCUMENTS

AU      2014268283  A1 *  6/2015  ............. H04W 4/80
CN      1543638          11/2004
                (Continued)

OTHER PUBLICATIONS

"Search Report of Europe Counterpart Application", issued on Jan. 30, 2023, pp. 1-16.

(Continued)

*Primary Examiner* — Jianchun Qin
(74) *Attorney, Agent, or Firm* — JCIPRNET

(57) ABSTRACT

An electronic musical instrument includes a communication unit and a processing unit. The communication unit is capable of performing short-range wireless communication with a terminal. In a case where the terminal performs an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible, the processing unit performs a process of transmitting corresponding data when the reading request is received using the communication unit, and performs a process of writing the writing target data when the writing target data and the writing request for the writing target data are received via the communication unit.

31 Claims, 49 Drawing Sheets

(52) U.S. Cl.
CPC . *G10H 2220/101* (2013.01); *G10H 2240/281* (2013.01); *H04B 5/24* (2024.01)

(56) References Cited

FOREIGN PATENT DOCUMENTS

| CN | 101256821 | 9/2008 |
|----|-----------|--------|
| CN | 102314866 | 1/2012 |
| CN | 103258529 | 8/2013 |
| CN | 105229947 | 1/2016 |
| JP | 2002041054 | 2/2002 |
| JP | 2007256754 | 10/2007 |
| JP | 2011204042 | 10/2011 |
| JP | 2012088378 | 5/2012 |
| JP | 2015052209 | 3/2015 |
| JP | 2015052653 | 3/2015 |
| JP | 2017001394 | 1/2017 |

OTHER PUBLICATIONS

Hiroshi Sakai et al., "Protocol Enhancement for Near Field Communication (NFC): Future Direction and Cross-Layer Approach" , 2011 Third International Conference on Intelligent Networking and Collaborative Systems, Nov. 2011, pp. 605-610.

"Office Action of China Counterpart Application", issued on Dec. 7, 2024, with English translation thereof, p. 1-p. 13.

"International Search Report (Form PCT/ISA/210) of PCT/JP2019/027616,," mailed on Oct. 1, 2019, with English translation thereof, pp. 1-4.

"Office Action of China Counterpart Application", issued on Jul. 31, 2025, with English translation thereof, pp. 1-13.

* cited by examiner

| No. | Associ-ation no. | Type | Outline |
|---|---|---|---|
| 1 | - | Basic | Apparatus unique data is reflected in electronic musical instrument |
| 2 | - | Basic | Apparatus unique data of electronic musical instrument is received by terminal |
| 3 | - | Basic | Apparatus unique data of electronic musical instrument is received by terminal, edited by terminal side, and then reflected in electronic musical instrument |
| 4 | - | Basic | Apparatus unique data of electronic musical instrument is transmitted by terminal, edited by electronic musical instrument side, and then reflected in terminal side |
| 5 | 2 | Application | Display function is added to electronic musical instrument |
| 6 | 1 | Application | Operator function is added to electronic musical instrument |
| 7 | 1 | Application | Appearance state of electronic musical instrument is changed through operation from terminal |
| 8 | 2 | Application | Performance information of electronic musical instrument is transmitted to application of terminal and is used for musical score display function |
| 9 | 3 | Application | Apparatus unique data of electronic musical instrument is reflected through operation on terminal side |
| 10 | 2 | Application | Performance information of electronic musical instrument is transmitted to application of terminal, and terminal is used as sound source sound output function |
| 11 | 2 | Application | Performance information of electronic musical instrument is transmitted to application of terminal, and performance state is determined by application and is used as lesson function |
| 12 | 2 | Application | Apparatus information of electronic musical instrument is transmitted to application of terminal, and user is notified of firmware update information of electronic musical instrument |
| 13 | 2 | Application | Apparatus information and operation information of electronic musical instrument are transmitted to application of terminal and are used as operation guidance function |
| 14 | 2 | Application | Apparatus information and operation information of electronic musical instrument are transmitted to application of terminal, and instruction manual is displayed |
| 15 | 1 | Application | Specific function of electronic musical instrument can be used only in close proximity state and cannot be used in separate state by using authentication function of terminal |
| 16 | 1 | Application | Electronic musical instrument is remotely controlled by using communication function of terminal |
| 17 | 1 | Application | Time information of terminal is transmitted to electronic musical instrument, and function is used |
| 18 | 1 | Application | Acceleration, gyro, and geomagnetic sensor information of terminal are used, change information thereof is transmitted to electronic musical instrument, and function is used |
| 19 | 2 | Application | Camera function of terminal is executed according to operation on electronic musical instrument |
| 20 | 1 | Application | Position information obtained by GPS function of terminal is transmitted to electronic musical instrument and is used for contents operation for each destination |
| 21 | 1 | Application | Voice assistance function of terminal is used, result thereof is transmitted to electronic musical instrument, and function is used |
| 22 | 1 | Application | Electronic musical instrument is started by electromotive force from NFC transmission wave of terminal, and sound output process is performed |
| 23 | | Application | Information obtained from cloud service by using network function of terminal is transmitted to and received from electronic musical instrument, and function is used |

FIG.2

(A)
No.1
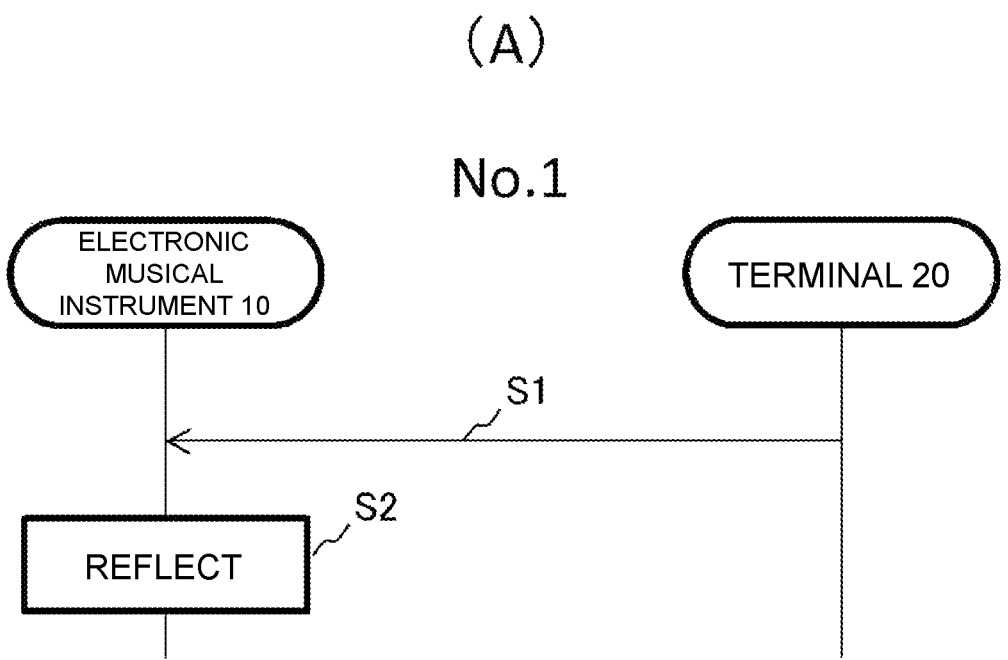
(B)
No.2
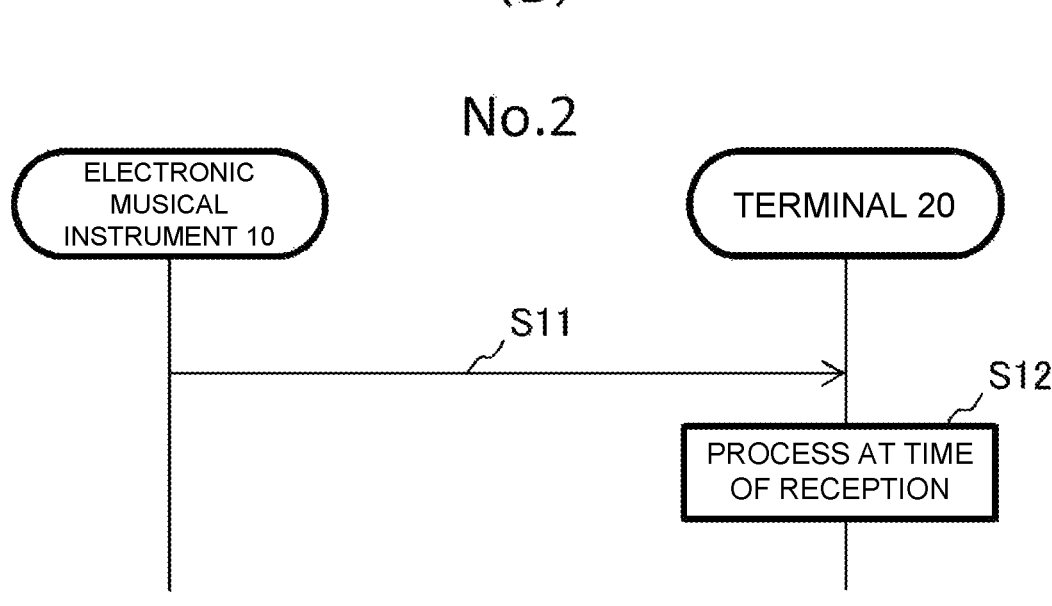
FIG.3

(A)
No.3
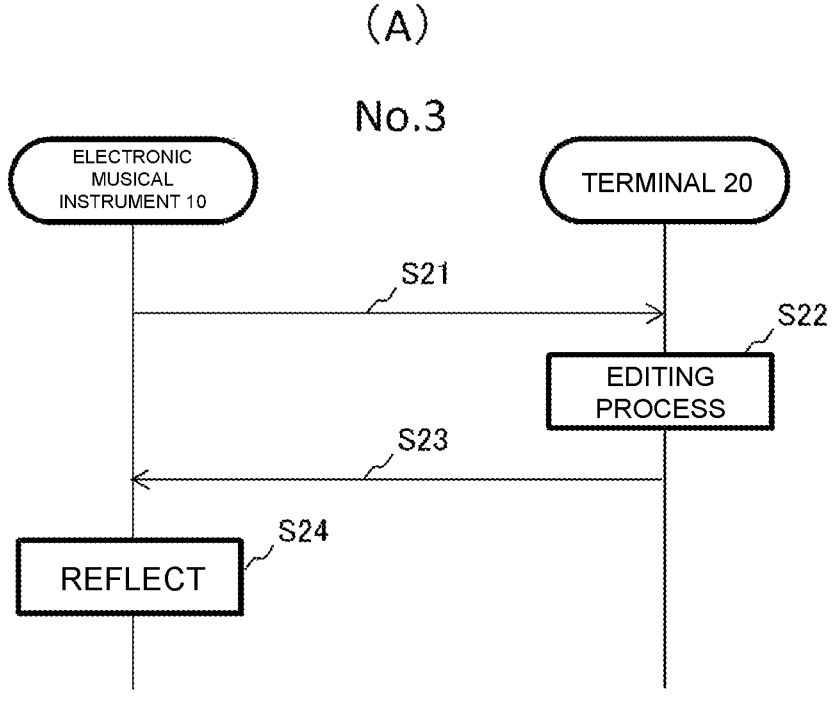
(B)
No.4
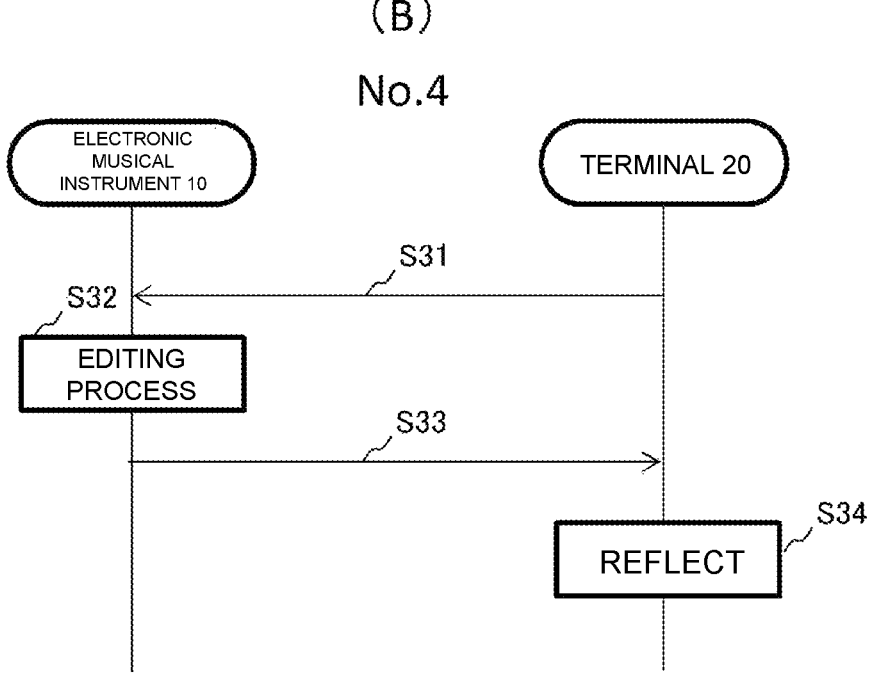
FIG.4

(A)
10
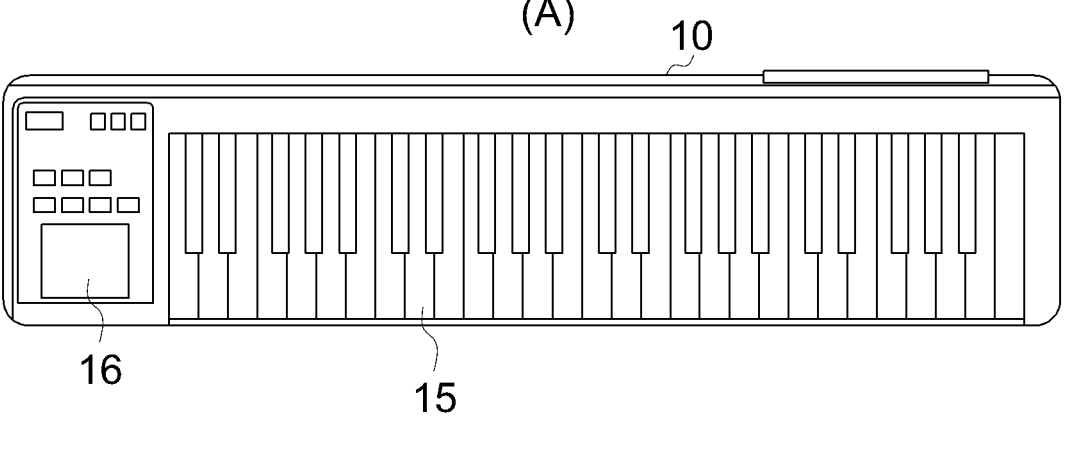
16
15
(B)    25
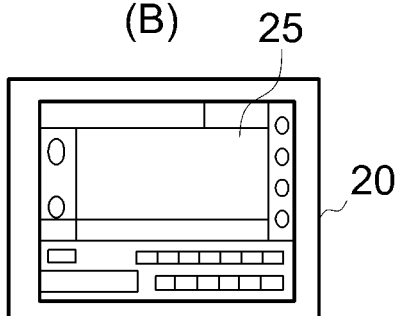
20
FIG.41

| SCREEN | Th |
|--------|------|
| SC1 | Th001 |
| SC2 | Th002 |
| SC3 | Th003 |

INFORMATION PROCESSING METHOD AND ELECTRONIC MUSICAL INSTRUMENT

CROSS-REFERENCE TO RELATED APPLICATION

This application is a 371 application of the International PCT application serial no. PCT/JP2019/027616, filed on Jul. 11, 2019. The entirety of the above-mentioned patent application is hereby incorporated by reference herein and made a part of this specification.

TECHNICAL FIELD

The present invention relates to an information processing method and an electronic musical instrument.

BACKGROUND ART

In the related art, there is an information processing device in which, when a distance from an antenna according to the near field communication (NFC) standard comes within a predetermined range, information stored in a wireless tag connected to the antenna is read, and processes are performed according to a plurality of reading orders (sequences) (for example, Patent Literature 1). There is a technique in which, when it is detected that a portable terminal is located within an NFC communication range, NFC communication is established, information is exchanged in preparation for transition to BT communication, information that is a printing target is received through the BT communication, and printing is performed (for example, Patent Literature 2).

CITATION LIST

Patent Literature

[Patent Literature 1]
Japanese Patent Application Laid-Open No. 2015-052209
[Patent Literature 2]
Japanese Patent Application Laid-Open No. 2017-001394

SUMMARY OF INVENTION

Technical Problem

An objective of the present invention is to provide an information processing method and an electronic musical instrument in which the usefulness of the electronic musical instrument can be improved.

Solution to Problem

According to one aspect of the present invention, there is provided an information processing method including causing one of an electronic musical instrument and a terminal capable of short-range wireless communication with the electronic musical instrument to perform an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible; and causing the other of the electronic musical instrument and the terminal to perform a process of transmitting corresponding data when the reading request is received, and perform a process of writing the writing target data when the writing target data and the writing request for the writing target data are received.

According to another aspect of the present invention, there is provided an electronic musical instrument including a short-range wireless communication unit that can perform short-range wireless communication with a terminal; and a processing unit that, in a case where the terminal performs an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible, performs a process of transmitting corresponding data when the reading request is received using the short-range wireless communication unit, and performs a process of writing the writing target data when the writing target data and the writing request for the writing target data are received via the short-range wireless communication unit.

BRIEF DESCRIPTION OF DRAWINGS

FIG. 2 is a table illustrating a list of processes that can be executed by an electronic musical instrument system.

(A) of FIG. 3 is a sequence diagram illustrating an operation example 1 corresponding to item No. 1 in the table. (B) of FIG. 3 is a sequence diagram illustrating an operation example 2 corresponding to item No. 2 in the table.

(A) of FIG. 4 is a sequence diagram illustrating an operation example 3 corresponding to item No. 3 in the table. (B) of FIG. 4 is a sequence diagram illustrating an operation example 4 corresponding to item No. 4 in the table.

Figure 5:
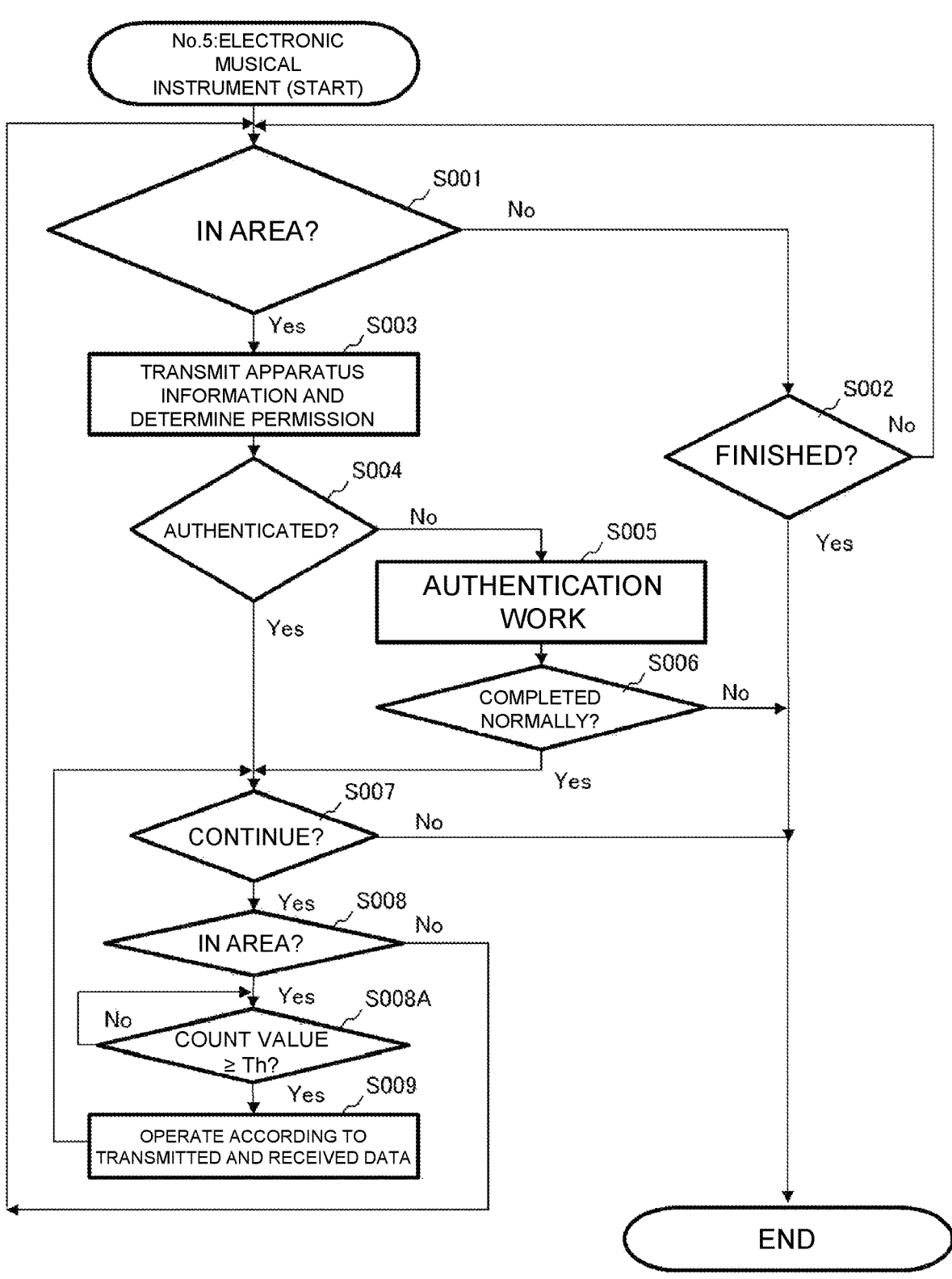

FIG. 5 is a flowchart illustrating a process example of an electronic musical instrument in an operation example 5.

Figure 6:
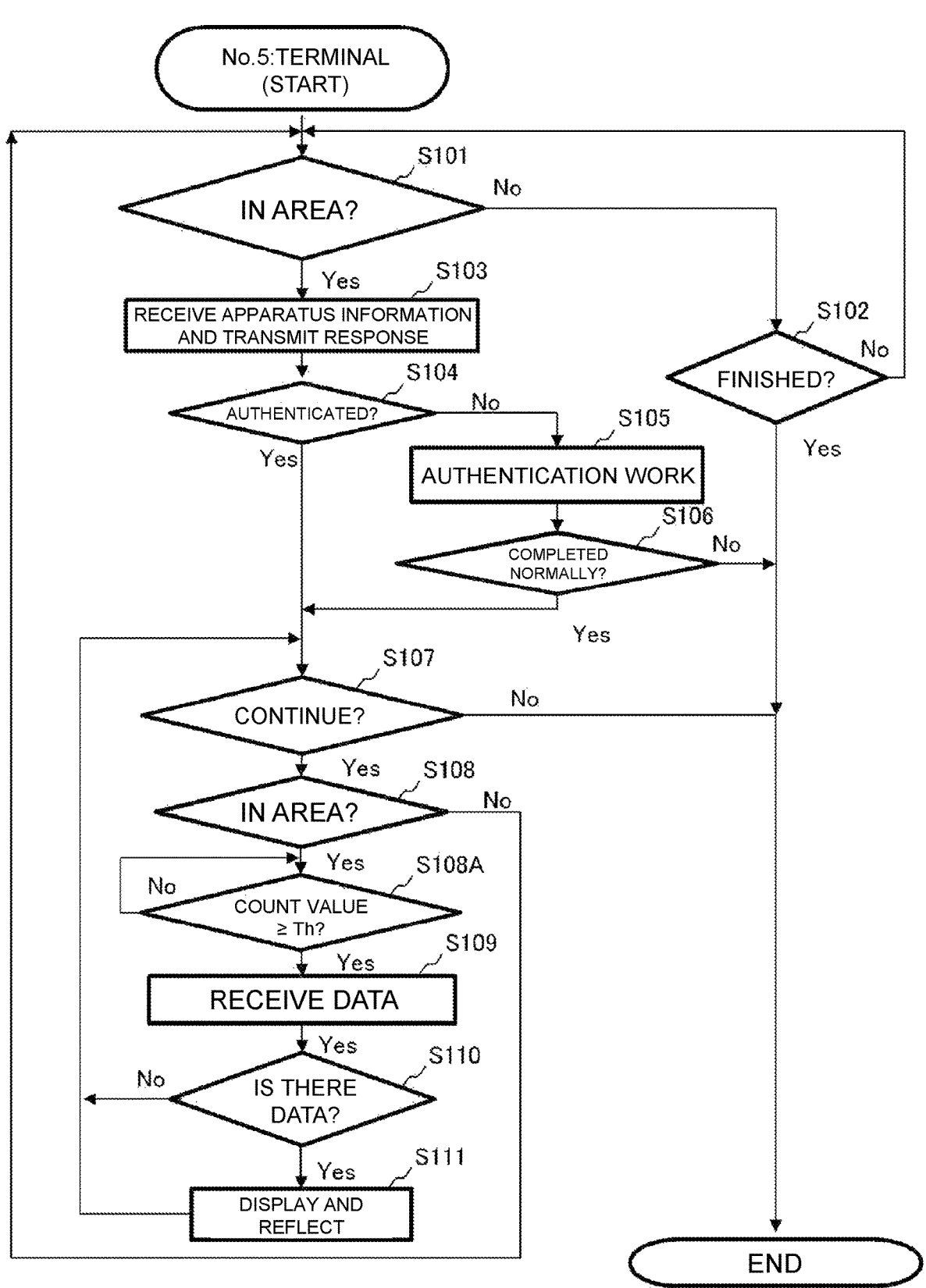

FIG. 6 is a flowchart illustrating a process example of a terminal in the operation example 5.

Figure 7:
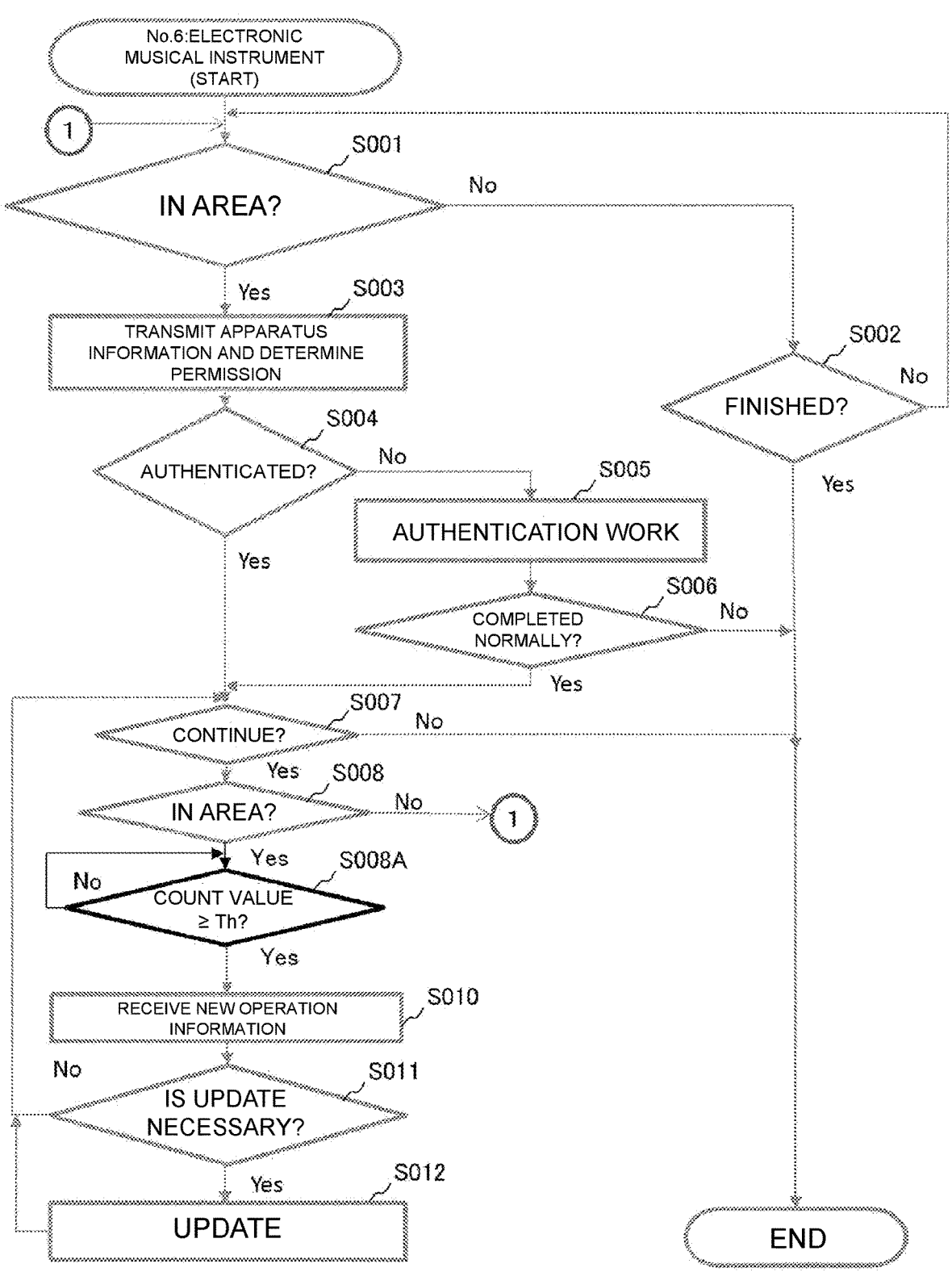

FIG. 7 is a flowchart illustrating a process example of the electronic musical instrument in an operation example 6.

Figure 8:
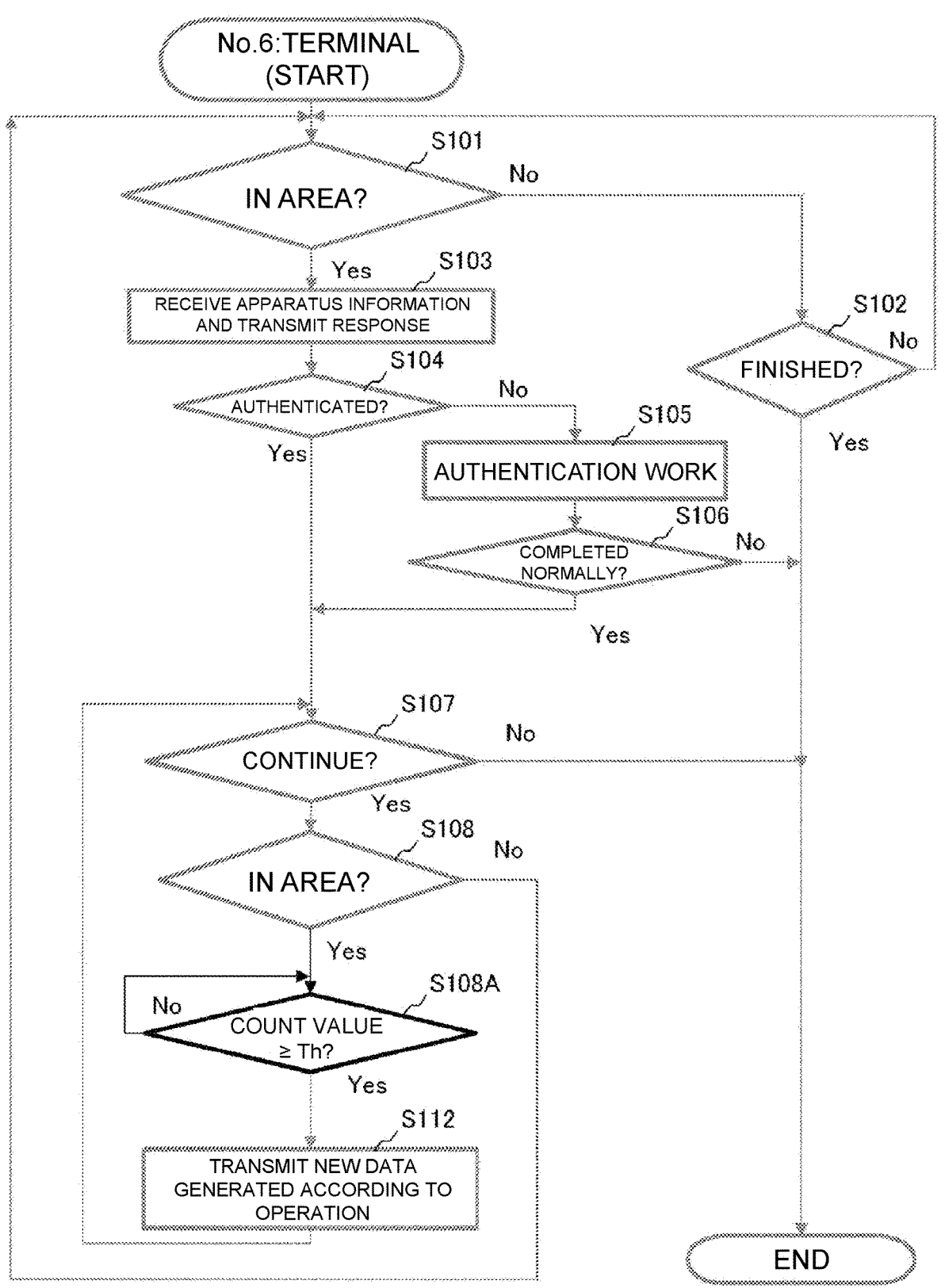

FIG. 8 is a flowchart illustrating a process example of the terminal in the operation example 6.

Figure 9:
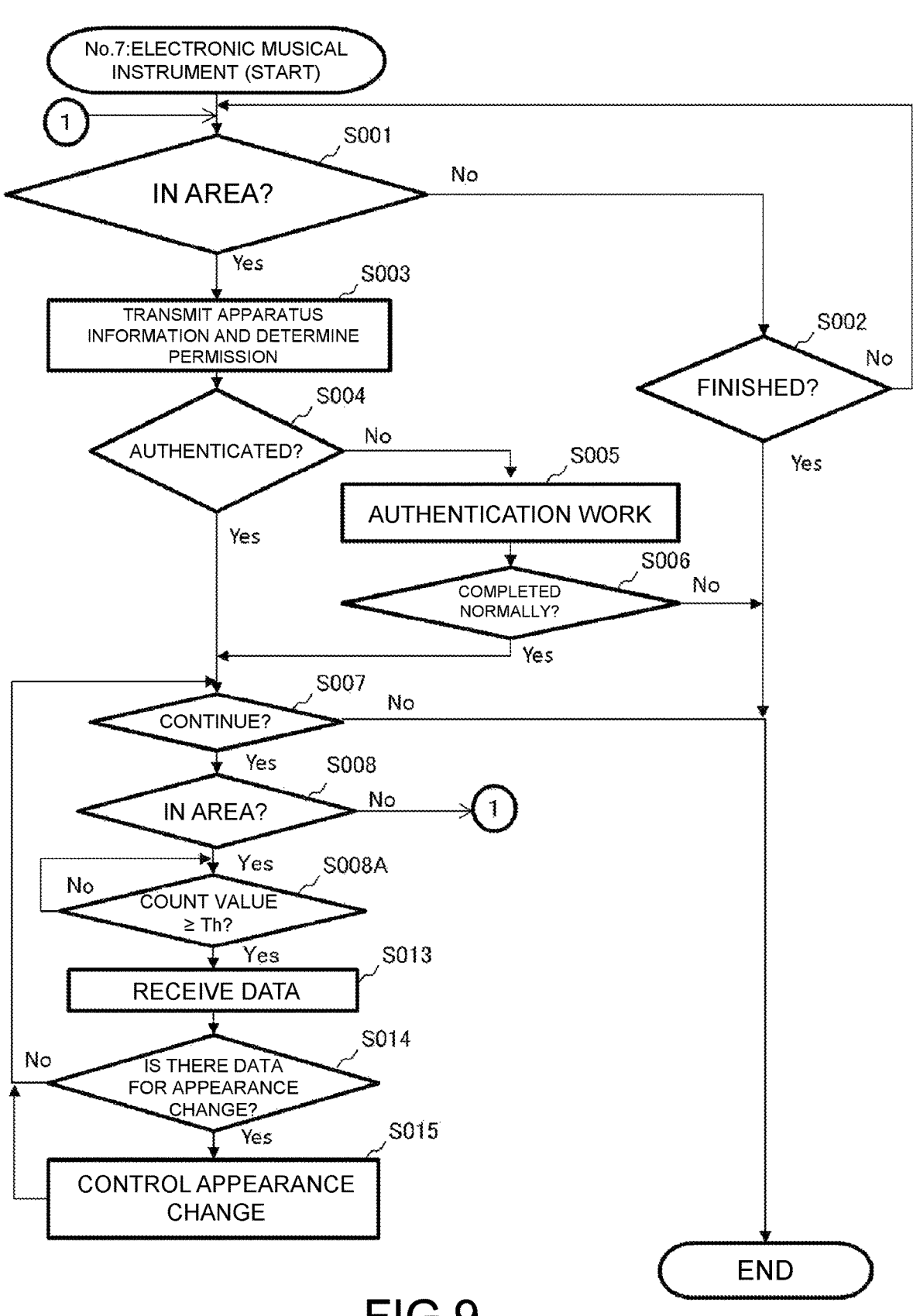

FIG. 9 is a flowchart illustrating a process example of the electronic musical instrument in an operation example 7.

Figure 10:
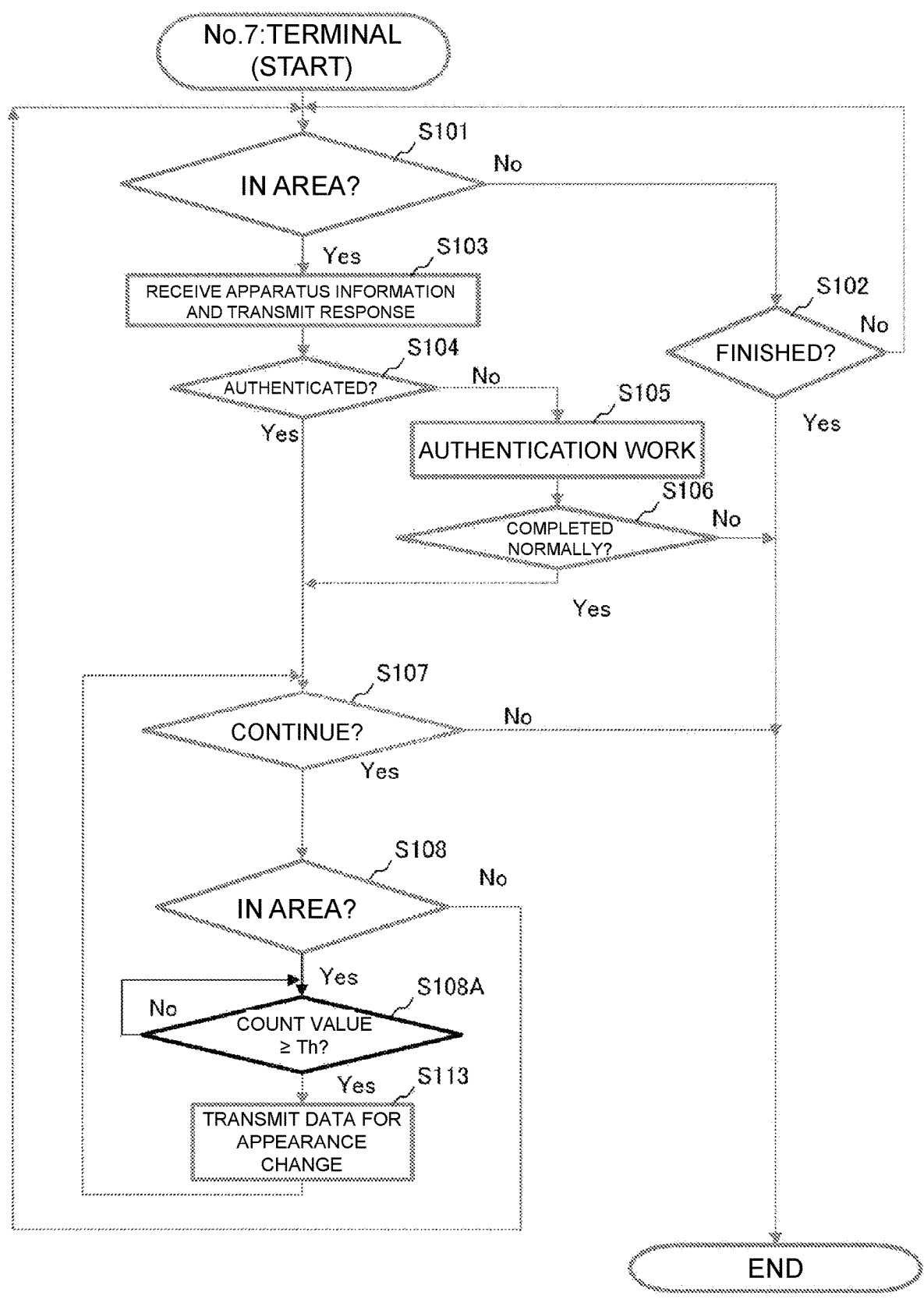

FIG. 10 is a flowchart illustrating a process example of the terminal in the operation example 7.

Figure 11:
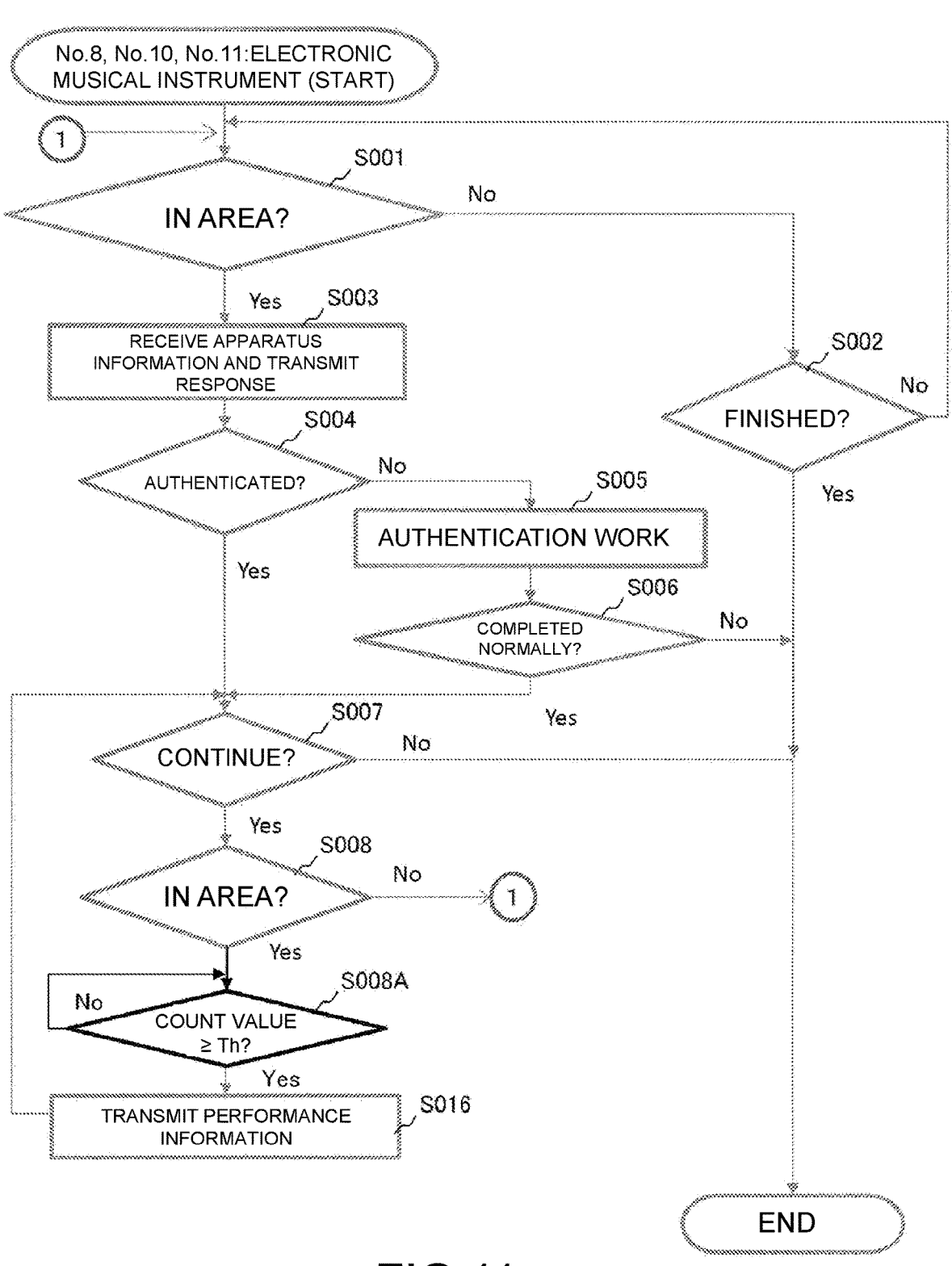

FIG. 11 is a flowchart illustrating a process example of the electronic musical instrument in an operation example 8.

Figure 12:
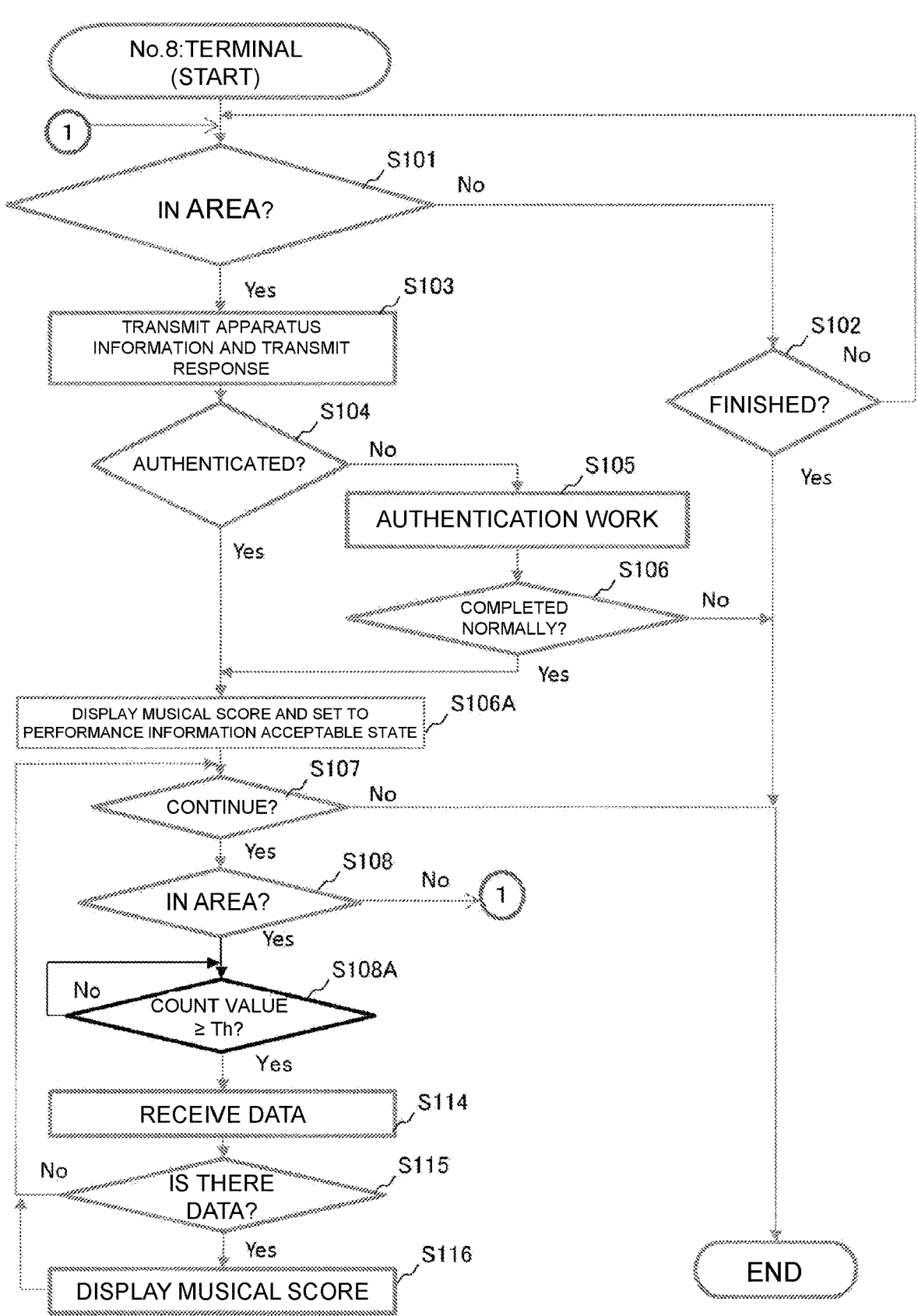

FIG. 12 is a flowchart illustrating a process example of the terminal in the operation example 8.

Figure 13:
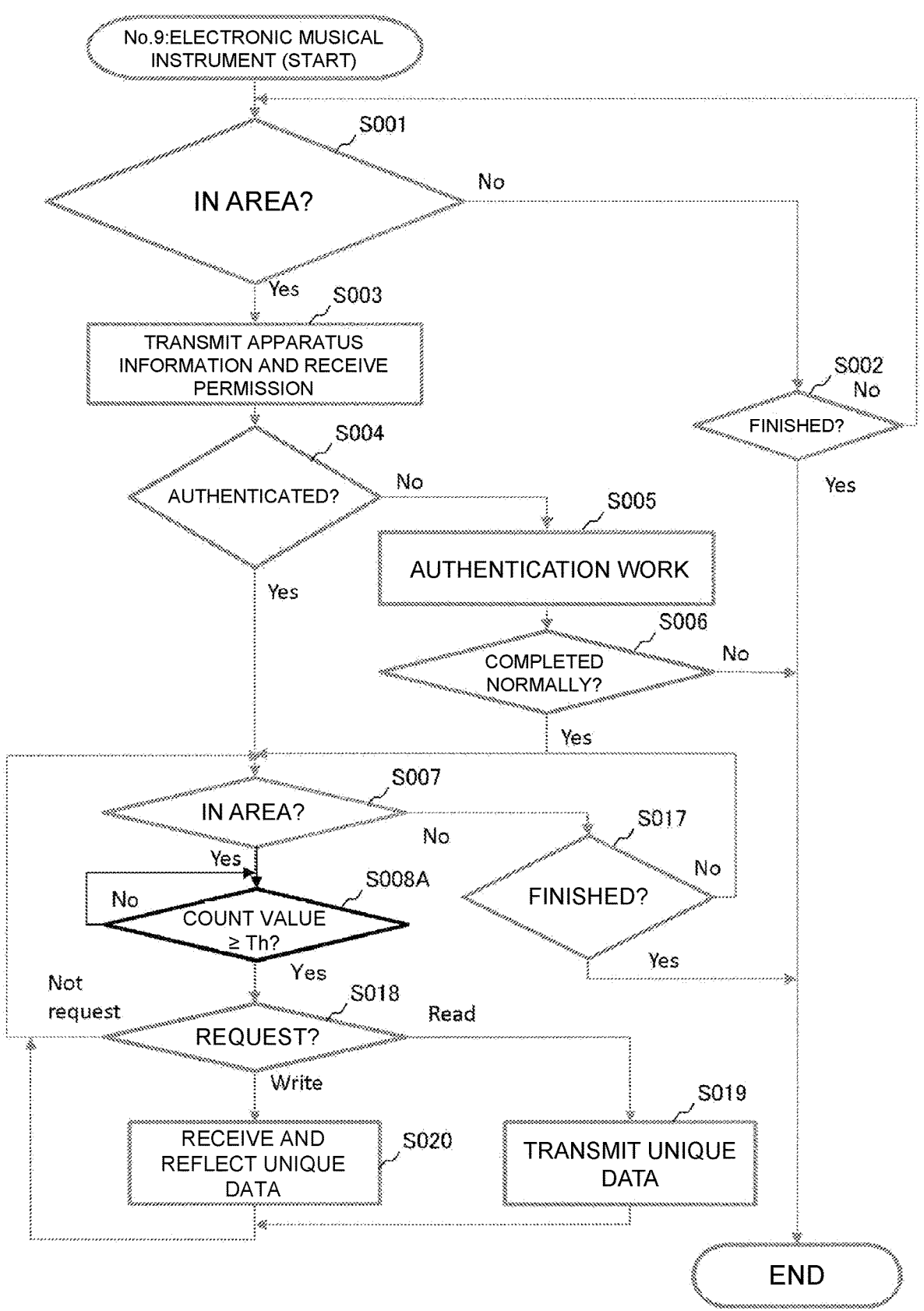

FIG. 13 is a flowchart illustrating a process example of the electronic musical instrument in an operation example 9.

Figure 14:
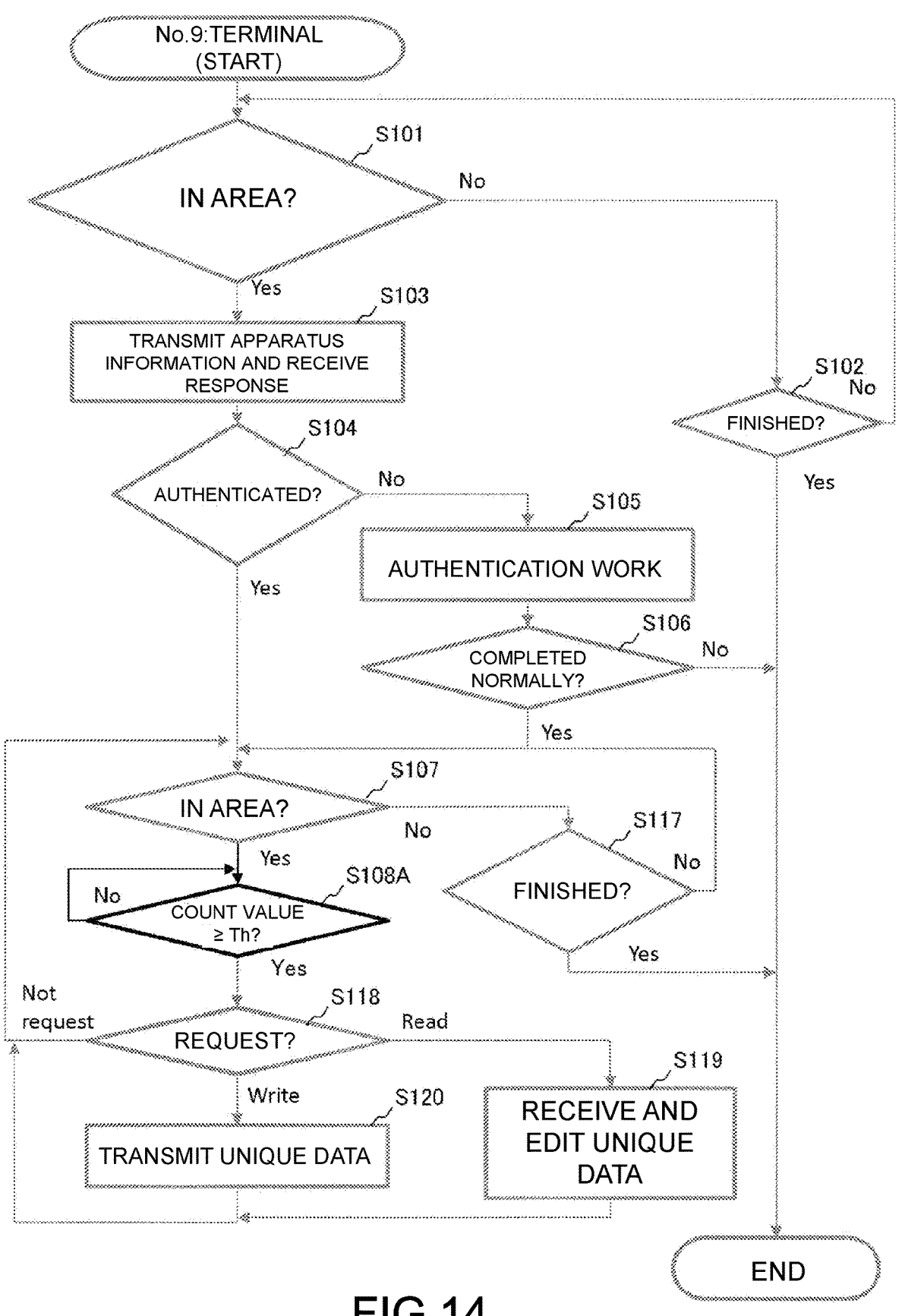

FIG. 14 is a flowchart illustrating a process example of the terminal in the operation example 9.

Figure 15:
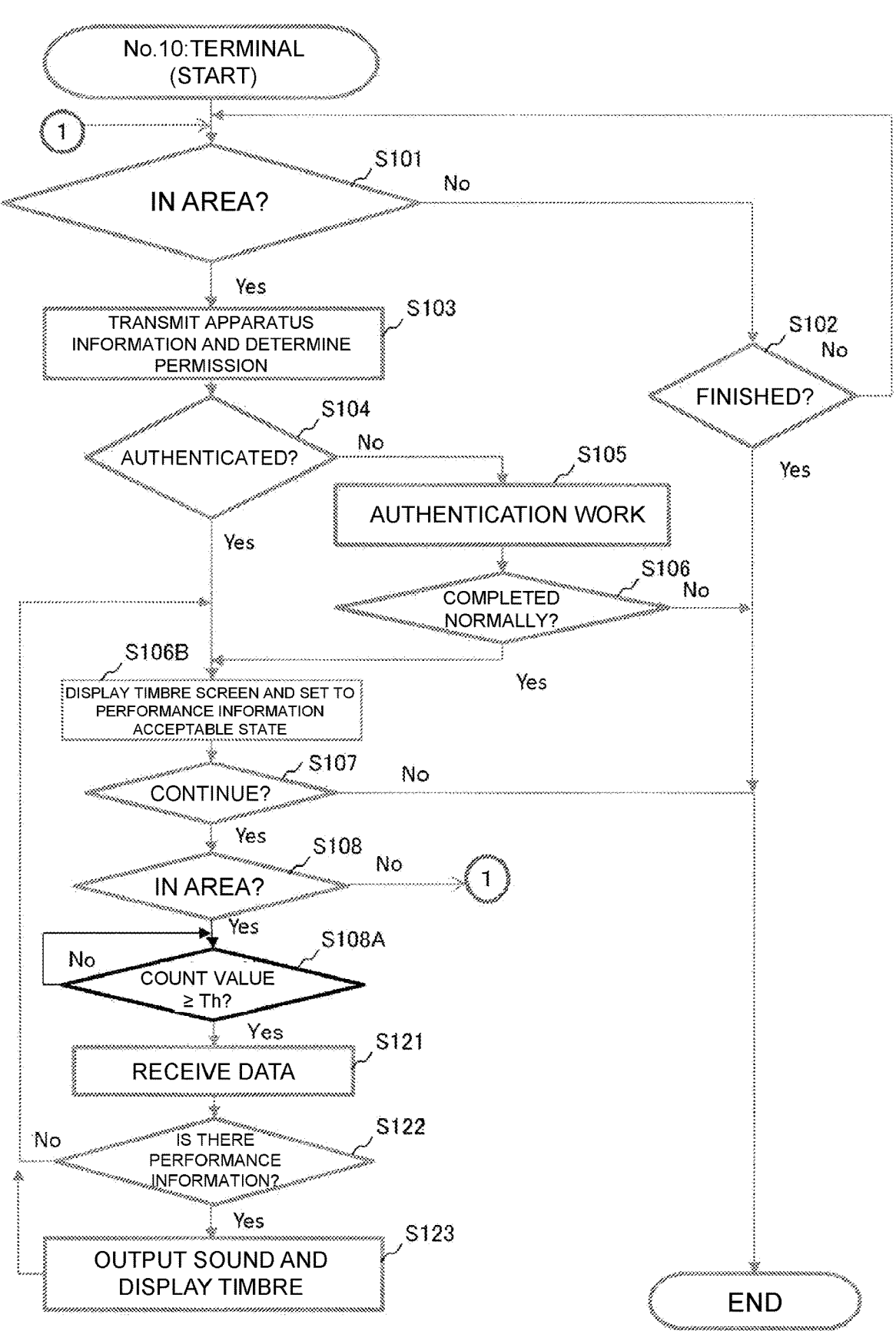

FIG. 15 is a flowchart illustrating a process example of the terminal in an operation example 10.

Figure 16:
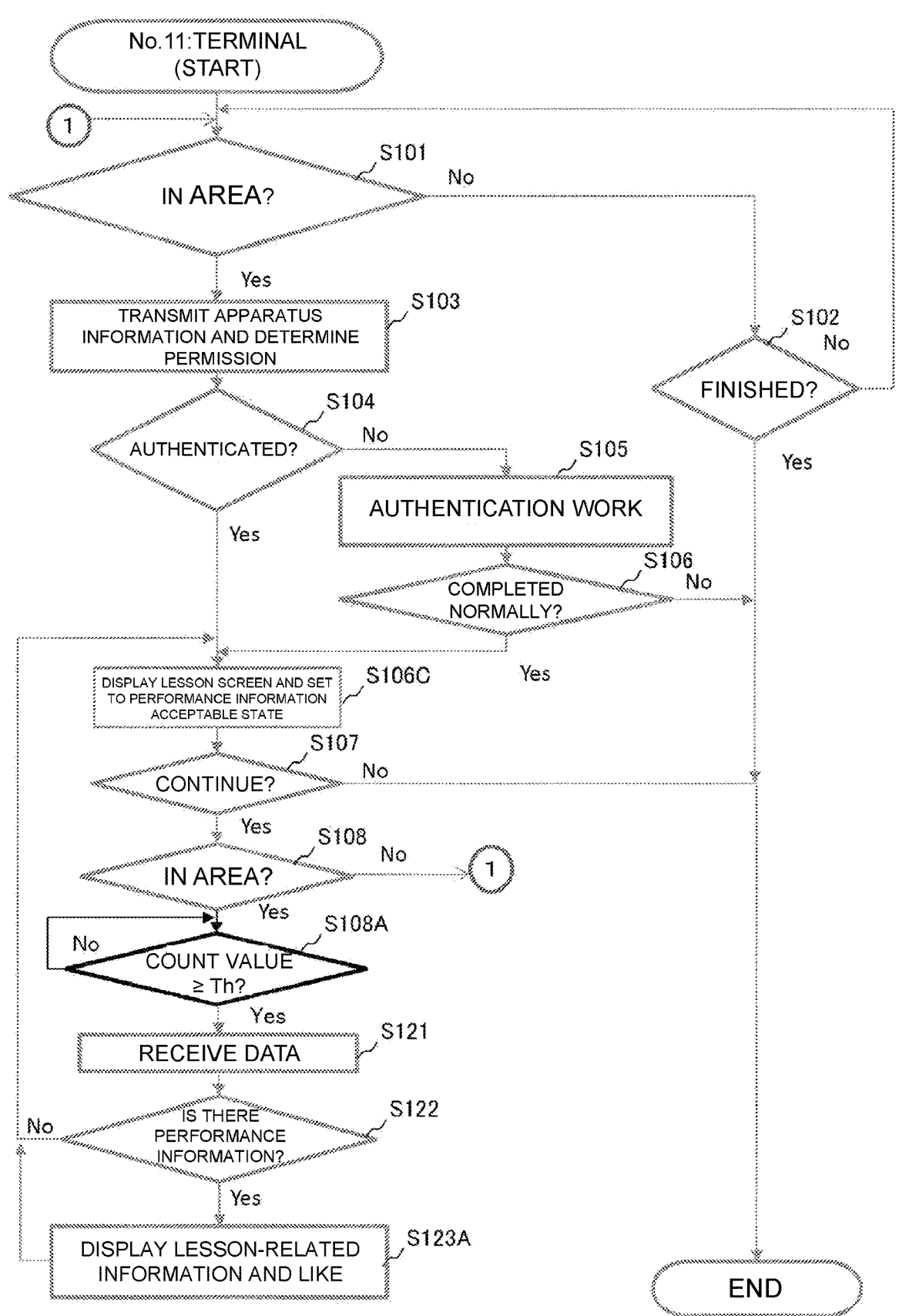

FIG. 16 is a flowchart illustrating a process example of the terminal in an operation example 11.

Figure 17:
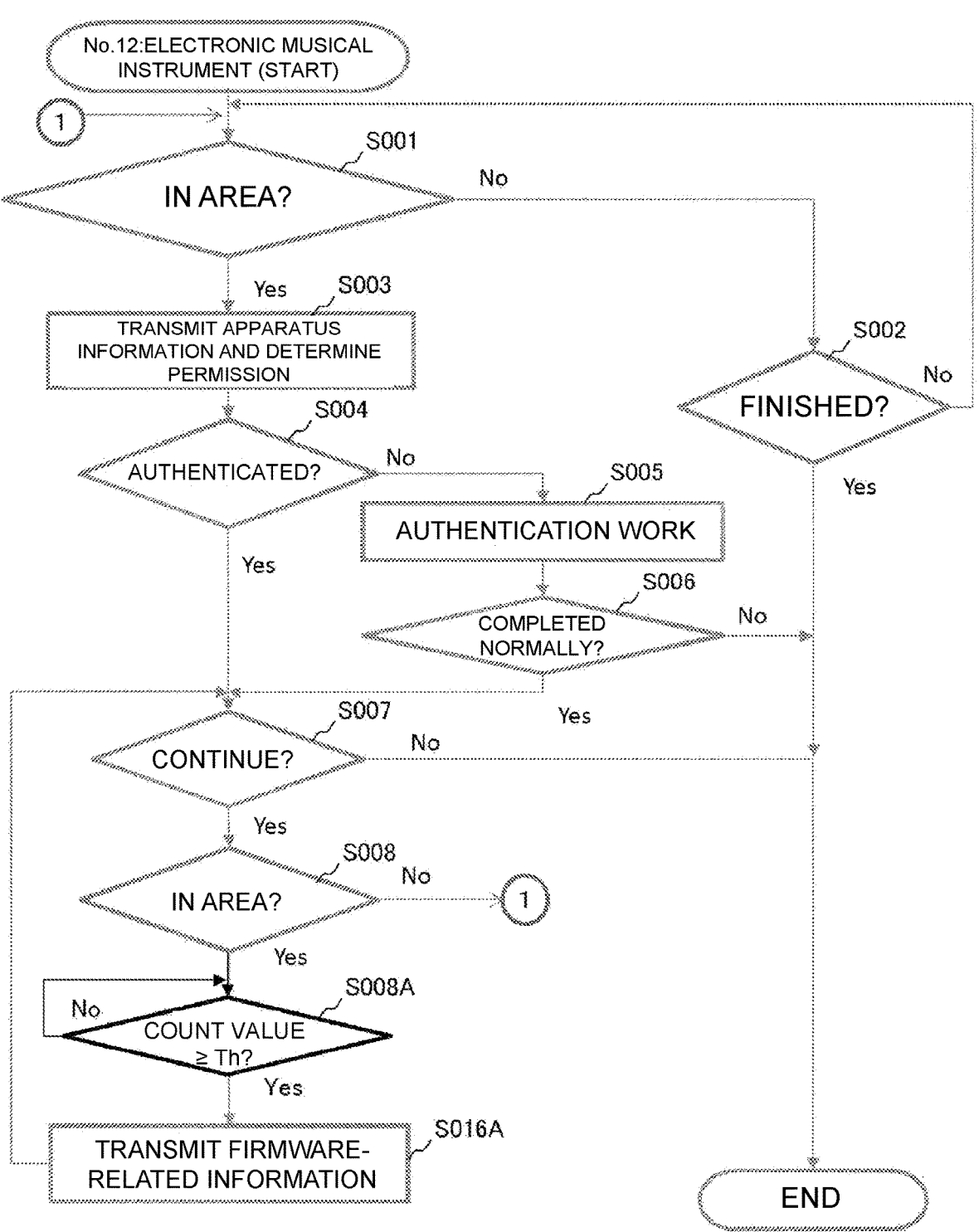

FIG. 17 is a flowchart illustrating a process example of the electronic musical instrument in an operation example 12.

Figure 18:
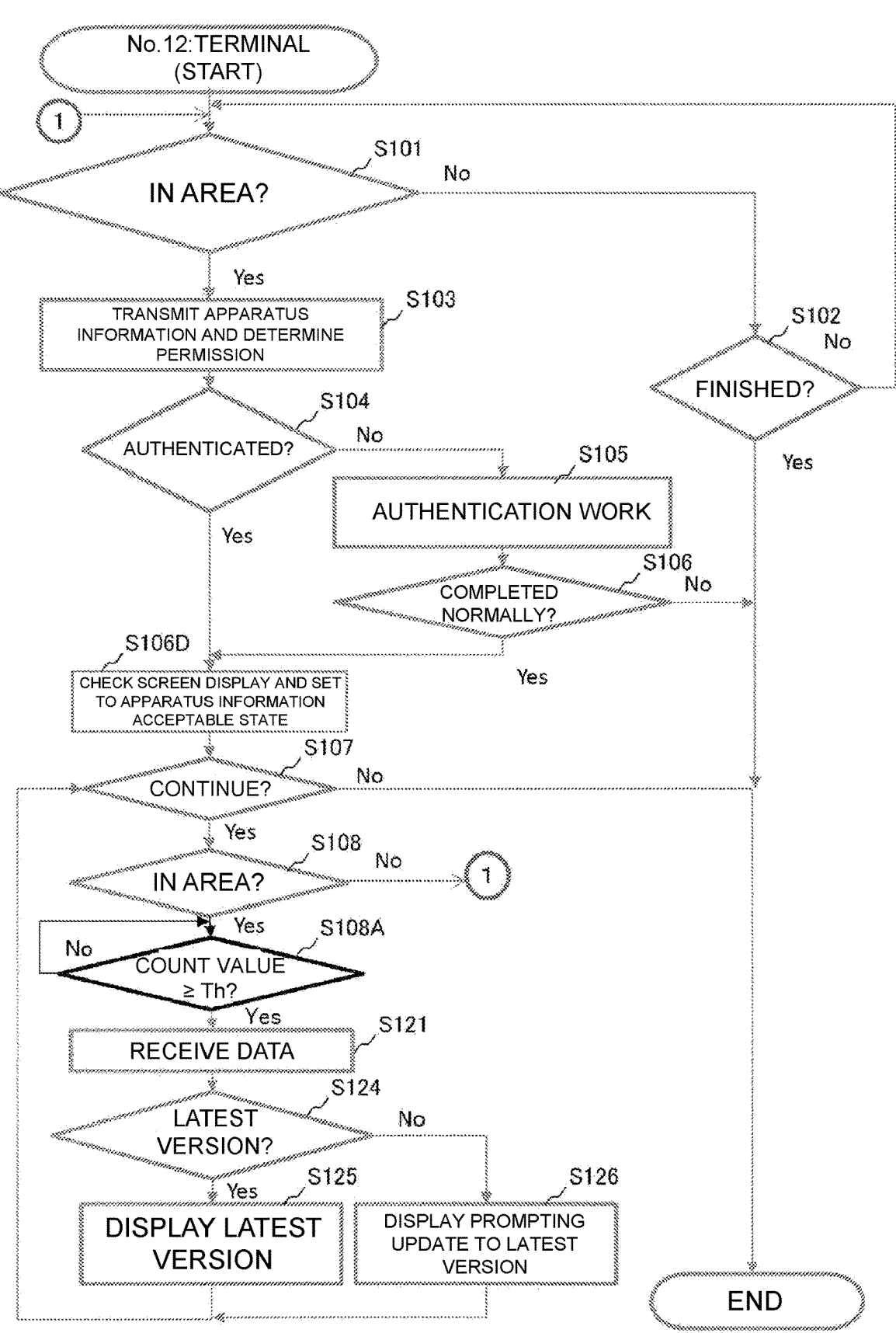

FIG. 18 is a flowchart illustrating a process example of the terminal in the operation example 12.

Figure 19:
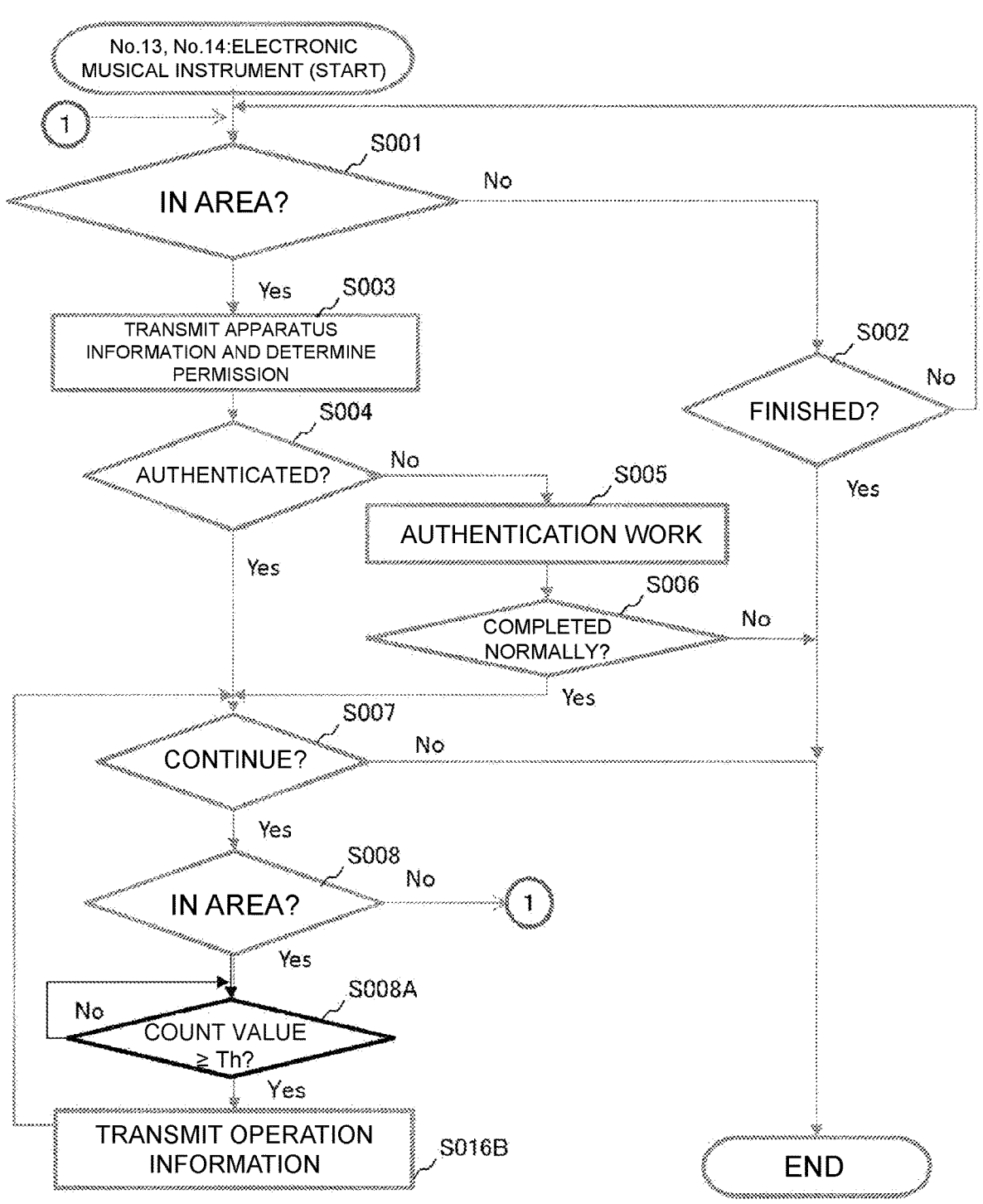

FIG. 19 is a flowchart illustrating a process example of the electronic musical instrument in an operation example 13.

Figure 20:
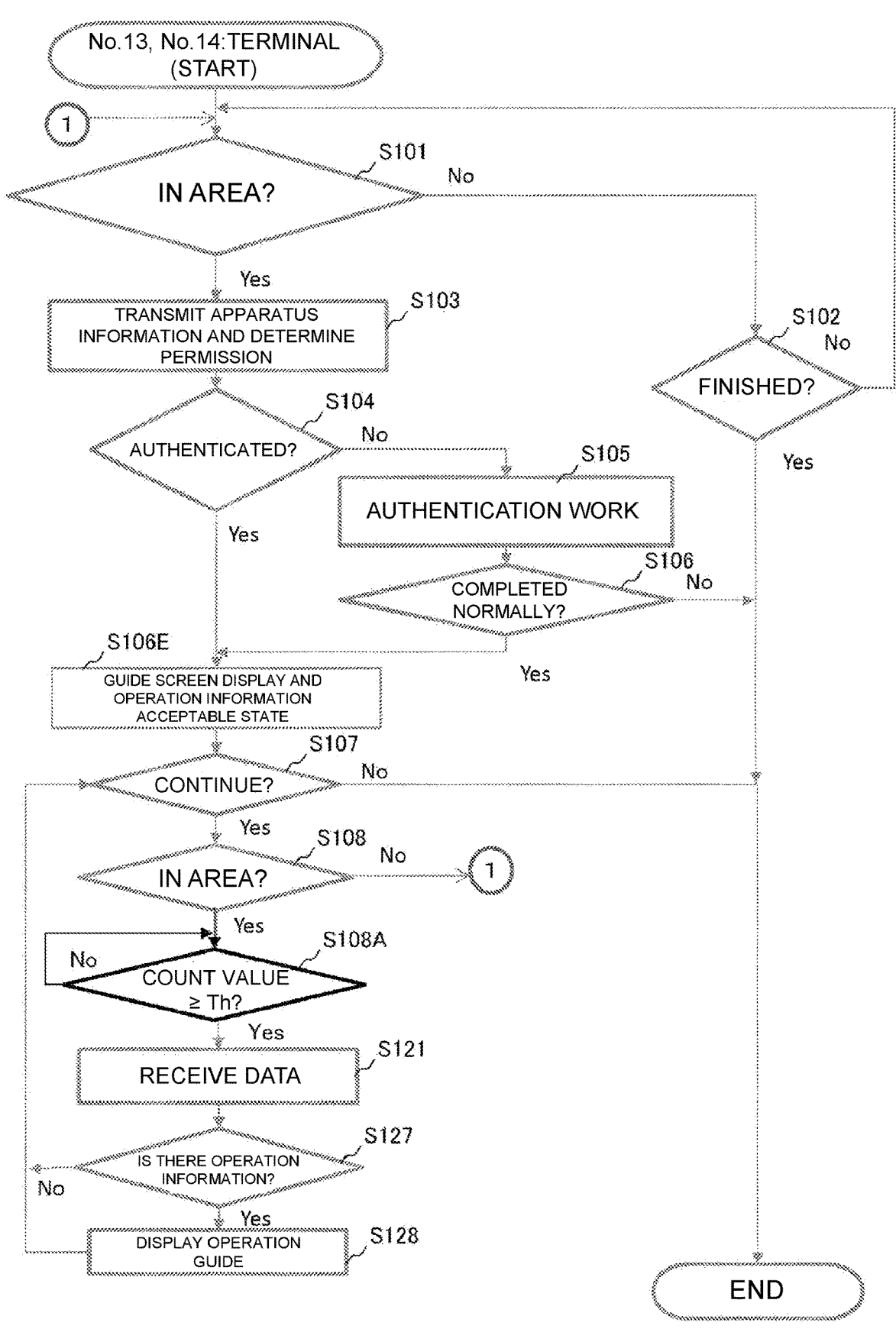

FIG. 20 is a flowchart illustrating a process example of the terminal in the operation example 13.

Figure 21:
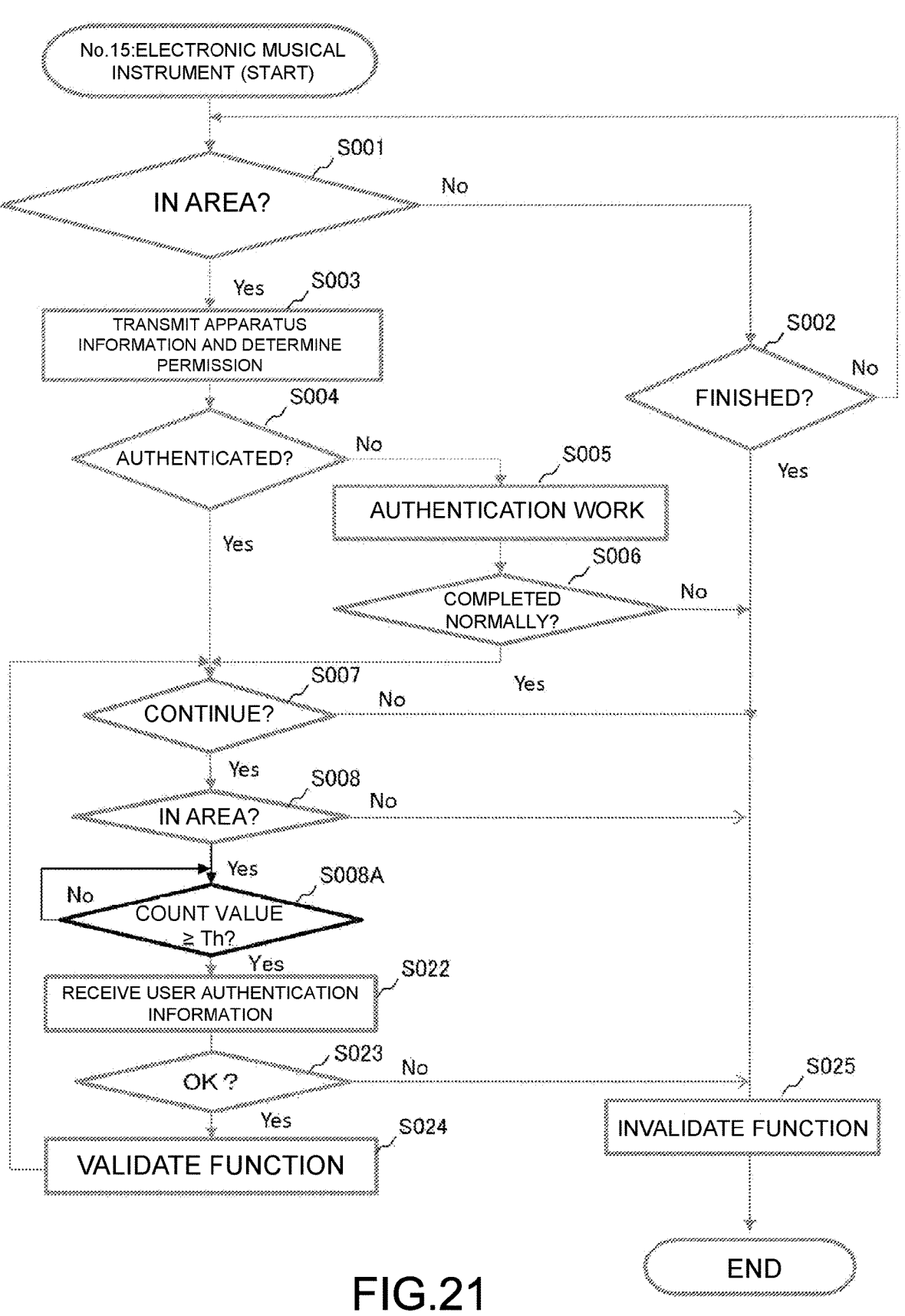

FIG. 21 is a flowchart illustrating a process example of the electronic musical instrument in an operation example 15.

Figure 22:
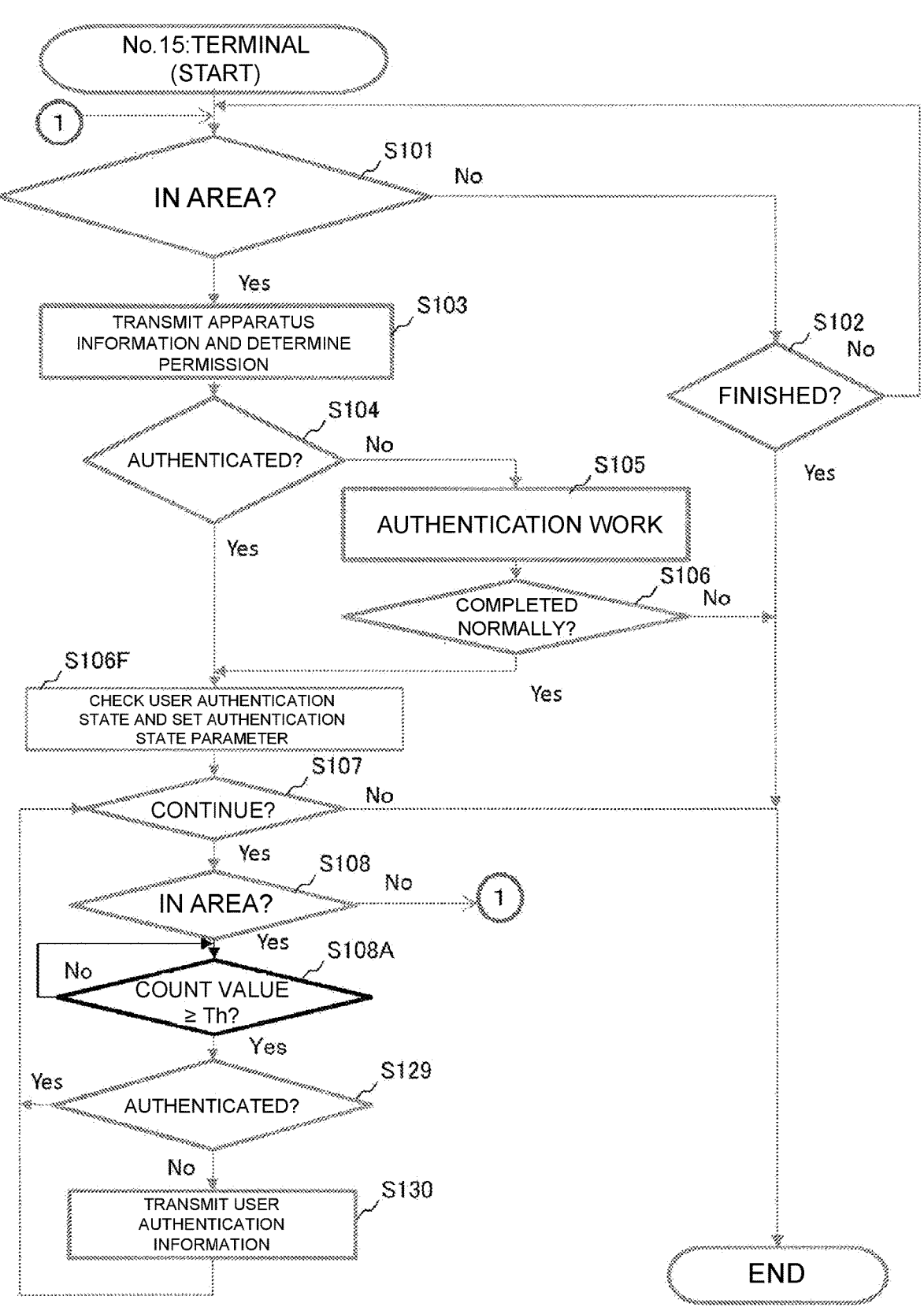

FIG. 22 is a flowchart illustrating a process example of the terminal in the operation example 15.

Figure 23:
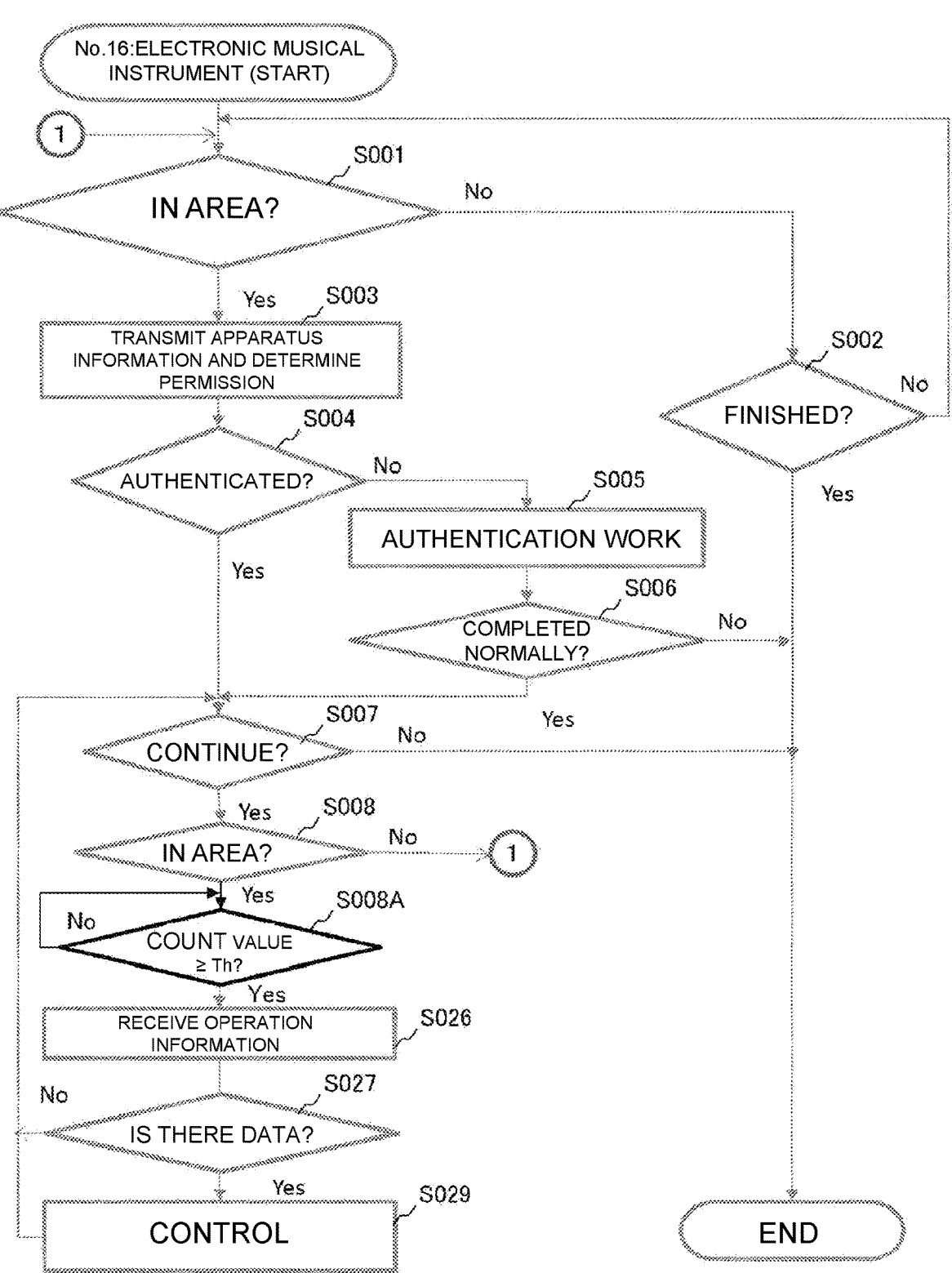

FIG. 23 is a flowchart illustrating a process example of the electronic musical instrument in an operation example 16.

Figure 24:
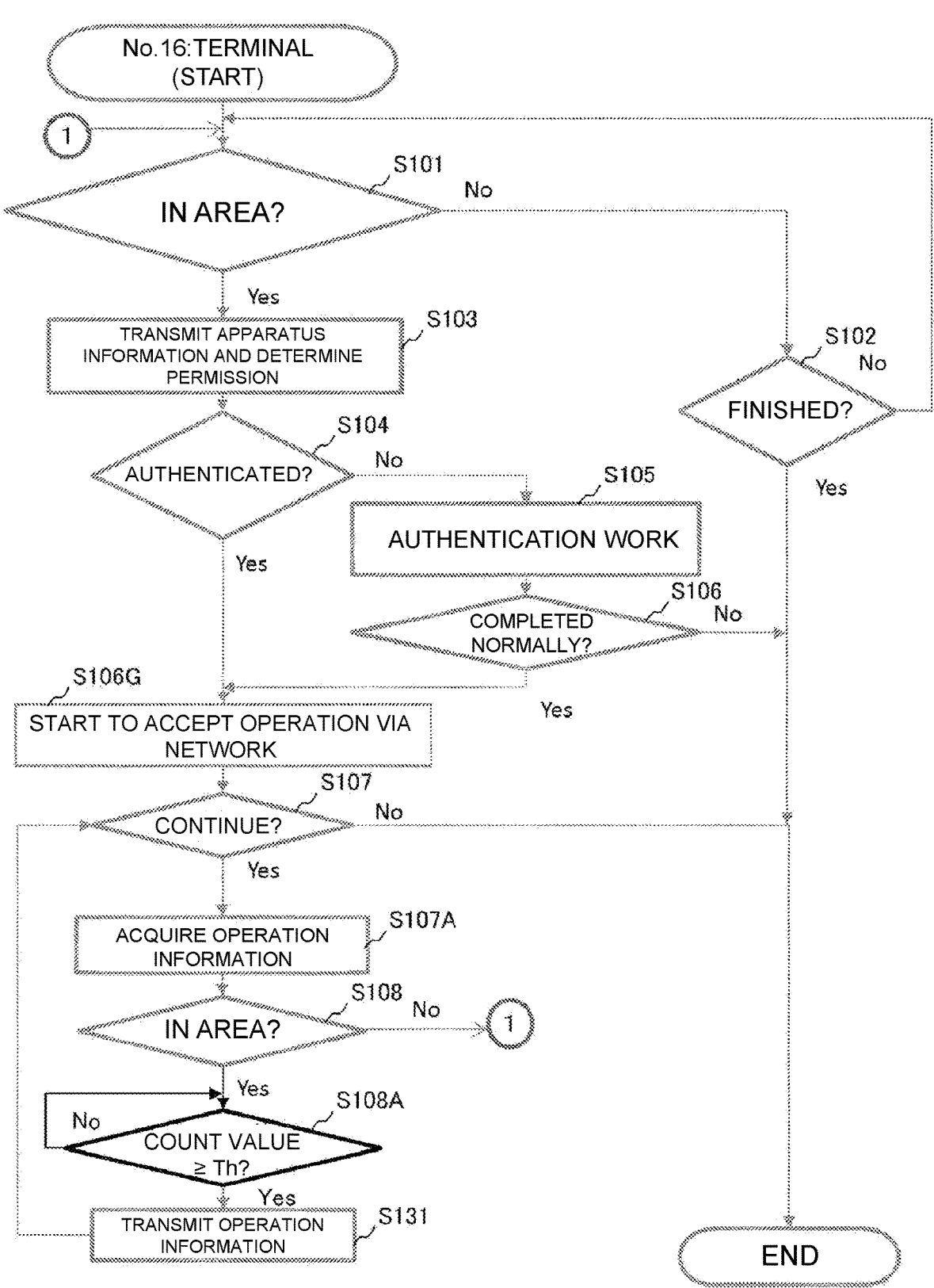

FIG. 24 is a flowchart illustrating a process example of the terminal in the operation example 16.

Figure 25:
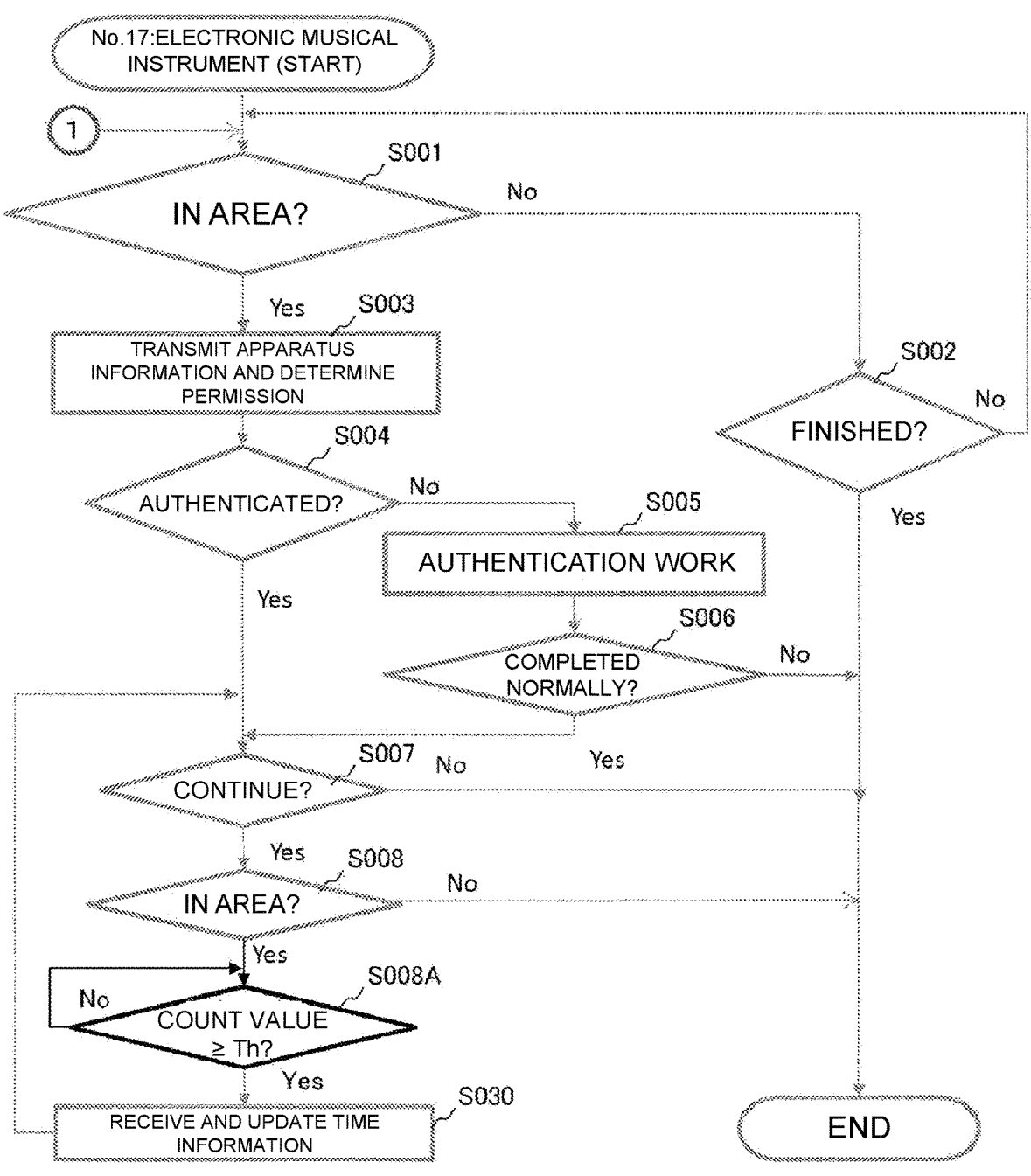

FIG. 25 is a flowchart illustrating a process example of the electronic musical instrument in an operation example 17.

Figure 26:
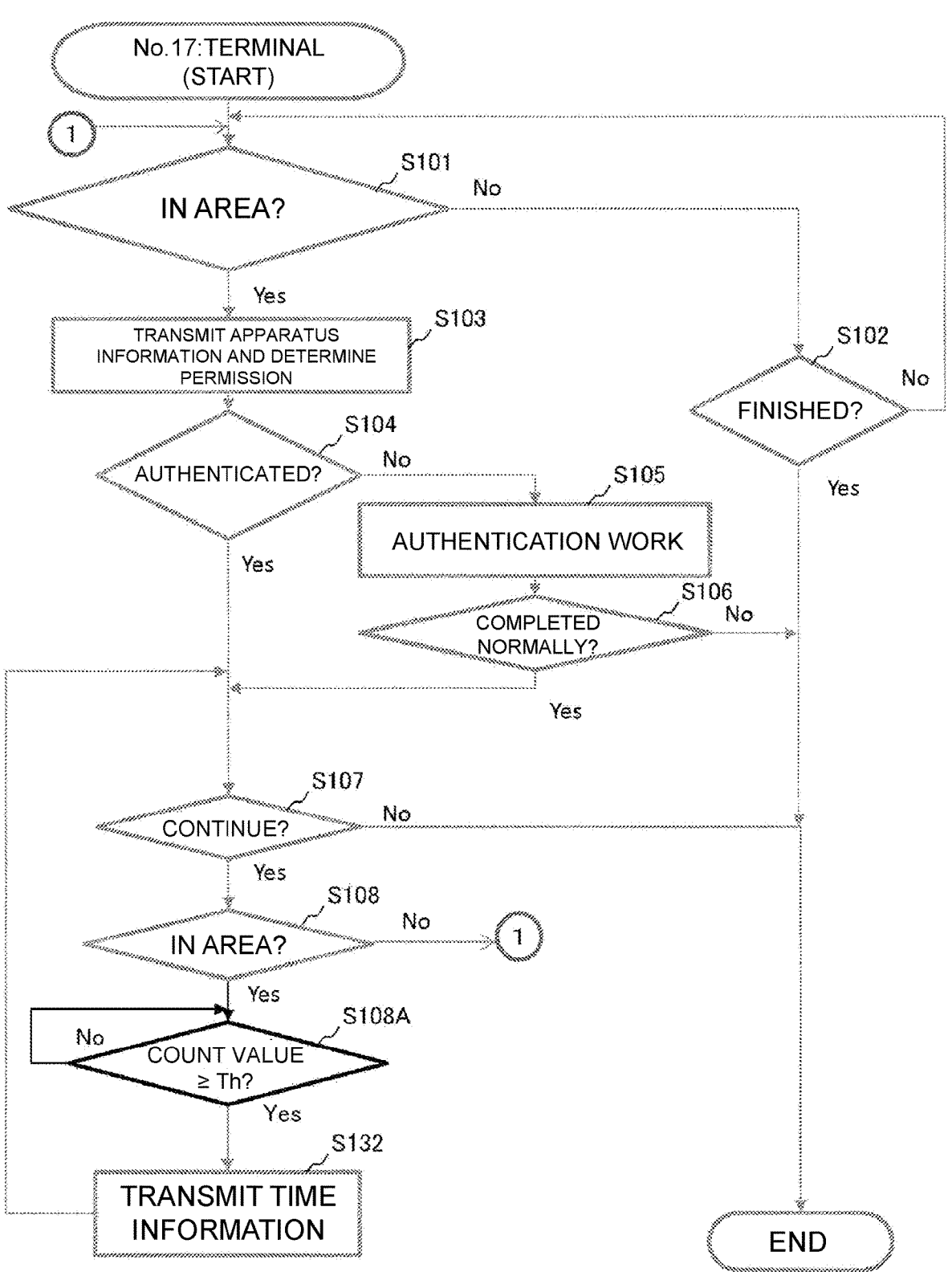

FIG. 26 is a flowchart illustrating a process example of the terminal in the operation example 17.

Figure 27:
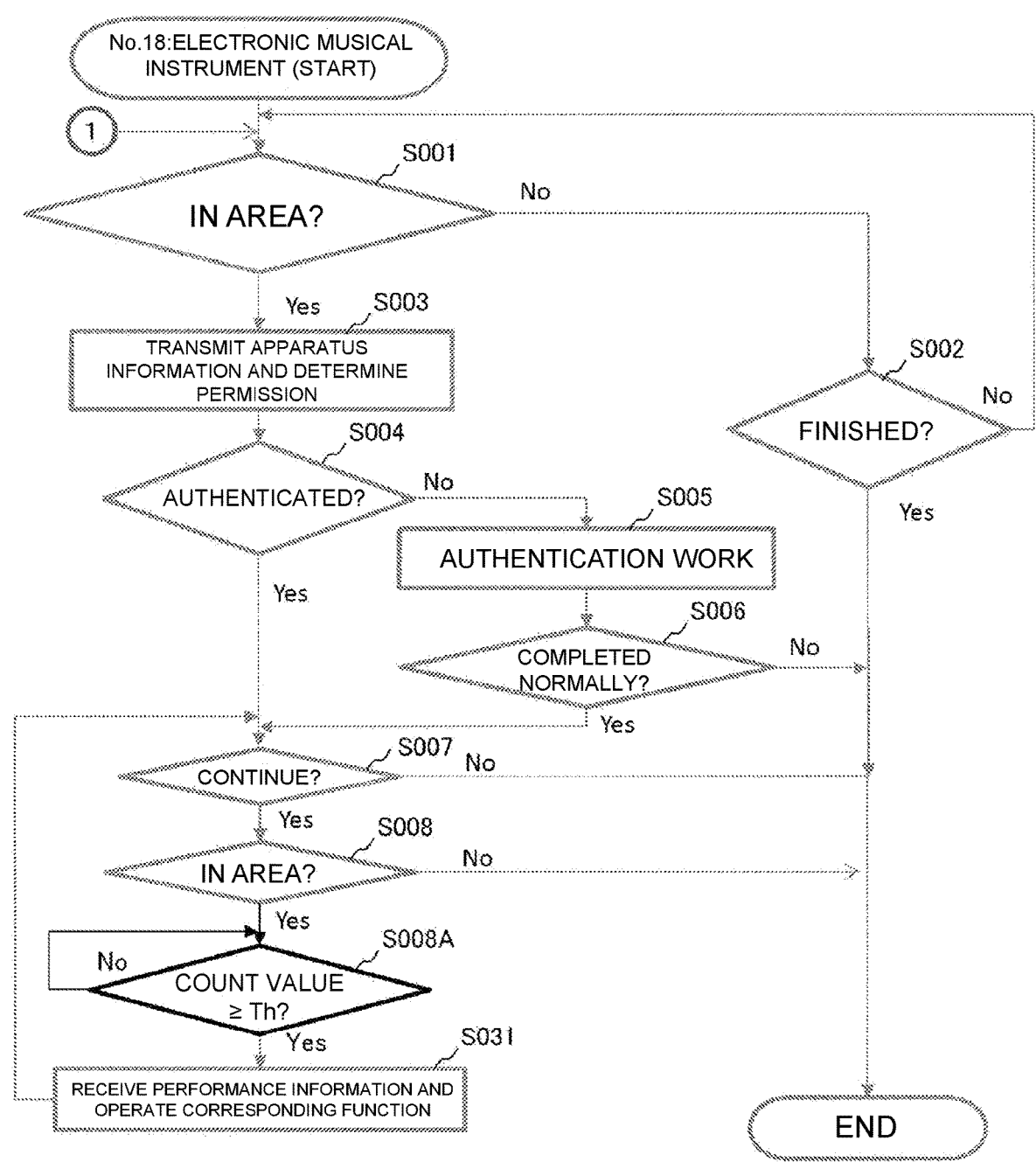

FIG. 27 is a flowchart illustrating a process example of the electronic musical instrument in an operation example 18.

Figure 28:
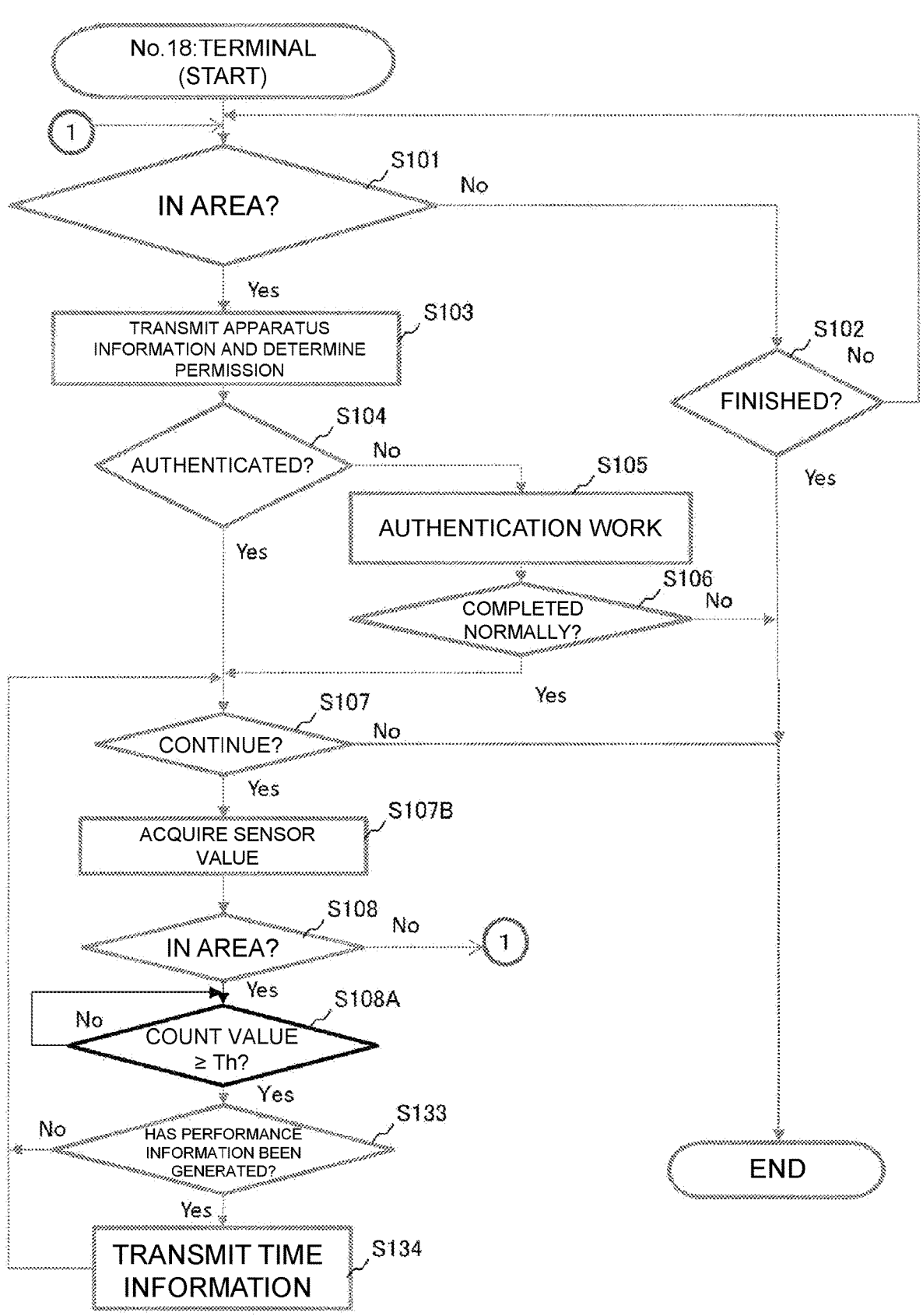

FIG. 28 is a flowchart illustrating a process example of the terminal in the operation example 18.

Figure 29:
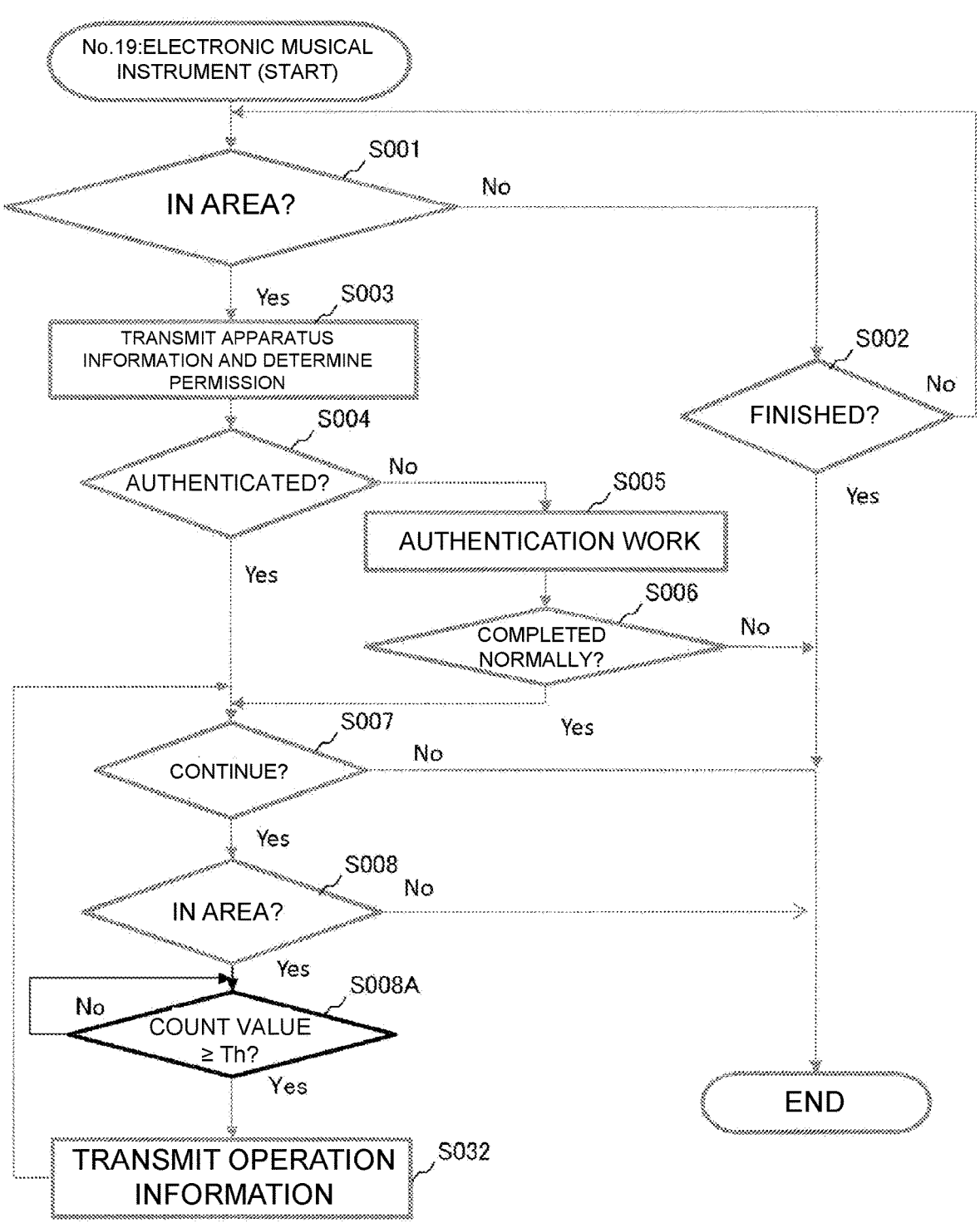

FIG. 29 is a flowchart illustrating a process example of the electronic musical instrument in an operation example 19.

Figure 30:
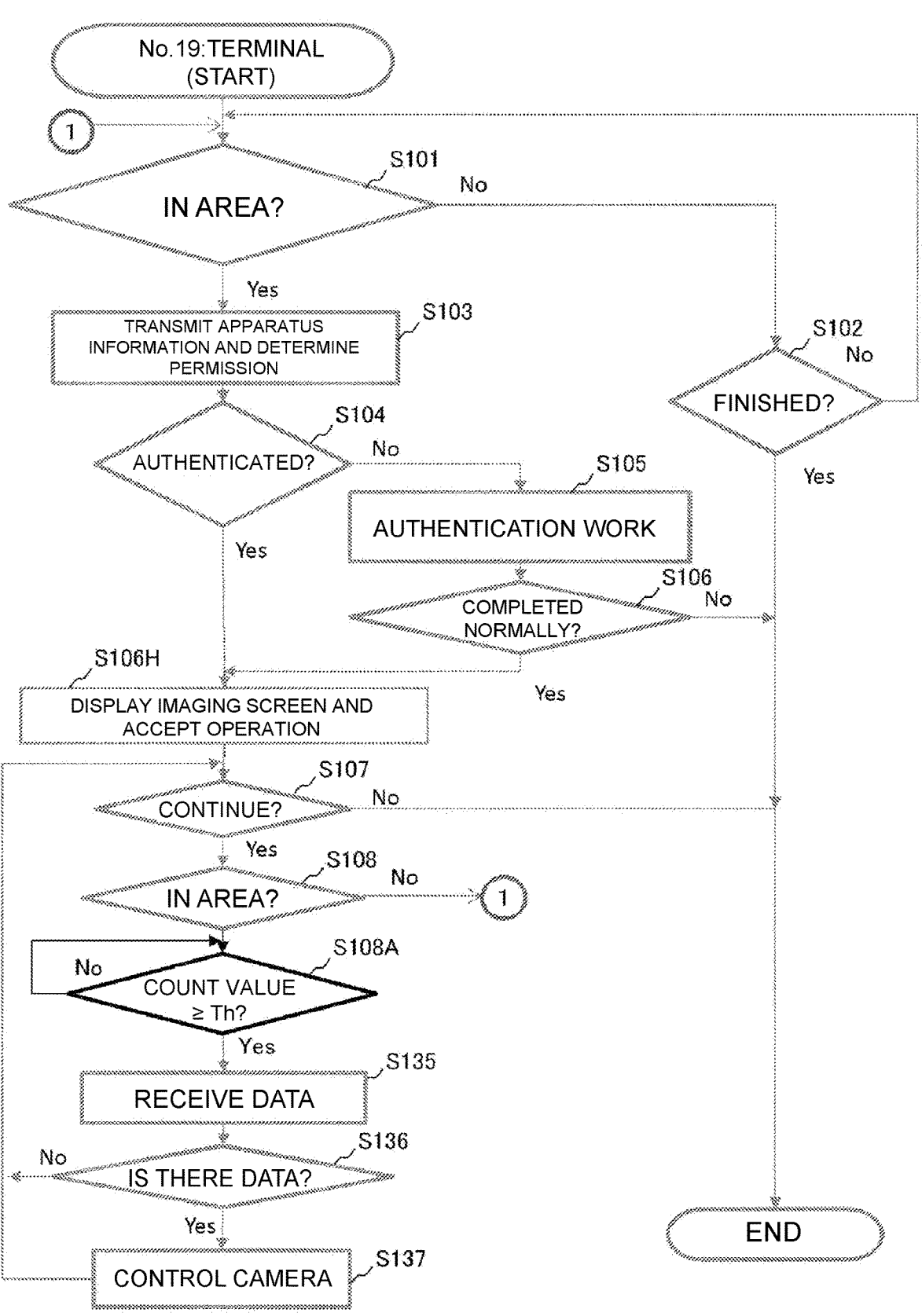

FIG. 30 is a flowchart illustrating a process example of the terminal in the operation example 19.

Figure 31:
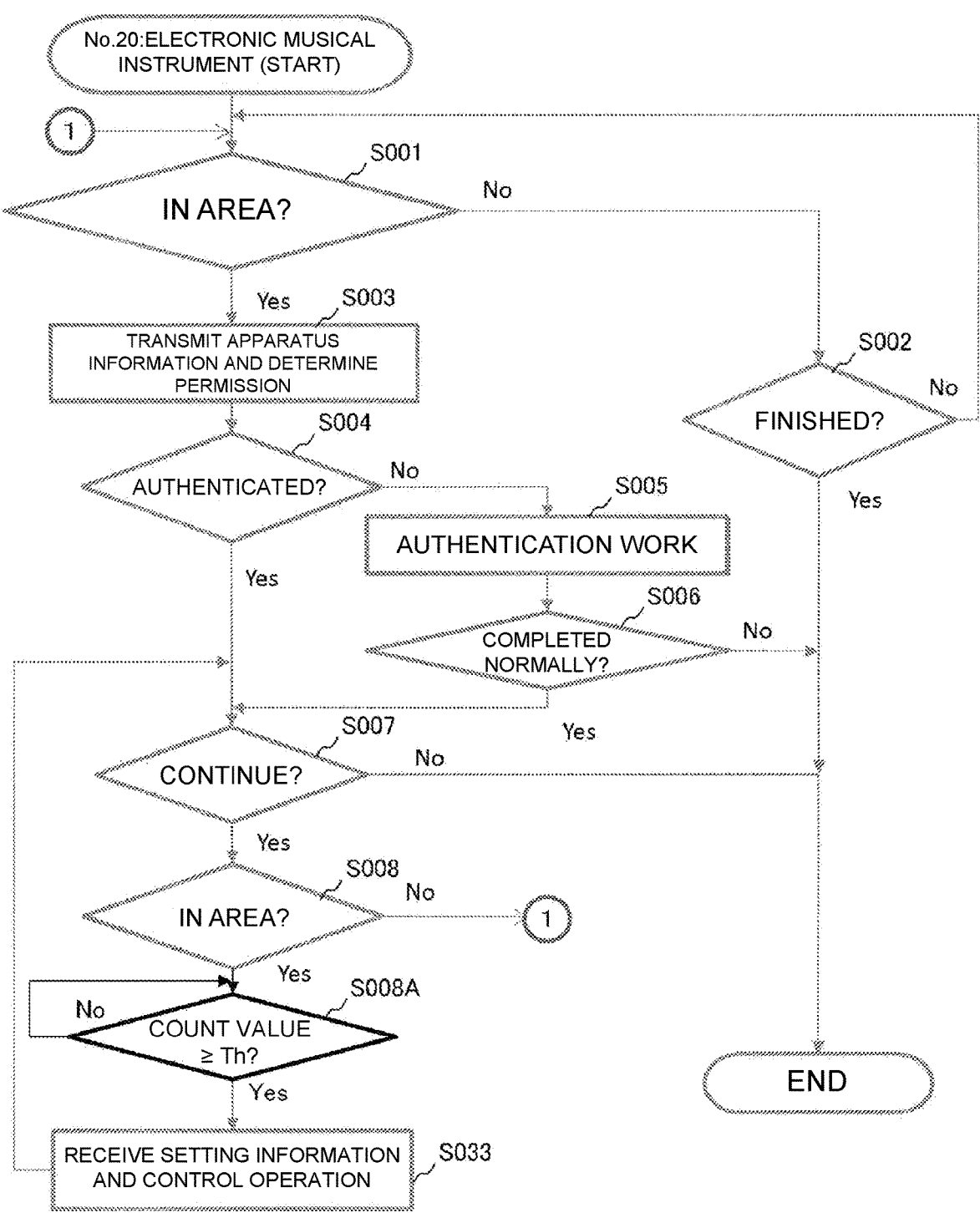

FIG. 31 is a flowchart illustrating a process example of the electronic musical instrument in an operation example 20.

Figure 32:
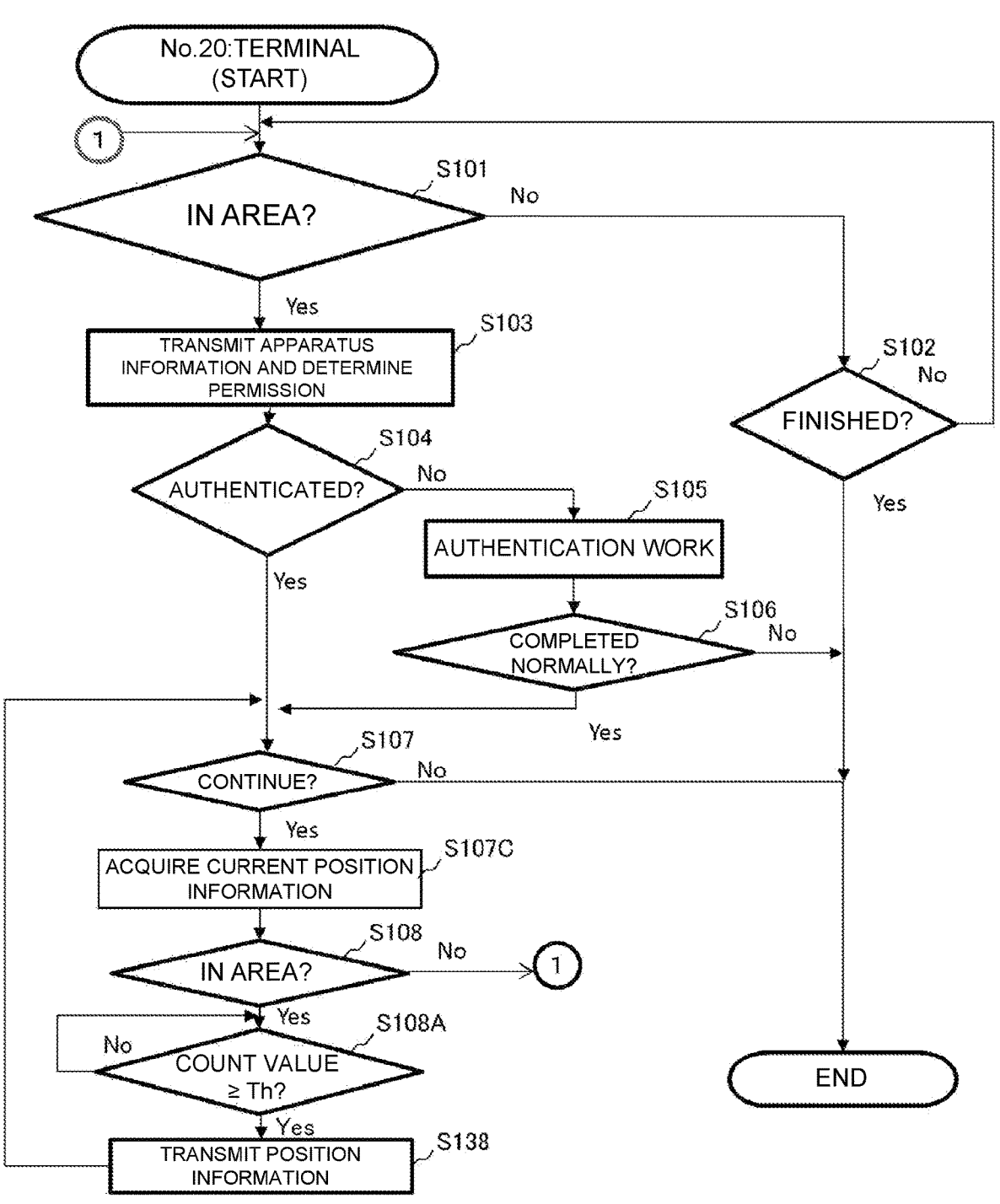

FIG. 32 is a flowchart illustrating a process example of the terminal in the operation example 20.

Figure 33:
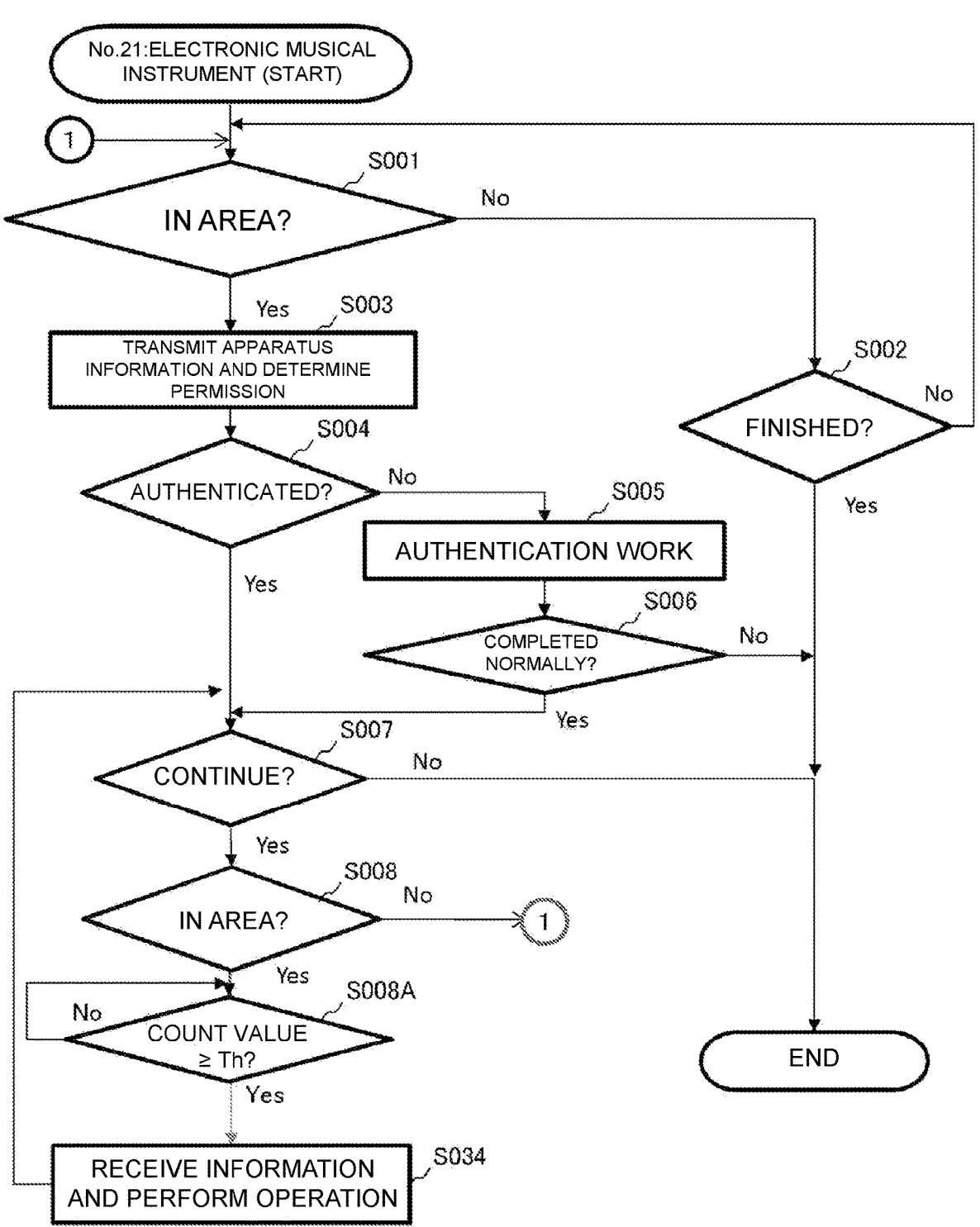

FIG. 33 is a flowchart illustrating a process example of the electronic musical instrument in an operation example 21.

Figure 34:
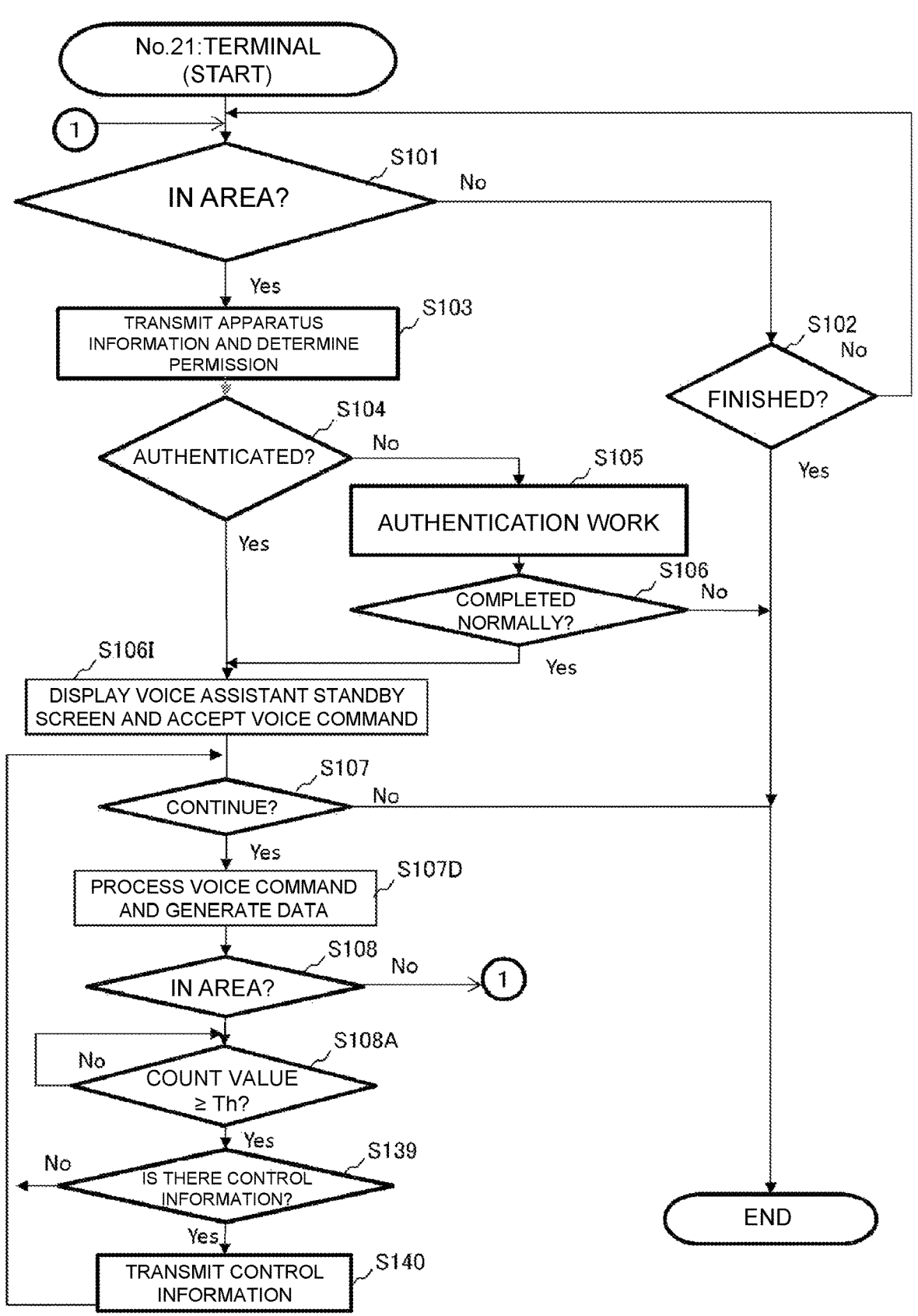

FIG. 34 is a flowchart illustrating a process example of the terminal in the operation example 21.

Figure 35:
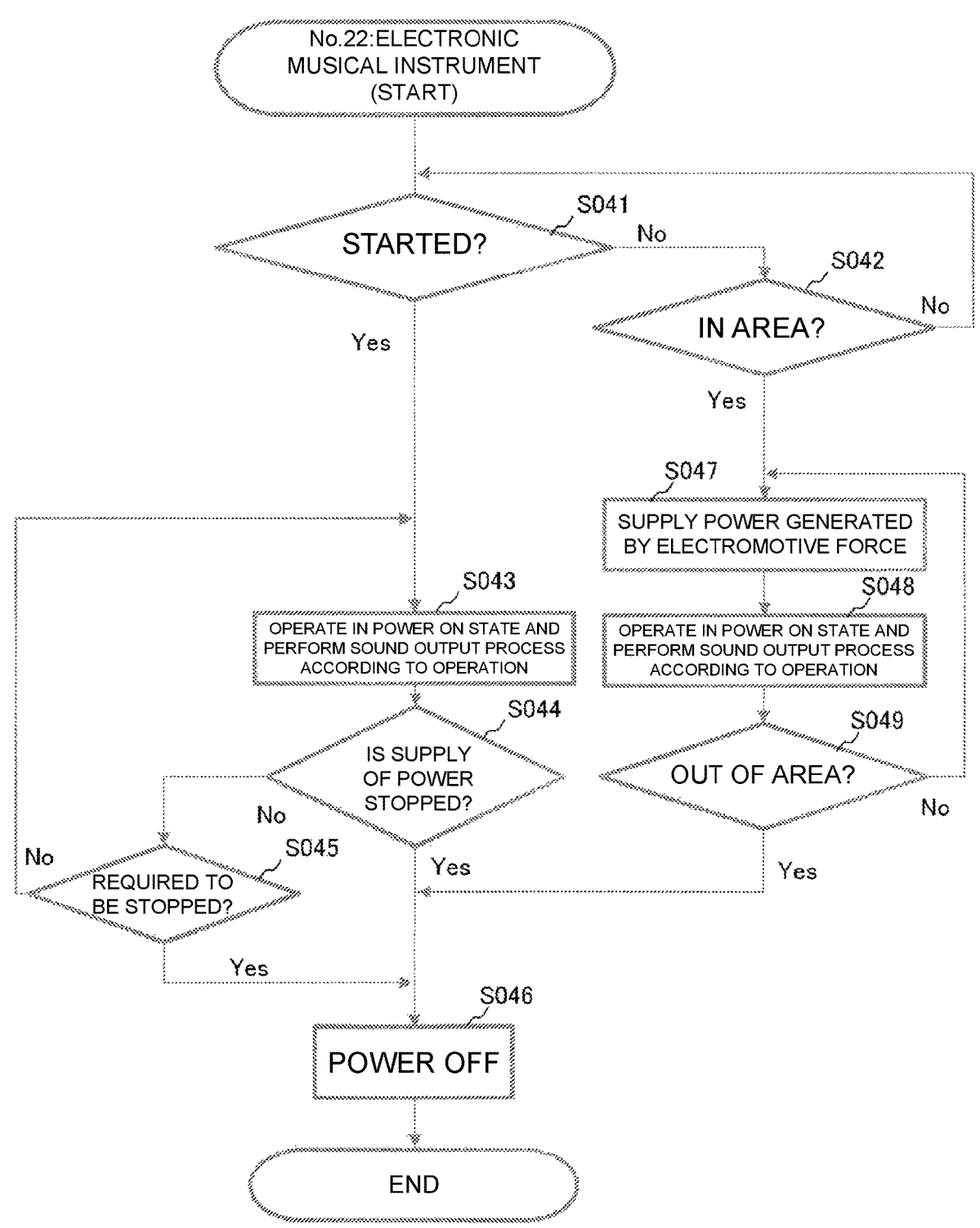

FIG. 35 is a flowchart illustrating a process example of the electronic musical instrument in an operation example 22.

Figure 36:
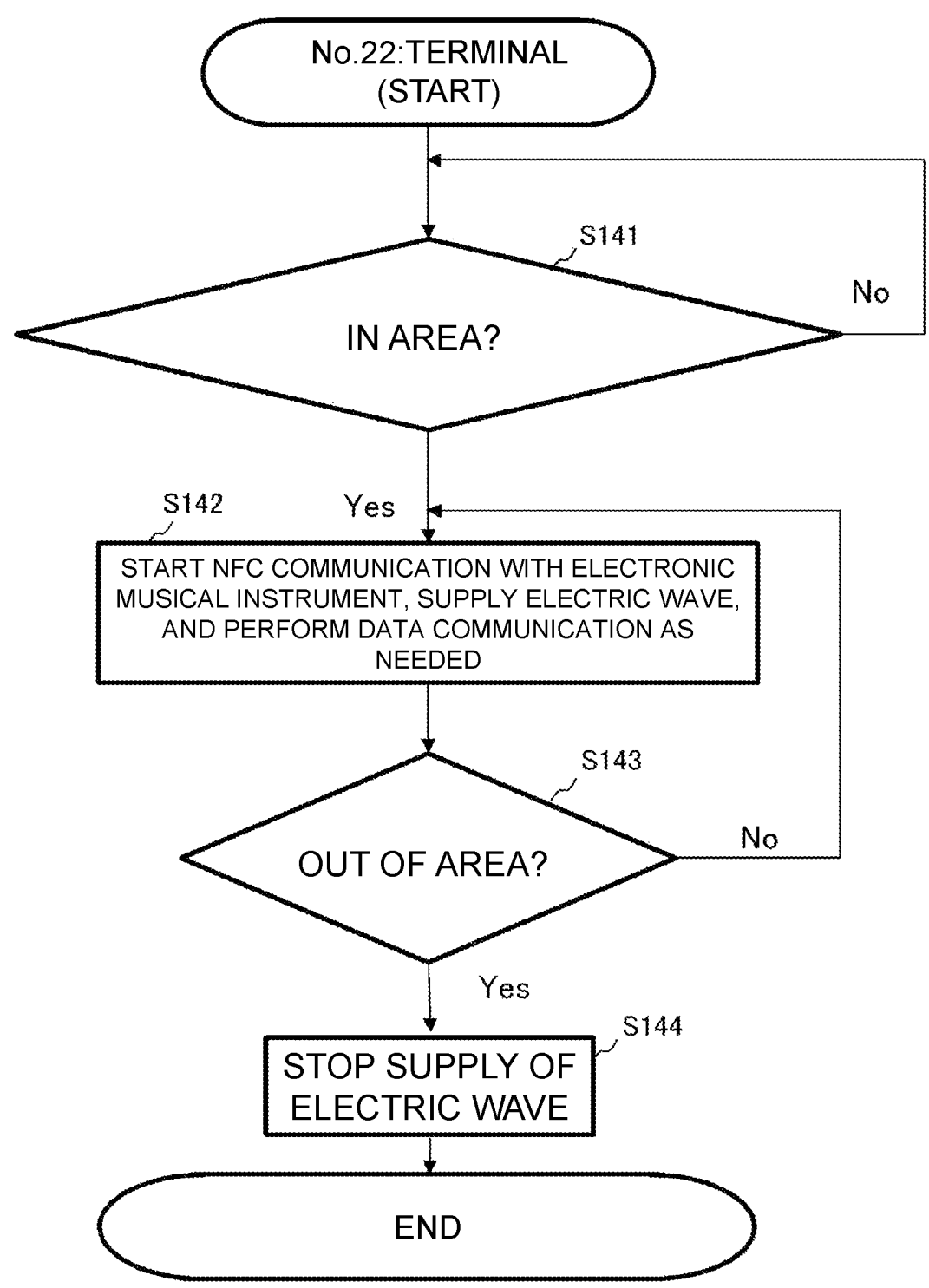

FIG. 36 is a flowchart illustrating a process example of the terminal in the operation example 22.

Figure 37:
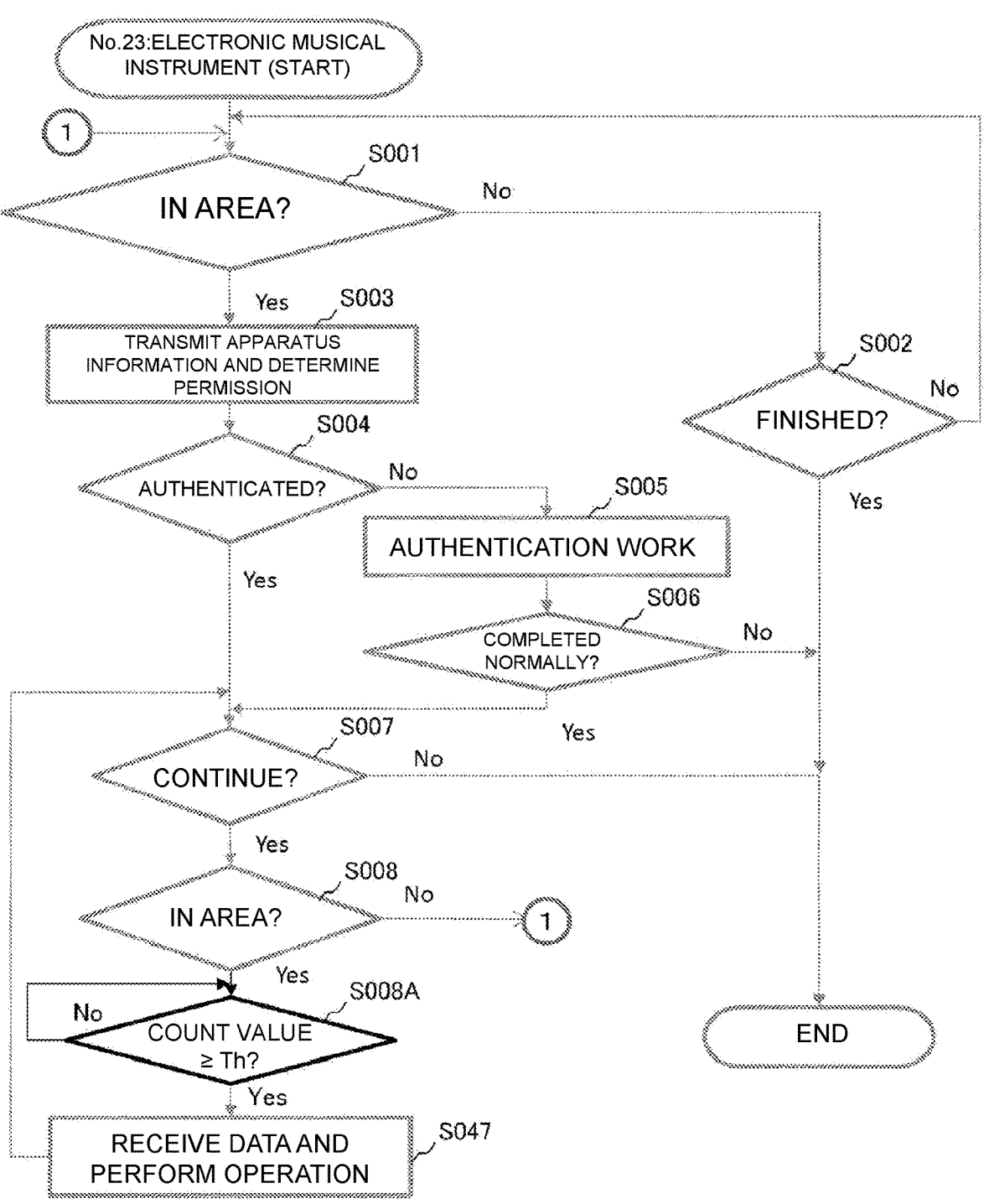

FIG. 37 is a flowchart illustrating a process example of the electronic musical instrument in an operation example 23.

Figure 38:
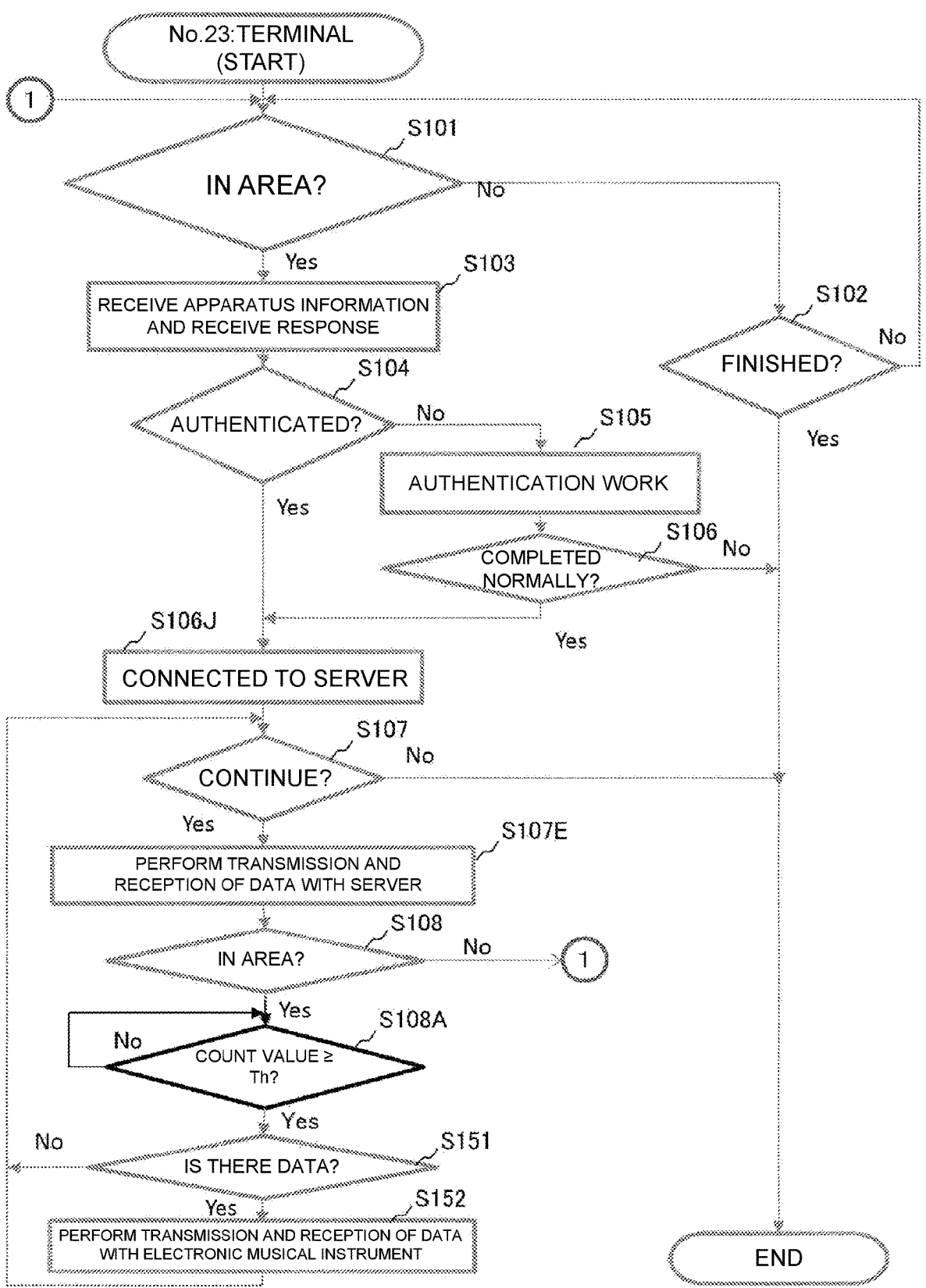

FIG. 38 is a flowchart illustrating a process example of the terminal in the operation example 23.

Figure 39:
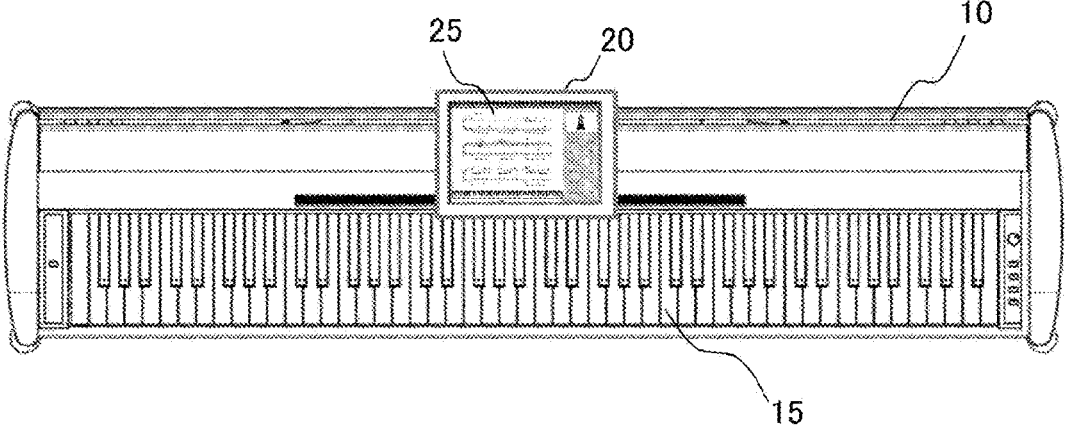

FIG. 39 illustrates Application Example 1.

Figure 40:
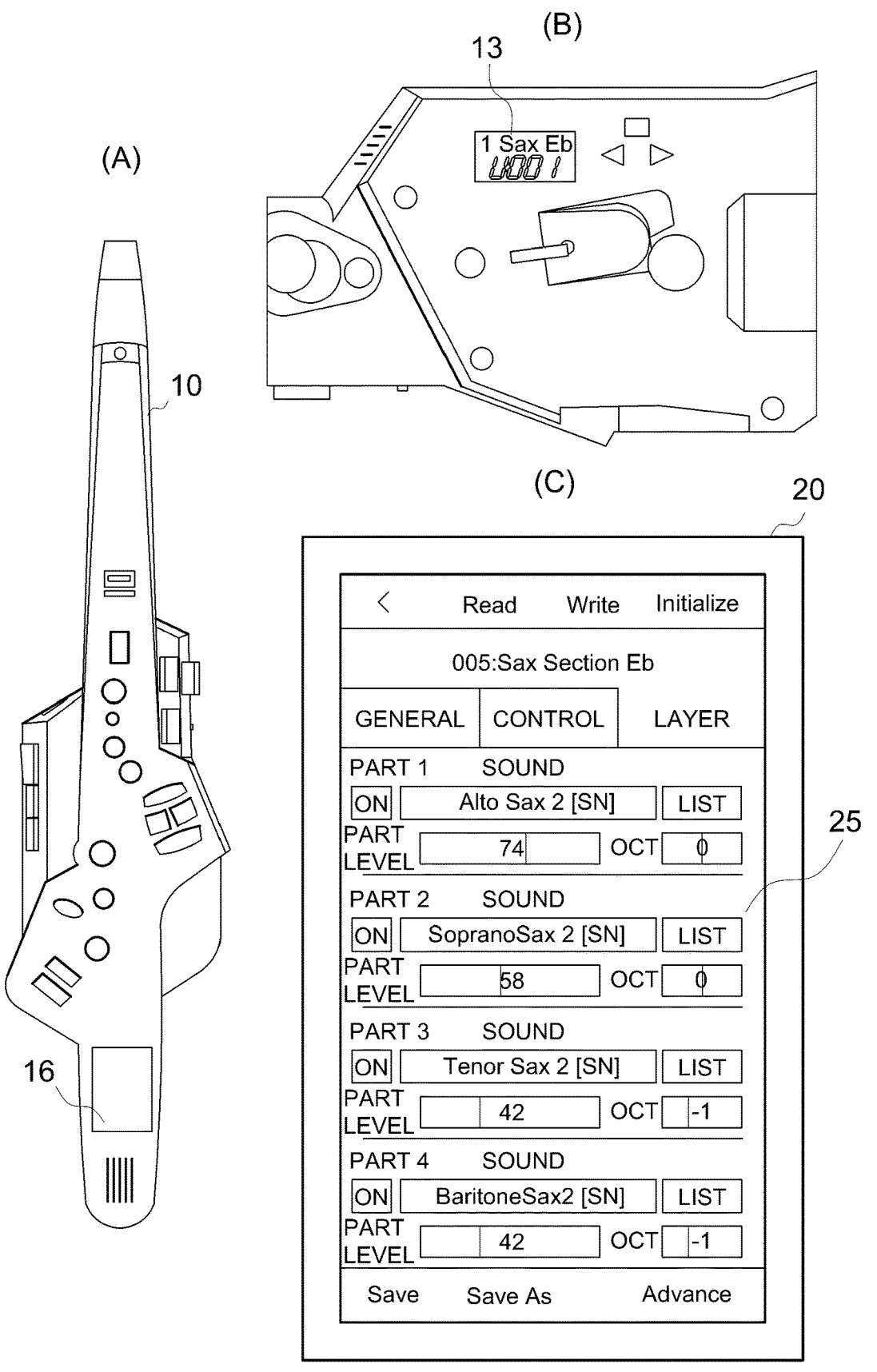

(A) of FIG. 40 illustrates Application Example 2. (B) of FIG. 40 is a partially enlarged view of a back surface in (A) of FIG. 40. (C) of FIG. 40 illustrates the terminal.

(A) of FIG. 41 illustrates Application Example 3. (B) of FIG. 41 illustrates the terminal.

Figure 42:
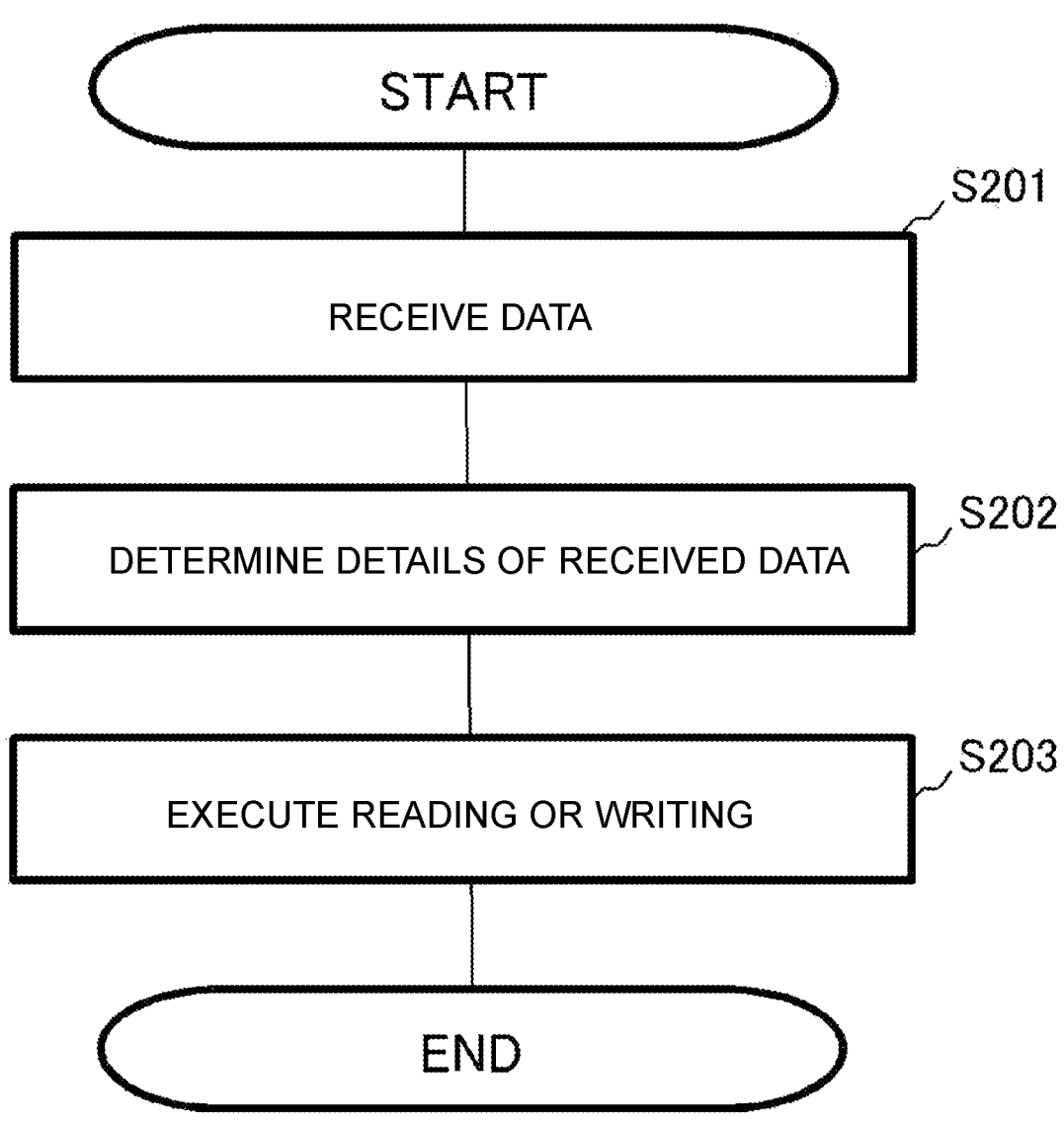

FIG. 42 is an explanatory diagram of an operation pattern 4.

Figure 43:
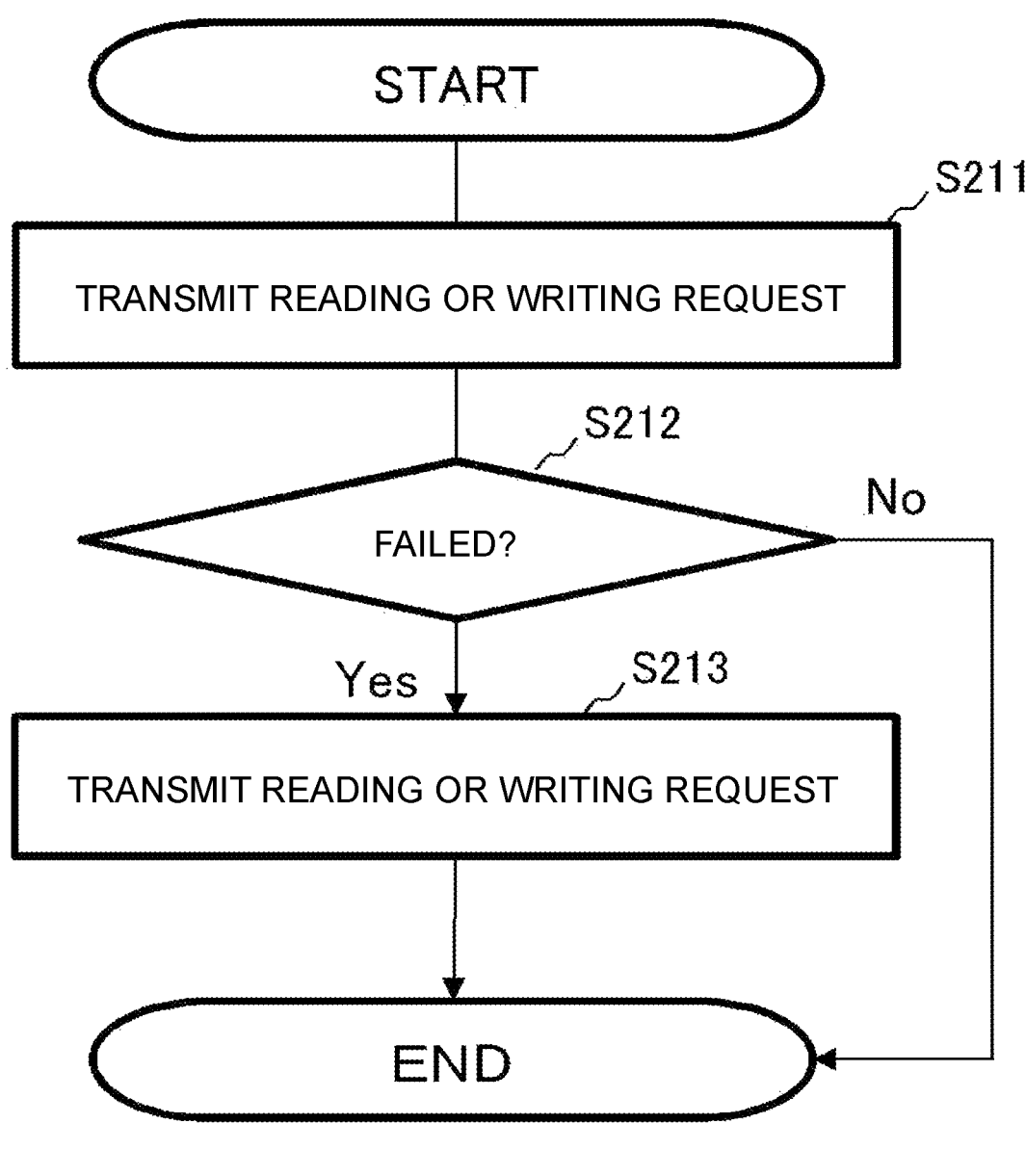

FIG. 43 is an explanatory diagram of operation patterns 5 and 6.

Figure 44:
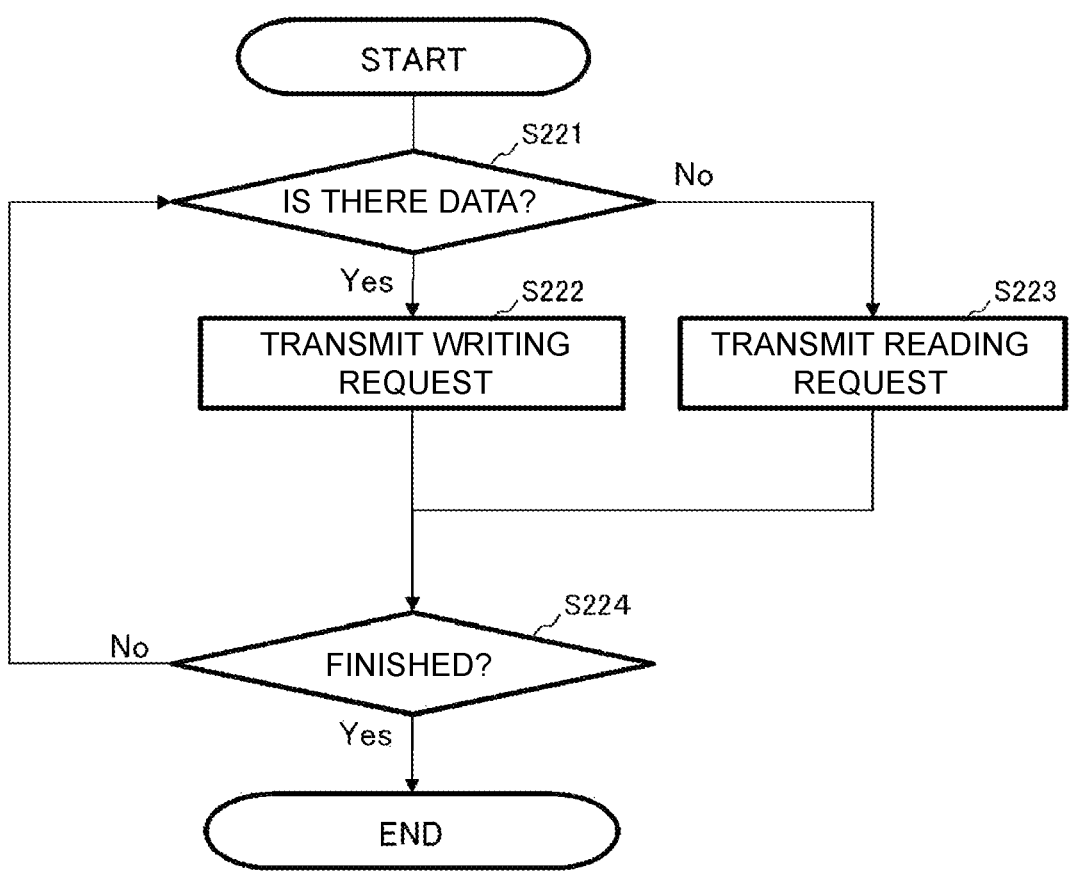

FIG. 44 is an explanatory diagram of an operation pattern 7.

Figure 45:
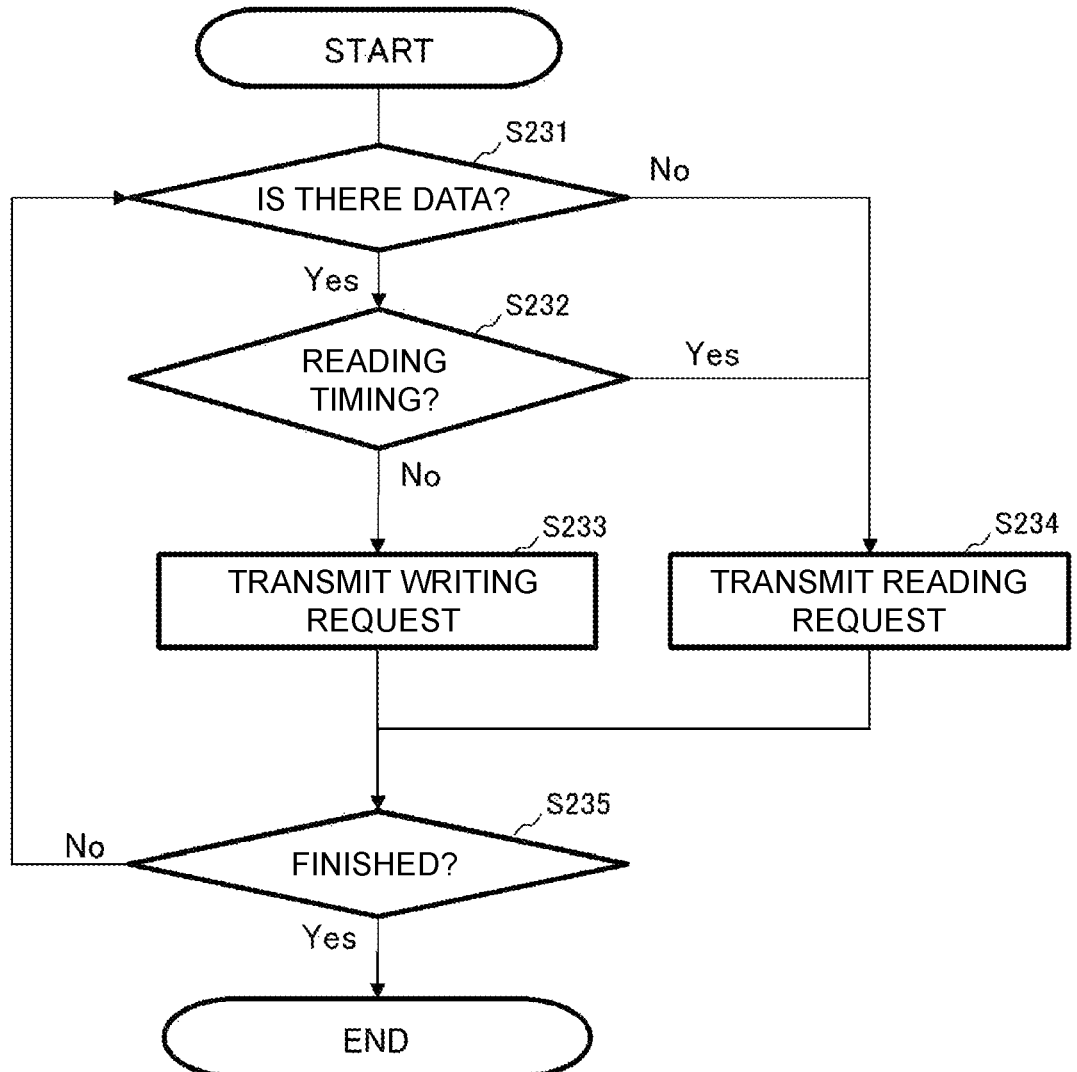

FIG. 45 is an explanatory diagram of an operation pattern 8.

Figure 46:
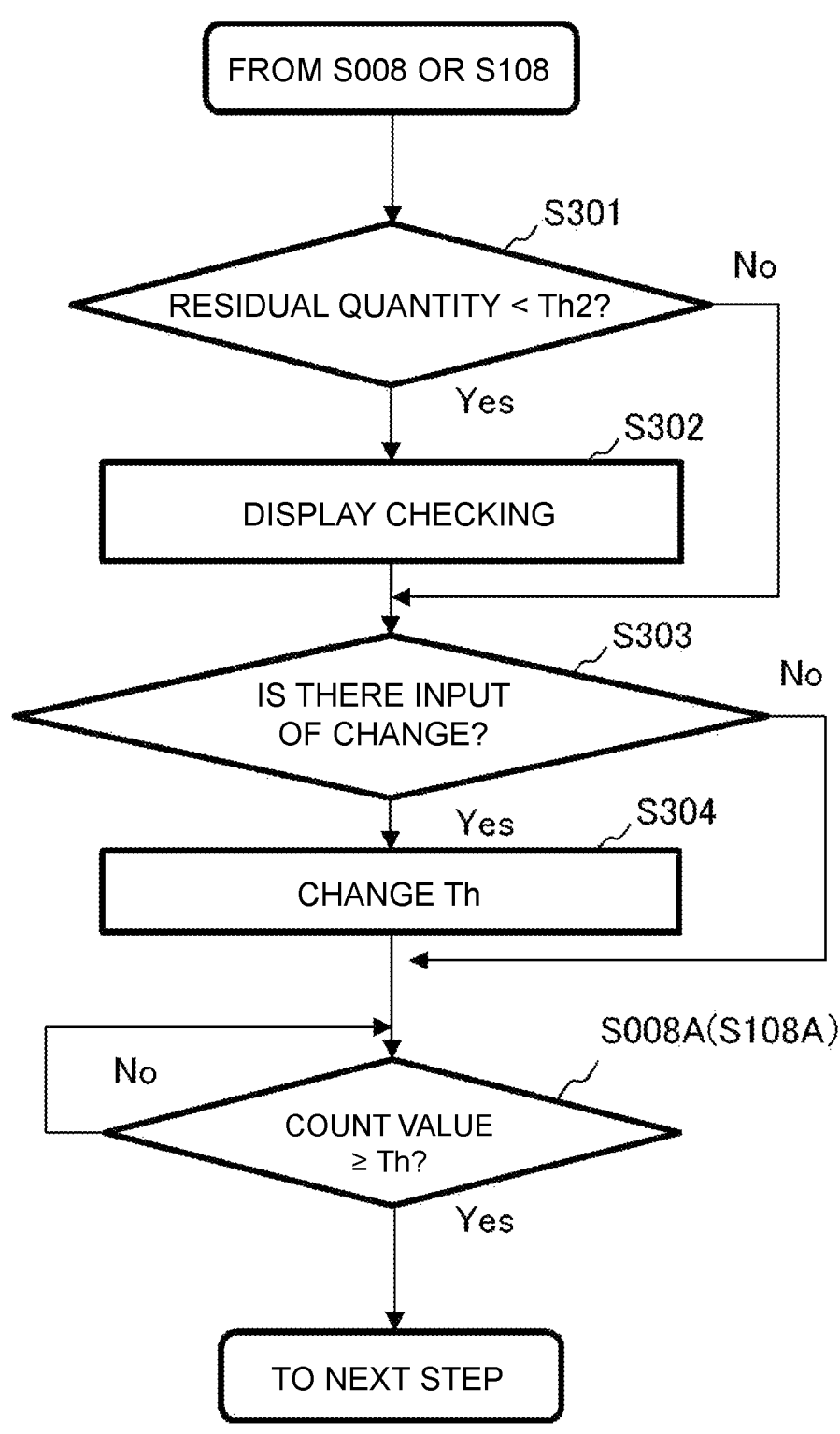

FIG. 46 illustrates an example of a process (changing the frequency of issuing a reading request) related to the operation pattern 8.

FIG. 47 illustrates an example of a table used for frequency change.

Figure 48:
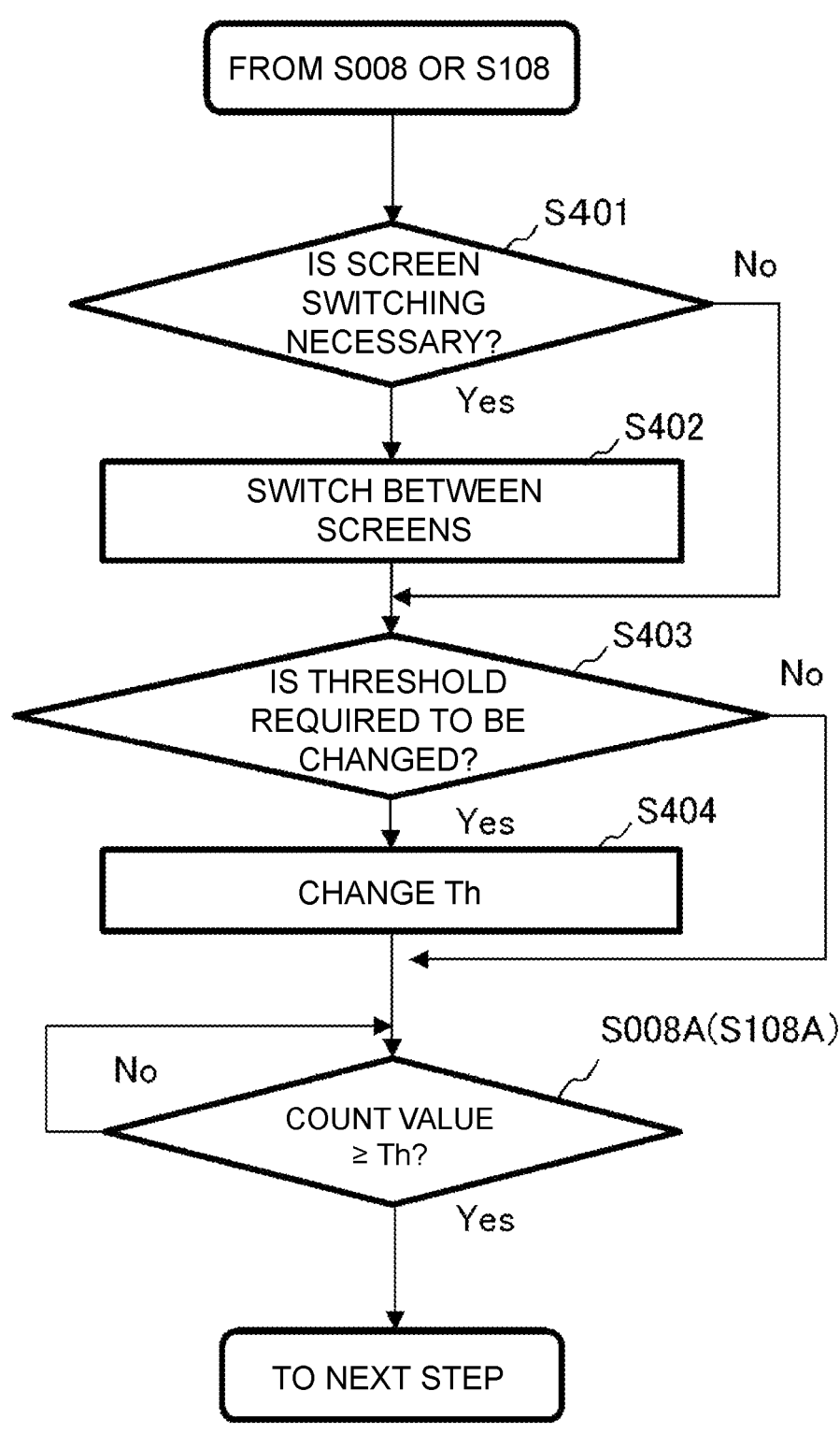

FIG. 48 is a flowchart illustrating a process example according to a second example of frequency change.

Figure 49:
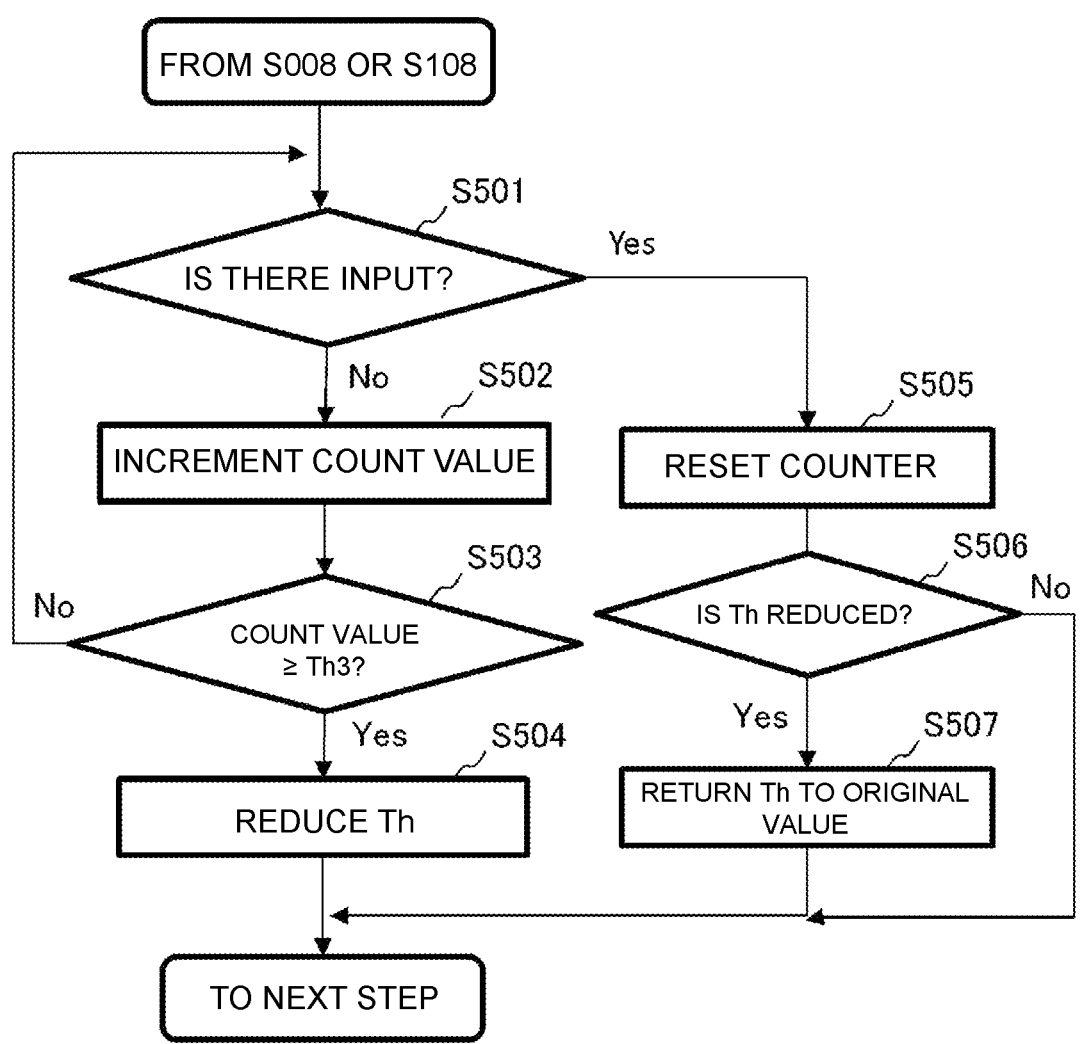

FIG. 49 is a flowchart illustrating a third example of changing the frequency of a reading request.

DESCRIPTION OF EMBODIMENTS

Regarding electronic musical instruments, it is desirable to install a wireless communication function in electronic musical instruments in order to improve the operability of the electronic musical instruments and expand applications (applicable to the electronic musical instruments) that the electronic musical instruments have. However, wireless communication techniques such as Bluetooth (registered trademark) and a wireless LAN require a prior connection process between apparatuses, which is complicated.

In the embodiment, an electronic musical instrument system capable of achieving the following objectives will be described. That is, in the embodiment, bidirectional data communication is realized between an electronic musical instrument and a terminal (for example, a smartphone) while utilizing the convenience of proximity communication, which is a feature of NFC, and improving a user's convenience. Consequently, performance information of the electronic musical instrument and apparatus settings (internal parameters) can be transmitted and received between the terminal and the electronic musical instrument in real time. In the electronic musical instrument system according to the embodiment, a user interface (an input device and a display) of the terminal can be used by using NFC communication for the electronic musical instrument having a small-sized operator or indicator. Consequently, it is possible to improve the operability of the electronic musical instrument.

In the embodiment, the following configurations will be described. For example, there is a configuration in which an electronic musical instrument has a function of performing short-range wireless communication to perform real-time data communication. For example, by using the short-range wireless communication, performance information (for example, control data for the electronic musical instrument: MIDI data) required for the electronic musical instrument can be transmitted and received between an electronic apparatus and a mobile terminal such as a smartphone. In the embodiment, a process of continuing transmission and reception of data generated in real time while keeping a short-range wireless communication terminal in close proximity will be described.

In the present specification, the term "short-range wireless communication" indicates wireless communication in a short range (several meters to several centimeters or less) performed according to communication standards such as NFC, FeliCa (registered trademark), and radio frequency identifier (RFID). However, wireless communication standards are not limited to the above examples. Wireless communication includes communication using a non-contact IC card, but this may be excluded. The following embodiment show examples of short-range wireless communication performed in accordance with NFC standards.

In order to include the above configuration, in the embodiment, the following information processing method will be described with respect to an electronic musical instrument system including an electronic musical instrument and a terminal capable of short-range wireless communication with the electronic musical instrument.

The information processing method includes (1) causing one of an electronic musical instrument and a terminal capable of short-range wireless communication with the electronic musical instrument to perform an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible, and (2) causing the other of the electronic musical instrument and the terminal to perform a process of transmitting corresponding data when the reading request is received, and perform a process of writing the writing target data when the writing target data and the writing request for the writing target data are received.

The predetermined pattern includes [1] repeating the transmission of the reading request of data, [2] repeating the transmission of the writing target data and the writing request for the writing target data, and [3] repeating the transmission of the reading request N times and the transmission of the writing request M times.

The operation pattern includes the following operation patterns <1> to <3> based on the above predetermined patterns [1] to [3].

<1> The transmission of the reading request of data is repeated. The number of times of repeating the transmission is an appropriate number of two or more.

<2> The transmission of the writing target data and the writing request therefor are repeated. The number of times of repeating the transmission is an appropriate number of two or more.

<3> The transmission of the reading request of data N times and the transmission of the writing target data and the writing request M times are alternately performed. N and M are integers of one or more. The number of times of alternately performed transmission may be set as appropriate.

The operation pattern may further include the following operation patterns <4> to <8>.

<4> One of the transmission of the reading request of data and the transmission of the writing target data and the writing request for the writing target data is performed according to details of data obtained by transmitting the reading request of data.

<5> The transmission of the reading request of data is performed in a case where a failure in communication using one of the transmission of the reading request of data and the transmission of the writing target data and the writing request for the writing target data is detected.

<6> The transmission of the writing target data and the writing request for the writing target data is performed in a case where a failure in communication using one of the transmission of the reading request of data and the transmission of the writing target data and the writing request for the writing target data is detected.

<7> The writing target data and the writing request for the writing target data are transmitted in a case where there is transmission target data, and the reading request of data is repeatedly transmitted in a case where there is no transmission target data.

<8> The reading request of data is transmitted at a predetermined timing during repeated transmission of the writing target data and the writing request for the writing target data in a case where there is transmission target data, and the reading request of data is repeatedly transmitted in a case where there is no transmission target data.

In the information processing method, a configuration may be employed in which the electronic musical instrument performs a predetermined process on the basis of control information received from the terminal. The electronic musical instrument may perform any process and operation according to the control information. With this configuration, the terminal can be used as an input device for the electronic musical instrument.

In the information processing method, a configuration may be employed in which the terminal performs a process of providing a user interface serving as a performance operator of the electronic musical instrument to a user, and transmits performance information obtained by operating the user interface to the electronic musical instrument, and the electronic musical instrument performs a predetermined process using the performance information received from the terminal. With this configuration, a performance operator of the electronic musical instrument can be expanded by using the terminal. The predetermined process using the performance information includes, but is not limited to, storage of the performance information, update of the performance information stored in the electronic musical instrument, output of a musical sound corresponding to the performance information, and the like.

In the information processing method, a configuration may be employed in which the terminal transmits control information for changing an appearance of the electronic musical instrument to the electronic musical instrument, and the electronic musical instrument performs a process of changing the appearance of the electronic musical instrument according to the control information received from the terminal. With this configuration, the appearance of the electronic device can be changed by operating the terminal.

In the information processing method, a configuration may be employed in which the terminal transmits authentication information of the terminal to the electronic musical instrument, and, in a case where the authentication information of the terminal is determined as being valid, the electronic musical instrument sets a predetermined function to be available while the electronic musical instrument and the terminal are in a state in which the short-range wireless communication is possible, and the electronic musical instrument sets the predetermined function to be unavailable in a case where the electronic musical instrument and the terminal are not in the state in which the short-range wireless communication is possible. With this configuration, it is possible to turn on and off a predetermined function (specific function) by controlling a distance between the terminal and the electronic musical instrument.

In the information processing method, a configuration may be employed in which the terminal transmits control information of the electronic musical instrument received via a network to the electronic musical instrument. With this configuration, it is possible to control an electronic apparatus by remotely controlling the terminal via the network.

In the information processing method, a configuration may be employed in which the terminal transmits time information included in the terminal to the electronic musical instrument. With this configuration, it is possible to give accurate time information to the electronic musical instrument and improve the accuracy of the function of the electronic musical instrument using the time information.

In the information processing method, a configuration may be employed in which an amount of change in a sensor value detected by a sensor of the terminal per unit time, or control information based on the amount of change is transmitted to the electronic musical instrument. With this configuration, it is possible to control an operation of the electronic musical instrument by changing a position or an inclination of the terminal such that an amount of change of the sensor of the terminal is changed. The control information may be information for controlling an operation or a process of the electronic musical instrument, or may be performance information based on which the electronic musical instrument outputs a musical sound.

In the information processing method, position information detected by the terminal may be transmitted to the electronic musical instrument, and the electronic musical instrument may perform a process of changing a state of the electronic musical instrument to a state corresponding to a destination associated with the position information. With this configuration, a state of the electronic musical instrument can be changed to a state corresponding to a destination according to a simple method.

In the information processing method, a configuration may be employed in which the terminal transmits control information of the electronic musical instrument acquired through voice input to the electronic musical instrument. With this configuration, it is possible to achieve an effect similar to that of substantially imparting a voice operation function to the electronic musical instrument.

In the information processing method, a configuration may be employed in which the electronic musical instrument performs a predetermined process by using an electromotive force generated by an electric wave of the writing request or the reading request as a power source. With this configuration, for example, in a case where the electronic musical instrument is operated with a battery, it is possible to reduce an amount of battery power consumed. Alternatively, it is possible to operate an apparatus that has not started a power source or does not have a power supply function.

In the information processing method, a configuration may be employed in which the terminal receives information indicating a state of the electronic musical instrument from the electronic musical instrument and displays the information on a display device. With this configuration, for example, in a case where the electronic musical instrument does not have a display device, a user can refer to the information indicating a state of the electronic musical instrument.

In the information processing method, a configuration may be employed in which the terminal receives performance information from the electronic musical instrument and displays musical score information corresponding to the performance information on a display device. With this configuration, a user can refer to a musical score of a musical piece by displaying the musical score on a display device of the terminal when playing the electronic musical instrument.

In the information processing method, a configuration may be employed in which the terminal receives performance information from the electronic musical instrument and outputs a musical sound corresponding to the performance information. With this configuration, it is possible to listen to musical sounds based on performance information from an electronic apparatus that does not have a sound source.

In the information processing method, a configuration may be employed in which the terminal receives performance information from the electronic musical instrument and displays information for evaluating a performance specified by the performance information on a display device. With this configuration, a lesson can be taken by referring to information evaluated by a user.

In the information processing method, a configuration may be employed in which the terminal receives information indicating firmware installed in the electronic musical instrument from the electronic musical instrument, and displays information indicating whether or not the firmware of the electronic musical instrument is required to be updated on the basis of information indicating latest firmware on a display device. With this configuration, it becomes easier to update the firmware of the electronic musical instrument to the latest version.

In the information processing method, a configuration may be employed in which the terminal receives information related to an operation of the electronic musical instrument from the electronic musical instrument, and displays information associated with the information related to the operation and for supporting the operation of the electronic musical instrument on a display device. With this configuration, it is possible to improve the operability of the terminal, such as a user being able to avoid an erroneous operation on the terminal by referring to the information for supporting the operation. The support information may be anything as long as it helps a user, and may be information indicating a procedure or information indicating a corresponding page of an instruction manual.

In the information processing method, a configuration may be employed in which the terminal receives information related to an operation of the electronic musical instrument from the electronic musical instrument, and performs an operation associated with the information related to the operation of the electronic musical instrument on a camera of the terminal. With this configuration, it is possible to control a camera of the terminal by operating the electronic musical instrument.

In the information processing method, a configuration may be employed in which the terminal edits data received from the electronic musical instrument and transmits the edited data to the electronic musical instrument. With this configuration, information with appropriate details can be returned to the electronic musical instrument.

In the information processing method, a configuration may be employed in which the electronic musical instrument edits data received from the terminal and transmits the edited data to the terminal. With this configuration, it is possible to display more optimized information on a display device of the terminal.

In the information processing method, a configuration may be employed in which the terminal changes a frequency of issuing the reading request on the basis of a remaining amount of power of a battery of the terminal. Consequently, it is possible to reduce power consumption and make effective use of the battery.

In the information processing method, a configuration may be employed in which the terminal changes a frequency of issuing the reading request according to switching between screens displayed by the terminal. Consequently, the frequency of issuance for reading can be set to a frequency according to a function or a service provided via the screen, and power saving can be achieved.

In the information processing method, a configuration may be employed in which the terminal changes a frequency of issuing the reading request according to a period of non-input to the terminal. With this configuration, it is possible to avoid unnecessary data reading during the non-input period and reduce power consumption.

In the information processing method, it is preferable to employ a configuration in which the electronic musical instrument transmits data to the terminal by using energy of an electric wave received from the terminal. With this configuration, it is possible to avoid handling the electronic musical instrument as a wireless transmission device.

Hereinafter, an information processing method and an electronic musical instrument according to an embodiment will be described with reference to the drawings. The configuration of the embodiment is an example, and the present invention is not limited to the configuration of the embodiment.

<Configuration of Information Processing System>

Figure 1:
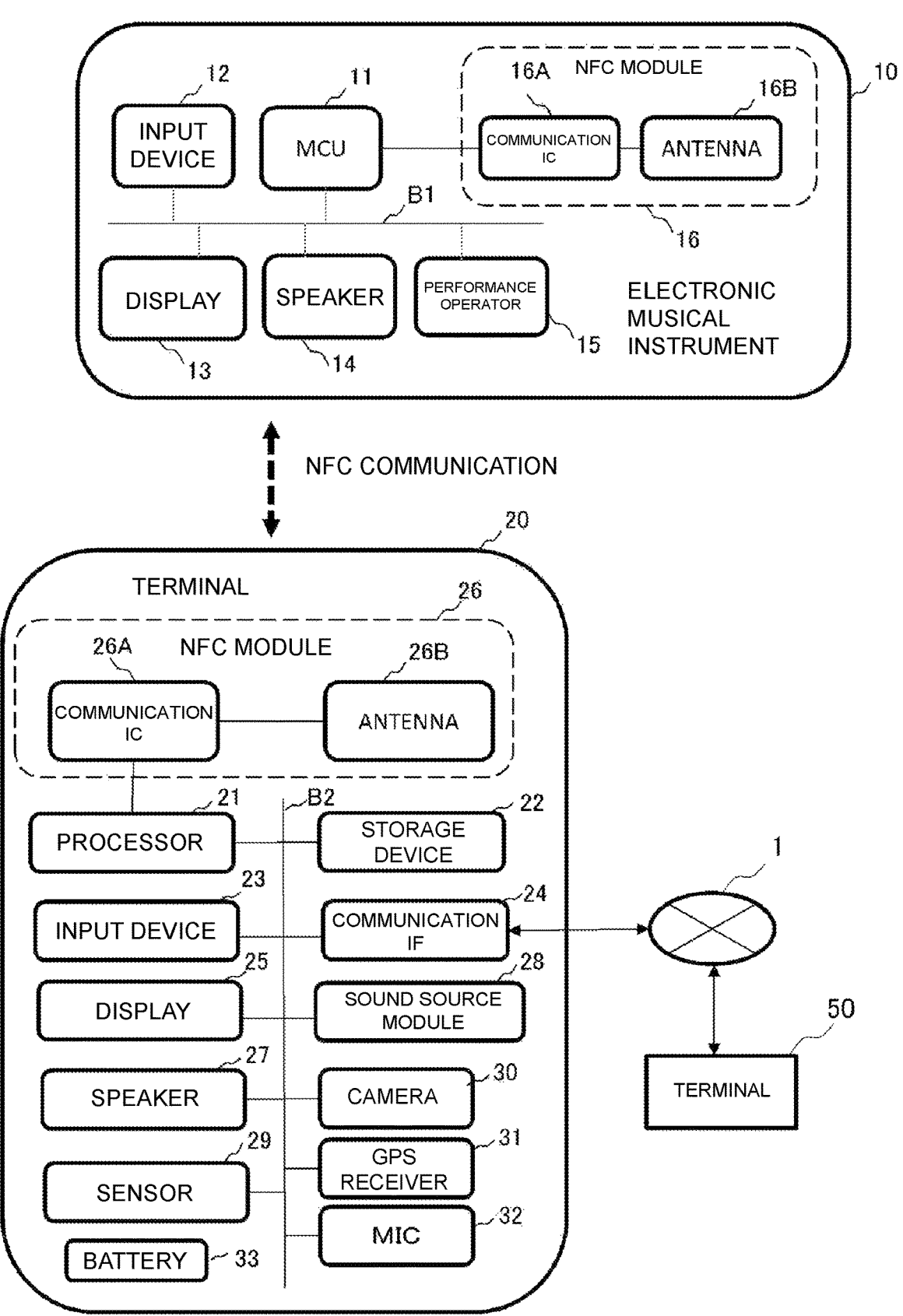
FIG. 1 illustrates an example of an information processing system according to an embodiment.

FIG. 1 illustrates an example of an information processing system (electronic musical instrument system) according to an embodiment. The information processing system includes an electronic musical instrument 10 and a terminal 20 that performs NFC communication (an example of short-range wireless communication) with the electronic musical instrument 10.

The electronic musical instrument 10 is any of various types of electronic musical instruments that imitate, for example, keyboard instruments (a piano, an organ, a synthesizer, and the like), percussion instruments (a drum and the like), stringed instruments (a guitar, a violin, and the like), and wind instruments (a saxophone and the like). The types of electronic musical instruments are not limited to the above examples.

The electronic musical instrument 10 includes a micro control unit (MCU) 11 as a processing unit, an input device 12, a display 13, a speaker 14, and a performance operator 15 which are connected to a bus B1. An NFC module 16 is connected to the MCU 11. The NFC module 16 is an example of a communication unit, and includes a communication integrated circuit (IC) 16A and an antenna 16B. The NFC module 16 may be connected to the MCU 11 via the bus B1.

The MCU 11 is configured by a combination of a processor (a central processing unit (CPU), or the like) controlling the electronic musical instrument 10, a storage device (a ROM, a RAM, a hard disk, or the like), an integrated circuit (an application specific integrated circuit (ASIC), a field programmable gate array (FPGA), or the like). The processor performs various processes by executing a program stored in the storage device. In the present embodiment, the description will be made assuming that the MCU 11 includes a circuit configuring a sound source module (synthesizer). The sound source module may be handled as a component different from the MCU 11. There is a case where the electronic musical instrument 10 needs not include a sound source module.

The input device 12 is a key, a button, a switch, or the like for performing various operations on the electronic musical instrument 10. The display 13 displays information. The speaker 14 outputs musical sounds based on a musical sound (audio) signal. The musical sounds include musical instrument sounds, human or animal sounds (voices), and sounds other than musical instrument sounds and voices. The performance operator 15 is a keyboard, a striking surface, a piston, or the like that a user of the electronic musical instrument 10 operates for playing. The MCU 11 generates performance data (for example, MIDI data) according to an operation of the performance operator. The MIDI data includes a plurality of performance parameters. The performance data is stored in the storage device included in the MCU 11. The storage device may be provided outside the MCU 11.

MCU11 generates a musical sound signal based on the MIDI data by using the sound source module. The musical sound signal may be generated through software processing by executing a program or through hardware processing of a circuit. A voice corresponding to the musical sound signal is output from the speaker 14. The MCU 11 displays, on the display 13, information input by the input device 12, an operation result, and information related to performance such as performance parameters based on MIDI. The display 13 is not an essential constitute of the electronic musical instrument 10. The display 13 may be such a simple display that displays only predetermined characters using an LCD.

A communication IC 16A of the NFC module 16 performs communication control according to the NFC communication standard. The communication IC 16A includes an NFC tag device. The NFC tag device has a data storage area (memory), and in a case where the antenna 16B receives an electric wave for a reading command, the NFC tag device reads out data stored in a built-in memory of the NFC tag device. The data is transmitted, for example, on a reflected wave of the electric wave for the reading command. In a case where the antenna 16B receives data and an electric wave for a data writing command, the NFC tag device of the communication IC 16A writes (stores) the received data in the built-in memory or sends the received data to the MCU 11.

The terminal 20 is a terminal device capable of performing NFC communication with the electronic musical instrument 10, such as a smart device such as a smartphone or a tablet terminal, or a personal computer (PC). The terminal 20 is not limited to the above example. The terminal 20 may be a stationary terminal.

The terminal 20 includes a processor 21, a storage device 22, an input device 23, a communication interface (communication IF) 24, a display 25, an NFC module 26, a speaker 27, a sound source module (synthesizer) 28, and a sensor 29, a camera 30, a GPS receiver 31, and a microphone (MIC) 32 which are connected to a bus B2. A battery 33 is mounted on the terminal 20, and each constituent of the terminal 20 described above can be operated by using electric power supplied from the battery 33.

The processor 21 is a CPU or the like, and executes a program stored in the storage device 22 to perform a predetermined process. The storage device 22 includes a main storage device (a RAM and a ROM) and an auxiliary storage device (a hard disk, an SSD, and the like). The main storage device is used as a storage area for data and programs, a work area of the processor 21, and a buffer area for communication data. The auxiliary storage device is used to store data and programs.

The communication IF 24 has a communication function according to a predetermined wireless communication standard. The wireless communication standard is LTE, wireless LAN (Wi-Fi), Bluetooth (registered trademark), BLE, Zigbee, or the like, and the terminal 20 may have a communication IF supporting two or more of these standards. However, the wireless communication standard is not limited to these.

The input device 23 is a key, a button, a switch, a touch panel, and the like used for inputting information. The display 25 displays information. The speaker 27 outputs sound. The sound source module 28 generates a musical sound signal based on performance data (performance parameters) such as MIDI data. The sensor 29 has at least one such as an acceleration sensor, a gyro sensor, and a geomagnetic sensor, and detects a predetermined physical quantity. The camera 30 captures an image of a subject. The GPS receiver 31 receives electric waves from GPS satellites and detects position information. The MIC 32 is used for voice input.

The NFC module 26 includes a communication IC 26A and an antenna 26B. The communication IC 26A performs communication control according to the NFC communication standard. The communication IC 26A includes an NFC reader/writer device. The NFC reader/writer device sends an electric wave for a command for reading data from the NFC tag device or a command for writing data into the NFC tag device via the antenna 26B according to an instruction from the processor 21 (application). The NFC reader/writer device passes data received via the antenna 26B to the processor 21. A reading request or a writing request is repeatedly transmitted while the terminal 20 and the electronic musical instrument 10 are in a state in which NFC communication is possible (the NFC module 16 is in a positional relationship or an environment in which electric waves from the NFC module 26 can be received). The transmission frequency is set according to, for example, a size or an attribute of data as appropriate. By repeatedly transmitting such a reading request or a writing request, data larger than a storage capacity of an NFC tag chip can be transmitted from the MCU 11 to the terminal 20 via the NFC module 16 or sent from the terminal 20 to the NFC module 16. In NFC communication between the electronic musical instrument 10 and the terminal 20, operations according to the above operation patterns <1> to <8> may be performed.

The electronic musical instrument 10 and the terminal 20 can perform bidirectional communication by using the NFC communication. As an example, the NFC module 16 (NFC tag device) is a passive type module (passive tag), and passes data to be transmitted to the NFC module by using energy supplied from the NFC module 26 (NFC reader/ writer). In other words, the NFC tag device receives an electric wave from the reader/writer so as to be driven, and transmits the data to the reader/writer side by carrying the transmission target data on a reflected wave of the electric wave. However, a passive type communication method may be an electromagnetic coupling method, an electromagnetic induction method, or an electric wave method.

In the above description, the configuration has been described in which the electronic musical instrument 10 operates as an NFC tag (passive tag) and the terminal 20 operates as an NFC reader/writer. The example has been described in which the terminal 20 transmits a reading request to the electronic musical instrument 10, and the electronic musical instrument transmits data corresponding to the reading request to the terminal 20. The example has been described in which the terminal 20 sends writing target data and a writing request therefor to the electronic musical instrument, and thus the data is transmitted from the terminal 20 to the electronic musical instrument 10. However, the communication IC 16 of the electronic musical instrument 10 may have an NFC reader/writer device, and the communication IC 26 of the terminal 20 may have an NFC tag device to perform NFC communication based on a reading/ writing command from the electronic musical instrument 10. In other words, the communication unit (NFC module 16) that performs short-range wireless communication of the electronic musical instrument 10 may include a passive tag or an active tag or a semi-active tag, but is preferably configured to include a passive tag. In other words, it is preferable to employ a configuration in which the electronic musical instrument 10 transmits data to the terminal 20 by using energy of an electric wave received from the terminal 20.

As illustrated in FIG. 1, in the electronic musical instrument 10, the communication IC 16A of the NFC module is connected to the MCU 11, and the communication IC 16A transmits, via the antenna 16B, data provided from the MCU 11. The data may be data stored in a memory accessible by the communication IC 16A and directly acquired by the communication IC 16A. Alternatively, a configuration may be employed in which the data is managed by the MCU 11 and acquired by the communication IC 16A via the MCU 11 (the communication IC 16A requests the MCU 11 to provide the data and receives the data supplied from the MCU 11). In the terminal 20, the data received by the communication IC 26A via the antenna 26B of the NFC module 26 may be sent to the processor 21. It may also be possible to transmit and receive data in the opposite direction to the above.

In other words, data included in an apparatus (the electronic musical instrument 10 or the terminal 20) can be transmitted to the other apparatus by using NFC communication. The transmission target data is data generated in real time by the apparatus, data read from a storage device managed by the apparatus, data acquired by the apparatus from outside of the apparatus, or the like. The transmission target data is data related to the electronic musical instrument 10 (musical instrument-related data). The musical instrument-related data includes, for example, parameters for setting a state of the electronic musical instrument 10 (parameters indicating the settings applied to the electronic musical instrument 10: setting parameters), performance information, and the like. The performance information is, for example, MIDI data. The setting parameters include, for example, MIDI implementation parameters and data (also referred to as configuration data) for setting a plurality of functions (menus) of the electronic musical instrument 10. The musical instrument-related data may be unique data for one electronic musical instrument 10 or common data for a plurality of electronic musical instruments 10.

OPERATION EXAMPLES

Hereinafter, operation examples of the electronic musical instrument system will be described. FIG. 2 is a table illustrating a list of processes (functions that can be provided) that can be executed by the electronic musical instrument system. Item numbers (Nos.) 1 to 4 are processes belonging to "basic". Item numbers (Nos.) 5 to 23 are processes belonging to "application" using an application program executed by the terminal 20. The association number indicates a number of the "basic" function associated with the "application". An operation example corresponding to an item number will be described below.

Operation Example 1

(A) of FIG. 3 is a sequence diagram illustrating an operation example (operation example 1) corresponding to item No. 1 in the table. The operation example 1 is an operation example in which unique data of the electronic musical instrument 10 (apparatus) is reflected in the electronic musical instrument 10. In (A) of FIG. 3, when the NFC module 26 (communication IC 26A) of the terminal 20 establishes an NFC communication link with the NFC module 16 (communication IC 16A) of the electronic musical instrument 10, unique data of the electronic musical instrument 10 is transmitted via the antenna 26B to the electronic musical instrument 10 (S1). This transmission is performed, for example, by the NFC module 26 transmitting unique data and a writing command (writing request). However, data reception of the electronic musical instrument 10 may be performed by the NFC module 16 transmitting a reading command to the terminal 20. The transmission of the unique data and the writing request, or the transmission of the reading command (S1) may be repeated two or more times (operation pattern <1> or <2>).

In the NFC module 16, the communication IC 16A passes the unique data received via the antenna 16B to the MCU 11. The MCU 11 performs a process of reflecting the unique data (S2). For example, when the unique data is performance information (MIDI data), the MCU 11 controls generation of musical sound data and output of musical sounds based on the MIDI data. Alternatively, when the unique data is a parameter used for setting a state of the electronic musical instrument 10, the MCU 11 performs parameter setting. According to the operation example 1, the unique data is sent from the terminal 20 to the electronic musical instrument 10 by using the NFC communication, and the electronic musical instrument 10 reflects the unique data. The reflection of the unique data may be performed automatically by the MCU 11 or may be performed by a user operation.

Operation Example 2

An operation example 2 relates to an operation example in which the terminal 20 receives unique data of the apparatus from the electronic musical instrument 10. (B) of FIG. 3 is a sequence diagram illustrating an operation example (operation example 2) corresponding to item No. 2 in the table. In (B) of FIG. 3, when the NFC module 16 of the electronic musical instrument 10 establishes an NFC communication link with the NFC module 26 of the terminal 20, the NFC module 16 transmits unique data of the electronic musical instrument 10 to the terminal 20 (S11). This transmission may be performed by receiving a reading command (reading request) for the unique data from the NFC module 26, or may be performed by transmitting a writing request for the unique data to the NFC module 26. The operation in S11 may be performed by repeating the reading request or the writing request two or more times (operation pattern <1> or <2>).

In the terminal 20, the processor 21 receives the unique data via the NFC module 26 and performs a predetermined process at the time of reception (S12).

The process at the time of reception includes a process of simply storing the unique data in the storage device 22, a process of displaying the unique data on the display 25, a process of reproducing performance based on the unique data, and the like. The processes in S11 and S12 in the operation example 1 may be repeated.

Operation Example 3

(A) of FIG. 4 is a sequence diagram illustrating an operation example (operation example 3) corresponding to item No. 3 in the table. In (A) of FIG. 4, unique data is transmitted from the electronic musical instrument 10 to the terminal 20 according to the same method (NFC communication) as in S11 ((B) of FIG. 3) (S21).

In S22, the processor 21 that has received the unique data received by the NFC module 26 performs a process of editing the unique data. For example, the processor 21 displays the unique data and a user interface (UI) that is an editing environment for the unique data on the display 25, and accepts editing information for the unique data input by using the input device 23. Consequently, the unique data (for example, performance information (MIDI data)) can be acquired from the electronic musical instrument 10 and edited by the terminal 20. The editing may be performed by the processor 21 according to a predetermined automatic editing algorithm.

When the editing process is finished, the processor 21 passes the edited unique data to the NFC module 26, and the NFC module 26 transmits the edited unique data to the electronic musical instrument 10 together with a writing command therefor (S23). The process in S23 is the same as the process in S1 in (A) of FIG. 3. In the electronic musical instrument 10, the MCU 11 receives the edited unique data and performs a reflection process based on the unique data (S24). The reflection process is the same as the process in S2. The operation in the operation example 3 may be performed by repeatedly performing S21 to S23. For example, the electronic musical instrument 10 may repeatedly perform transmission of a writing request in S21 and transmission of a reading request in S23 to reflect desired data (operation pattern <3>).

Operation Example 4

(B) of FIG. 4 is a sequence diagram illustrating an operation example (operation example 4) corresponding to item No. 4 in the table. In (B) of FIG. 4, unique data is transmitted from the terminal 20 to the electronic musical instrument 10 according to the same method (NFC communication) as in S1 ((A) of FIG. 3) (S31).

In S32, the MCU 11 that has received the unique data received by the NFC module 26 performs a process of editing the unique data. For example, the MCU 11 displays the unique data and a user interface (UI) that is an editing environment for the unique data on the display 13, and accepts editing information for the unique data input by using the input device 12. Consequently, the unique data (for example, performance information (MIDI data)) can be acquired from the terminal 20 and edited by the electronic musical instrument 10. The editing may be performed according to a predetermined automatic editing algorithm.

When the editing process is finished, the MCU 11 passes the edited unique data to the NFC module 16, and the NFC module 16 transmits the edited unique data to the terminal 20 according to the same method as in S11 ((B) of FIG. 3) (S33). In the terminal 20, the processor 21 receives the edited unique data and performs a reflection process based on the unique data (S34). The operation in the operation example 4 may be performed by repeatedly performing S31 to S33. For example, the terminal 20 may repeatedly perform transmission of a writing request in S31 and transmission of a reading request in S33 to reflect desired data (operation pattern <3>).

According to the operation examples 1 to 4, unique data (MIDI data, configuration data of the electronic musical instrument 10, or the like) can be transmitted and received between the electronic musical instrument 10 and the terminal 20 by using the NFC communication, and thus the unique data can be reflected. The unique data can be edited by one of the electronic musical instrument 10 and the terminal 20, and an editing result can be sent to the other device. In the operation examples 5 to 23 described below, the operation patterns <1> to <3> described in the operation examples 1 to 4 can be applied.

Operation Example 5

An operation example (operation example 5) corresponding to item No. 5 in the table relates to an operation (display function addition operation) when a display device is added to the electronic musical instrument 10. FIG. 5 is a flowchart illustrating a process example of the electronic musical instrument 10 in the operation example 5. As an example, the process example in FIG. 5 is performed by the MCU 11 that executes a program (application) installed in the electronic musical instrument 10.

In S001 in FIG. 5, the MCU 11 determines whether or not the NFC module 16 (communication IC 16) of the electronic musical instrument 10 is in an area (NFC communication detection area) where the NFC communication with the NFC module 26 of the terminal 20 is possible. This determination is performed on the basis of whether or not an electric wave via the antenna 26B of the NFC module 26 is received (detected) via the antenna 16B.

In a case where it is determined that the NFC module is not in the area (the NFC module is not detected), the MCU 11 determines whether to finish the operation in the operation example 5 (S002). In a case where it is determined in S002 to finish the operation, the process in FIG. 5 is finished, and in other cases, the process is returned to S001.

In S001, in a case where it is determined that the electronic musical instrument 10 and the terminal 20 have entered the area where the NFC communication is possible due to proximity of the NFC module 26 of the terminal 20, the MCU 11 causes the process to proceed to S003.

In S003, the MCU 11 reads data indicating apparatus information of the electronic musical instrument 10 (identification information of the electronic musical instrument 10: apparatus ID) and passes the data to the communication IC 16A. The communication IC 16A performs impedance control for responding to NFC transmission output via the antenna 26B of the terminal side, and passes data to be transmitted via the antenna 16B to the terminal 20. That is, the transmission target data is supplied (transmitted) by using energy supplied via the antenna 26B. The communication IC 16A performs a demodulation/decoding process on the electric wave received via the antenna 16B, and passes data indicating a response result to the apparatus information transmitted from the terminal 20 to the MCU 11.

In S004, the MCU 11 determines whether or not both the electronic musical instrument 10 and the terminal 20 are in an authenticated state (a state in which communication is permitted). In a case where it is determined that the authenticated state has not occurred, the MCU 11 starts authentication work between the electronic musical instrument 10 and the terminal 20. The authentication work is performed by performing the following procedure.

(1) An authentication request for the electronic musical instrument 10 is transmitted to the terminal 20.

(2) A result of a process for the authentication request performed by the terminal 20 is received.

(3) It is determined whether or not to permit communication with the terminal 20 on the basis of the result of the process for the authentication request.

In a case where communication with the terminal 20 is permitted, this is handled as the authentication having been finished normally, and thus the authenticated state occurs. On the other hand, in a case where communication is not permitted, this is handled as the authentication not having been finished normally.

In S006, the MCU 11 determines whether the authentication has been finished normally. In a case where it is determined that the authentication has not been finished normally, the operation in the operation example 5 is finished. In a case where it is determined that the authentication has been finished normally (authentication has been completed), the MCU 11 causes the process to proceed to S007.

In S007, the MCU 11 determines whether or not to continue the operation in the operation example 5. In a case where it is determined to continue the operation, the process proceeds to S008. In S008, the MCU 11 determines whether or not the electronic musical instrument 10 and the terminal 20 are in an area where communicable is possible. The process in S008 is the same as the process in S001. In S008, when it is determined that both are out of the area, the MCU 11 returns the process to S001 and is brought into a state of waiting for the proximity of the terminal 20 again. On the other hand, in a case where it is determined that both are in the area, the process proceeds to S008A. In a case where it is determined in S008 that both are out of the area, the operation in the operation example 5 may be finished.

In S008A, the MCU 11 resets a count value of a counter (not illustrated) and starts counting, and determines whether the count value has reached a threshold Th. The process in S008A is repeatedly performed until it is determined that the count value reaches the threshold Th. In a case where it is determined that the count value has reached the threshold Th, the process proceeds to S009. The threshold may be set as appropriate. When the count value becomes 0 due to countdown of the count value, it may be determined that the threshold Th has been reached.

In S009, the MCU 11 performs a process of transmitting, to the terminal 20, unique data generated in the electronic musical instrument 10 by operating the electronic musical instrument 10. For example, a user operates the input device 12 to input information indicating a parameter (internal parameter) corresponding to a setting applied to the electronic musical instrument 10. The MCU 11 passes the input information to the communication IC 16A.

The communication IC 16A sends the transmission target data received from the MCU 11 to the NFC module 26 via the antenna 16B by using energy supplied from the NFC module 26. After the process in S009, the process returns to S007. Therefore, the data generated by the electronic musical instrument 10 can be sent to the terminal 20 through the process in S009 until both the terminal 20 and the electronic musical instrument 10 are out of the area by moving the terminal 20 away from the electronic musical instrument 10.

FIG. 6 is a flowchart illustrating a process example of the terminal 20 in the operation example 5. As an example, the process example in FIG. 6 is performed by a processor 21 that executes a program (application) installed in the terminal 20.

Since the processes in S101 to S106 illustrated in FIG. 6 are the same as the processes in S001 to S006, the description thereof will not be repeated. The processor 21 of the terminal 20 is brought into a state of being able to transmit and receive data to and from the electronic musical instrument 10 when the authentication work with the electronic musical instrument 10 is successful (authentication of both has been completed normally).

The processes in S107, S108, S108A are the same as the processes in S007, S008, S008A. In S109, the processor 21 acquires data from the electronic musical instrument 10 received via the antenna 26B and demodulated by the communication IC 26A.

In S110, the processor 21 determines whether the data received from the communication IC 26A includes data that requires changing a display state of the display 25. When the corresponding data is included, the processor 21 performs display control on the display 25 and changes display details of the display 25 (S111). Consequently, the data received from the electronic musical instrument 10, for example, information indicating the latest setting parameters of the electronic musical instrument 10 can be displayed on the display 25. When the process in S110 is finished, the process returns to S107.

Therefore, until determination is NO in S107 or S108, information based on the data received from the electronic musical instrument 10 is displayed on the display 25 of the terminal 20, and the display details are changed according to details of the data.

According to the operation example 5, there are the following advantages. That is, the apparatus (electronic musical instrument 10) may have a configuration (for example, a configuration without a display) in which internal setting states (states of internal parameters) cannot be displayed. In such a case, the terminal 20 is brought close to the electronic musical instrument 10 (for example, placed on a housing of the electronic musical instrument 10) such that both enter an area where communication is possible. Then, authentication is performed between the communication IC 16A and the communication IC 26A, and NFC communication is possible.

In the electronic musical instrument system according to the embodiment, as long as both the electronic musical instrument 10 and the terminal 20 are in the area, the electronic musical instrument 10 continues to send data (repeatedly performs a data transmission process). On the other hand, the terminal 20 continues to receive data transmitted from the electronic musical instrument 10 as long as both of them are in the area (repeatedly performs a data reception process). Consequently, desired information based on the data received from the electronic musical instrument 10 can be displayed on the display 25 of the terminal 20, and thus display details can be changed according to an update status of the data in the electronic musical instrument 10.

As described above, the terminal 20 operates as a display device (display) of the electronic musical instrument 10 by using NFC communication. In a case of normal NFC communication, data is transmitted and received only once according to the proximity of both, but in the present embodiment, NFC communication (data transmission and reception) is continuously and repeatedly performed. Consequently, information based on new data generated due to an operation on the electronic musical instrument 10 can be displayed in real time on the display 25 of the terminal 20.

The user can visually check the internal setting states (setting parameters) of the electronic musical instrument 10 by referring to a screen of the display 25. Thus, in the electronic musical instrument that does not have a display or has a restricted display mode, it is possible to improve a user's convenience or the usefulness of the electronic musical instrument.

In the above description, as an example of data transmitted from the electronic musical instrument 10, new internal parameter data generated by the electronic musical instrument 10 is used. However, the data may be MIDI data (performance information) generated through an operation on the performance operator 15 (a performance operation of the user). The data is not limited to data generated in real time, and may be read from the storage device and transmitted. The type of data is not limited to an internal parameter or MIDI data.

According to the operation example 5, the following advantages [1] and [2] can be further obtained.
[1] On/off control of a communication state between the electronic musical instrument 10 and the terminal 20 is performed by a user's operation of bringing the electronic musical instrument 10 and the terminal 20 into a close state or putting them in a state farther than a distance in the close state.
[2] Authentication work for both the electronic musical instrument 10 and the terminal 20 is performed by controlling an application (application layer) (by the MCU 11 and the processor 21). Consequently, flexible communication as described in an example below is possible in a proximity operation.

Example 1

A plurality of terminals 20 and a plurality of electronic musical instruments 10 can be caused to communicate in any order and combination.

Example 2

After communication is stopped, the communication can be continued from a state immediately before when the communication is restored again.

Example 3

Since communication of both apparatuses is started by a physical operation such as proximity, it is easy to visually recognize a communication target apparatus clearly.

Operation Example 6

An operation corresponding to item No. 6 (operation example 6) in the table in FIG. 2 is an operation of adding an operator to the electronic musical instrument 10. In the operation example 6, a graphical user interface (GUI) indicating a performance operator is displayed on the screen of the display 25 of the terminal 20, and thus an effect in a case where a user operates the GUI to operate the performance operator 15 of the electronic musical instrument 10 or an additional performance operator related to the electronic musical instrument 10 is achieved.

FIG. 7 is a flowchart illustrating a process example of the electronic musical instrument 10 in the operation example 6. Since the processes in S001 to S008A in FIG. 7 are the same as those in the operation example 5 (FIG. 5), the description thereof will not be repeated. In a case where the determination is Yes in S008, the process proceeds to S010. When the terminal 20 and the electronic musical instrument 10 are brought close to each other by placing the terminal 20 on the housing of the electronic musical instrument 10, the processes in S001 to S008 are performed, and NFC communication between the two is repeatedly continued.

In S010, the MCU 11 uses the NFC module 16 to receive data indicating information (operation information) generated through an operation on terminal 20 (the GUI of the performance operator). In the operation example 6, a case where the operation information is MIDI data generated through an operation on the GUI on the terminal 20 will be described, but the operation information is not limited to the MIDI data.

In S011, the MCU 11 determines whether or not it is necessary to update the data (for example, the MIDI data generated in response to the operation of the performance operator 15) stored in the electronic musical instrument 10 on the basis of the data received in S010. In a case where there is no data received at the timing of S010 or it is determined that update using the received data is not necessary, the MCU 11 returns the process to S007. On the other hand, when it is determined that the update is necessary, the process proceeds to S012.

In S012, MCU11 performs a process of reflecting the received data such as update of the stored data. For example, the MCU 11 updates the MIDI data stored in the electronic musical instrument 10 on the basis of the MIDI data received from the terminal 20. When the process in S012 is finished, the process returns to S007.

FIG. 8 is a flowchart illustrating a process example of the terminal 20 in the operation example 6. Since the processes in S101 to S108A illustrated in FIG. 8 are the same as those in the operation example 5 (FIG. 6), the description thereof will not be repeated. When the determination is Yes in S108A, the process proceeds to S112. In S112, the processor 21 uses screen data stored in the storage device 22 to display a GUI indicating a performance operator of the electronic musical instrument 10 on the display 25 of the terminal 20. A user may operate the GUI by operating the touch panel of the display 25. The GUI may be one that imitates the performance operator 15 included in the electronic musical instrument 10, or may be one that imitates a performance operator (additional performance operator) different from the performance operator 15. In the operation example 6, an example in which a GUI imitating an additional performance operator is displayed will be described.

In the loop including S108, S108A, and S112, when the user operates the GUI, the processor 21 generates MIDI data corresponding to the operation on the GUI, and in S112, the MIDI data is transmitted to the electronic musical instrument 10 by using the NFC module 26.

The process in FIG. 8 may be started after the user of the terminal 20 operates the input device 23 of the terminal 20 to call the GUI of the above performance operator on the display 25.

According to the operation example 6, the terminal 20 can be used as an additional performance operator. For example, when the electronic musical instrument 10 is a keyboard instrument, the processor 21 (application) of the terminal 20 displays an additional keyboard as a GUI on the display 25, and when the keyboard is operated, MIDI data of sound (for example, one octave higher/lower sound) that cannot be produced through an operation on the performance operator 15 of the electronic musical instrument 10 is generated.

In the electronic musical instrument 10, in a case where the sound corresponding to the operation on the performance operator 15 is output from the speaker 14 (in a case of a performance state), when an additional performance operator is operated, MIDI data corresponding to the operation is transmitted to the electronic musical instrument 10, and the MCU 11 outputs a musical sound corresponding to the MIDI data from the speaker 14.

As described above, according to the operation example 6, the same effect as that of expanding the electronic musical instrument 10 can be achieved. A GUI that imitates a part of the performance operator 15 may be displayed larger than the actual performance operator 15 together with the additional performance operator or instead of the additional performance operator. Consequently, in a case where a part of the performance operator 15 is difficult to operate (for example, the performance operator 15 is small or is present in a hard-to-reach location), it is possible to achieve the same effect as easily operating the corresponding performance operator 15 by touching the display 25 (the same sound is output).

According to the operation example 6, the electronic musical instrument 10 can be expanded by a simple method, and thus a range of performance can be expanded. The operability of the electronic musical instrument 10 can be improved, that is, a user's convenience can be improved. According to the operation example 6, the advantages of [1] and [2] described in the operation example 5 can be obtained.

Operation Example 7

An operation example (operation example 7) corresponding to item No. 7 in the table in FIG. 2 relates to an operation of changing an appearance state of the electronic musical instrument 10 through an operation from the terminal. In the operation example 7, appearance changing data for the electronic musical instrument 10 is sent to the electronic musical instrument 10 by using NFC communication to change an appearance of the electronic musical instrument 10. The appearance change includes changing a display mode of the indicator (display 13) included in the electronic musical instrument 10, changing a lighting or blinking state of a light emitting component (a lamp or an LED), and changing a position of a movable component of the electronic musical instrument 10.

The appearance changing data indicates, for example, control parameters for a controller (IC) of the indicator or the light emitting component, or a controller of a motor and an actuator that control a position of the movable component. The appearance changing data may be a data set prepared in advance, or may be data generated by using the camera 30 or a pen input function provided in the terminal 20. That is, any method of generating the appearance changing data may be used.

FIG. 9 is a flowchart illustrating a process example of the electronic musical instrument 10 in an operation example 7. Since the processes in S001 to S008 and S008A in FIG. 9 are the same as those in the operation example 5 (FIG. 5), the description thereof will not be repeated. In a case where the determination is Yes in S008A, the process proceeds to S013. In S013, the MCU 11 receives the data from the terminal 20. In S014, the MCU 11 determines whether or not appearance changing data is included in the data received in S013.

In a case where it is determined in S013 that the appearance changing data is not included in the received data, the process returns to S007, and in other cases, the process proceeds to S015. In S015, the MCU 11 controls a controller of a control target (the indicator, the light emitting component, the motor, and the like) on the basis of the appearance changing data (changes the set parameters). Consequently, the control target is changed, and thus the appearance of the electronic musical instrument 10 is changed.

FIG. 10 is a flowchart illustrating a process example of the terminal 20 in the operation example 7. Since the processes in S101 to S108A illustrated in FIG. 10 are the same as the processes in the operation example 5 (FIG. 6), the description thereof will not be repeated. When the determination is Yes in S108A, the process proceeds to S113. In S113, the processor 21 reads, for example, the appearance changing data stored in the storage device 22, and uses the NFC module 26 to transmit the appearance changing data to the electronic musical instrument 10. When the process in S113 is finished, the processing returns to S108. In S113, a GUI for a user to input the appearance changing data may be displayed on the display 25.

According to the operation example 7, the appearance of the electronic musical instrument 10 can be changed by using the terminal 20. Consequently, it is possible to express the user's uniqueness in the appearance of the electronic musical instrument 10. The function of the electronic musical instrument 10 can be expanded. According to the operation example 7, the advantages of [1] and [2] described in the operation example 5 can be obtained.

Operation Example 8

An operation example (operation example 8) corresponding to item No. 8 in the table in FIG. 2 relates to an operation of transmitting performance information of the electronic musical instrument 10 to the terminal 20 and displaying a musical score on the display 25. FIG. 11 is a flowchart illustrating a process example of the electronic musical instrument 10 in the operation example 8.

Since the processes in S001 to S008A in FIG. 11 are the same as the processes in the operation example 5 (FIG. 5), the description thereof will not be repeated. In a case where the determination is Yes in S008A, the process proceeds to S016. In S016, when the user operates (plays) the performance operator 15, the MCU 11 generates performance information (MIDI data). The MCU 11 transmits the MIDI data to the terminal 20 by using the NFC module 16.

FIG. 12 is a flowchart illustrating a process example of the terminal 20 in the operation example 8. Since the processes in S101 to S106 illustrated in FIG. 12 are the same as the processes in the operation example 5 (FIG. 6), the description thereof will not be repeated. When the determination is Yes in S104 or S106, the process proceeds to S106A. In S106A, the processor 21 executes an application for displaying a musical score and displays a musical score display screen on the display 25. The processor 21 transmits a request for reading performance information to the electronic musical instrument 10, and is brought into a state in which the performance information from the electronic musical instrument 10 can be received. Thereafter, the process proceeds to S107. The processes in S107, S108, and S108A are the same as the processes described in the operation example 5 (FIG. 6).

When S108A is finished and the process proceeds to S114, the processor 21 performs a data reception process and determines whether or not the received data includes performance information (MIDI data) (S115). In a case where it is determined that the performance information is not included, the process returns to S106A, and in a case where it is determined that the performance information is included, the process proceeds to S116.

In S116, the processor 21 generates musical score information by using the performance information, and displays a musical score based on the musical score information on the musical score display screen of the display 25. When the terminal 20 repeatedly continues NFC communication with the electronic musical instrument 10, the performance information regarding a performance using the electronic musical instrument 10 is transmitted to the terminal 20 in real time, and the musical score corresponding to the performance information is displayed on the display 25.

According to the operation example 8, it is possible to improve a user's convenience and the usefulness of the electronic musical instrument 10. According to the operation example 8, the advantages of [1] and [2] described in the operation example 5 can be obtained.

Operation Example 9

An operation example (operation example 9) corresponding to item No. 9 in the table in FIG. 2 relates to an operation of transmitting unique data of the electronic musical instrument 10 to the terminal 20 and displaying the unique data on the terminal 20. FIG. 13 is a flowchart illustrating a process example of the electronic musical instrument 10 in the operation example 9.

Since the processes in S001 to S007 in FIG. 13 are the same as the processes in the operation example 5 (FIG. 5), the description thereof will not be repeated. However, in a case where the determination is Yes in S007 in FIG. 13, the process proceeds to S008A, and when the count value becomes the threshold Th or more, the process proceeds to S018. In a case where it is determined in S007 that both are out of the area (S007, No), the process proceeds to S017. In S017, the MCU 11 determines whether to finish the operation in the operation example 9. In a case where it is determined to finish the operation, the operation in the operation example 9 is finished, and in other cases, the process returns to S007.

In S018, the MCU 11 determines the type of communication request made by the terminal 20 to the electronic musical instrument 10. In a case where it is determined in S018 that the communication request is a reading request (Read), the process proceeds to S019. On the other hand, in a case where it is determined that the communication request is writing target data and a writing request (Write), the process proceeds to S020, and in a case where it is determined that the communication request has not arrived (Not request), the process returns to S007. However, the process may return to S001 in a case where the communication request has not arrived. In FIG. 13, the process in S008A may be performed between S018 and S020 and between S018 and S019 instead of between S107 and S118. The threshold Th may be the same or different between reception and transmission of unique data.

In S019, the MCU 11 performs a process of reading the unique data of the electronic musical instrument 10 (the setting parameters applied to the electronic musical instrument 10) from the storage device and transmitting the data to the terminal 20 in response to the reading request. Thereafter, the process returns to S007. However, the process may return to S001.

In S020, the MCU 11 writes the writing target data (the unique data of the electronic musical instrument 10) received from the terminal 20 into the storage device in response to the writing request. Consequently, the unique data is overwritten (updated), and the change of the unique data performed by the terminal 20 is reflected in the electronic musical instrument 10. A state of the MIDI implementation and the electronic musical instrument 10 is changed due to the change of the unique data, that is, the setting parameters. When the process in S020 is finished, the process returns to S007. However, the process may return to S001.

FIG. 14 is a flowchart illustrating a process example of the terminal 20 in the operation example 9. Since the processes in S101 to S107 illustrated in FIG. 14 are the same as the processes in the operation example 5 (FIG. 6), the description thereof will not be repeated. However, in a case where the determination is NO in S107 in FIG. 14, the process proceeds to S117, and in other cases, the process proceeds to S108A. In S117, the processor 21 determines whether to finish the operation in the operation example 9. In a case where it is determined to finish the operation, the operation in the operation example 9 is finished, and in other cases, the process returns to S107. In S108A, the counter is counted until it is determined that the count value is equal to or greater than the threshold, and in a case where it is determined that the count value is equal to or greater than the threshold, the process proceeds to S118.

In S118, the processor 21 determines the type of communication request made by the terminal 20 to the electronic musical instrument 10. In a case where it is determined in S118 that a reading request (Read) has been made to the electronic musical instrument 10 as the communication request, the process proceeds to S119. On the other hand, when it is determined that a writing request (Write) has been made to the electronic musical instrument 10 as the communication request, the process proceeds to S120. In a case where it is determined that the communication request is not made or has not been made (Not request), the process returns to S107. However, the process may return to S001 in a case where the communication request is not made or has not been made.

In S119, the MCU 11 receives the unique data transmitted from the electronic musical instrument 10 in response to the reading request and displays the data on the display 25. The MCU 11 provides an environment in which the user can edit the unique data by using the input device 23, and accepts editing input from the user. The processor 21 stores the edited unique data in the storage device 22. Thereafter, the process returns to S007. However, the process may return to S001.

In S120, in response to the writing request, the unique data that is a transmission target (the unique data edited in S119) is transmitted to the electronic musical instrument 10 by using the NFC module 26. Thereafter, the process returns to S007. However, the process may return to S001. In FIG. 14, the process in S108A may be performed between S118 and S120 and between S118 and S119 instead of between S107 and S118. The threshold Th may be the same or different between reception and transmission of the unique data.

According to the operation example 9, the terminal 20 can read the setting parameters (unique data) applied to the electronic musical instrument 10 from the electronic musical instrument 10 and display the setting parameters on the display 25 of the terminal 20. In this case, the terminal 20 may accept the editing input of the setting parameters, store the edited setting parameters, and transmit the setting parameters to the electronic musical instrument 10. In the electronic musical instrument 10, the setting parameters are updated (overwritten) by using the edited setting parameters. Consequently, the MIDI implementation or state (menu) of the terminal 20 is changed.

In a case where the electronic musical instrument 10 does not have a display or the specifications of the display are low, the terminal 20 can be used to display and edit unique data, and thus it is possible to improve a user's convenience and the usefulness of the electronic musical instrument. According to the operation example 9, the advantages of [1] and [2] described in the operation example 5 can be obtained.

Operation Example 10

An operation example (operation example 10) corresponding to item No. 10 in the table in FIG. 2 relates to an operation of transmitting performance information of the electronic musical instrument 10 to the terminal 20 and outputting a musical sound based on the performance information from the terminal 20. Since a process of the electronic musical instrument 10 in the operation example 10 is the same as the process of the electronic musical instrument 10 in the operation example 8 (FIG. 11), the description thereof will not be repeated. In other words, also in the operation example 10, the terminal 20 is brought close to the electronic musical instrument 10, and the performance information (MIDI data) generated by the electronic musical instrument 10 is transmitted to the terminal 20 by using NFC communication.

FIG. 15 is a flowchart illustrating a process example of the terminal 20 in the operation example 10. Since the processes in S101 to S106 illustrated in FIG. 15 are the same as the processes of the terminal 20 in the operation example 5 (FIG. 6), the description thereof will not be repeated. When the determination is Yes in S104 or S106, the process proceeds to S106B. In S106B, the processor 21 executes an application for displaying the timbre of a sound source to display a timbre display screen on the display 25. The processor 21 transmits a request for reading the performance information to the electronic musical instrument 10, and is brought into a state in which the performance information from the electronic musical instrument 10 can be received. Thereafter, the process proceeds to S107. The processes in S107, S108, and S108A are the same as the processes described in the operation example 5 (FIG. 6).

When the process proceeds from S108A to S121, the processor 21 performs a data reception process and determines whether or not the received data includes performance information (MIDI data) (S122). In a case where it is determined that the performance information is not included, the process returns to S106B, and in a case where it is determined that the performance information is included, the process proceeds to S123.

In S123, the processor 21 uses the sound source module 28 to generate a musical sound signal based on the performance information, and outputs a musical sound corresponding to the musical sound signal from the speaker 27. The processor 21 displays information indicating the timbre based on the musical sound signal on the display 25 on the basis of the performance information. The timbre display is optional.

According to the operation example 10, in a case where the electronic musical instrument 10 does not have a sound source module (synthesizer) or the performance of the sound source module is poor, it is possible to output a musical sound produced by playing the electronic musical instrument 10 from the terminal 20 by using the terminal 20. Consequently, it is possible to improve a user's convenience and the usefulness of the electronic musical instrument 10. According to the operation example 10, the advantages of [1] and [2] described in the operation example 5 can be obtained.

Operation Example 11

An operation example (operation example 11) corresponding to item No. 11 in the table in FIG. 2 relates to an operation of transmitting performance information of the electronic musical instrument 10 to the terminal 20 and determining a performance state. Since the process of the electronic musical instrument 10 in the operation example 11 is the same as the process of the electronic musical instrument 10 in the operation example 8 (FIG. 11), the description thereof will not be repeated. Also in the operation example 11, the performance information (MIDI data) is transmitted from the electronic musical instrument 10 to the terminal 20.

FIG. 16 is a flowchart illustrating a process example of the terminal 20 in the operation example 11. The process example in FIG. 16 is the same as the operation example 10 (FIG. 15) except for the processes in S106C and S123A.

The process in S106C is performed when the determination is Yes in S104 and S106. In S106C, the processor 21 executes the application for the user's lesson and displays the lesson screen on the display 25. The processor 21 transmits a request for reading the performance information to the electronic musical instrument 10, and is brought into a state in which the performance information from the electronic musical instrument 10 can be received.

In S123A, as lesson-related information, the processor 21 displays information indicating a user's performance state based on the performance information, information indicating a performance state of a model, information indicating an evaluation point or comment of the user's performance based on a comparison with the model, and the like on a lesson screen. The user can refer to the lesson screen and recognize the improvement points of the performance. Consequently, it is possible to improve a user's convenience and the usefulness of the electronic musical instrument 10. According to the operation example 11, the advantages of [1] and [2] described in the operation example 5 can be obtained.

<div align="center">Operation Example 12</div>

An operation example (operation example 12) corresponding to item No. 12 in the table in FIG. 2 relates to an operation of transmitting apparatus information (firmware-related information) of the electronic musical instrument 10 to the terminal 20 and checking the update of the firmware. FIG. 17 is a flowchart illustrating a process example of the electronic musical instrument 10 in the operation example 12.

The processes illustrated in FIG. 17 are the same as the processes of the electronic musical instrument 10 (FIG. 11) in the operation example 8 except for the process in S016A. In S016 in the operation example 8, the performance information is transmitted to the terminal 20, whereas in S016A in FIG. 17, the MCU 11 transmits the apparatus information of the electronic musical instrument 10 to the terminal 20. The apparatus information is, for example, firmware-related information indicating a version of firmware installed in the electronic musical instrument 10.

In the operation example 12, in S016A, the MCU 11 receives a request for reading the firmware-related information from the terminal 20 and transmits the firmware-related information to the terminal 20. However, the electronic musical instrument may be set in advance to transmit firmware-related information in S106A by operating the input device 12 of the user.

FIG. 18 is a flowchart illustrating a process example of the terminal 20 in the operation example 12. The process example in FIG. 18 is the same as the operation example 11 (FIG. 16) except for the processes in S106D, S124, S125, and S126.

S106D is performed in a case where the determination is Yes in S104 and S106. In S106D, the processor 21 executes a firmware check application and displays the firmware check screen on the display 25. The processor 21 transmits a request for reading the firmware-related information to the electronic musical instrument 10, and is brought into a state in which the firmware-related information can be received from the electronic musical instrument 10.

In S121, when the processor 21 receives the firmware-related information from the electronic musical instrument 10, the processor 21 acquires information indicating the latest version of the firmware, and compares the firmware with the firmware-related information to determine whether or not the firmware-related information indicates the firmware of the latest version (S124).

In a case where it is determined that the firmware-related information indicates the firmware of the latest version, the processor 21 displays information indicating that the firmware is of the latest version on the check screen of the display 25 (S125). On the other hand, in a case where it is determined that the firmware-related information does not indicate the firmware of the latest version, the processor 21 displays, on the check screen of the display 25, prompting to update the firmware to the latest version (S126).

According to the operation example 12, a user can check a firmware version of the electronic musical instrument 10 by using the terminal 20, and can thus update the version to the latest version as needed. According to the operation example 12, it is possible to improve a user's convenience and the usefulness of the electronic musical instrument 10. According to the operation example 12, the advantages of [1] and [2] described in the operation example 5 can be obtained.

<div align="center">Operation Example 13</div>

An operation example (operation example 13) corresponding to item No. 13 in the table in FIG. 2 relates to an operation in which operation information of the electronic musical instrument 10 is transmitted to the terminal 20 and the terminal 20 provides operation guidance information to a user. FIG. 19 is a flowchart illustrating a process example of the electronic musical instrument 10 in the operation example 13.

The processes illustrated in FIG. 19 are the same as the processes of the electronic musical instrument 10 (FIG. 15) in the operation example 12 except for the process in S016B. In S016A in the operation example 12, the apparatus information is transmitted to the terminal 20. On the other hand, in S016B in FIG. 19, the MCU 11 transmits operation information of the electronic musical instrument 10 to the terminal 20. The operation information is, for example, information indicating a history of the user's operations on the electronic musical instrument 10. In a case where the operation history relates to a device provided in the electronic musical instrument 10, information for specifying the device and the operation information may be transmitted.

In the operation example 13, in S016B, the MCU 11 receives a request for reading the operation information from the terminal 20 and transmits the operation information to the terminal 20. However, the electronic musical instrument may be set in advance to transmit the operation information in S106B through the user's operation on the input device 12.

FIG. 20 is a flowchart illustrating a process example of the terminal 20 in the operation example 13. The process example in FIG. 20 is the same as that in the operation example 12 (FIG. 18) except for the processes in S106E, S127, and S128.

S106E is performed in a case where the determination is Yes in S104 and S106. In S106E, the processor 21 executes an application that supports an operation of the electronic musical instrument 10, and displays an operation guide screen on the display 25. The processor 21 transmits a request for reading the operation information to the electronic musical instrument 10, and is brought into a state in which the operation information from the electronic musical instrument 10 can be received.

In S127, the processor 21 determines whether the operation information is included in the data or the information from the electronic musical instrument 10 received in S121. In a case where it is determined that the operation information is included, the processor 21 causes the process to proceed to S128, and in other cases, returns the process to S108.

In S128, operation support information (operation guide) to inform the user is displayed on the guide screen. According to the operation example 13, the user can learn how to operate the electronic musical instrument 10 by referring to the guide screen of the terminal 20. Consequently, it is possible to improve a user's convenience and the usefulness of the electronic musical instrument 10. According to the operation example 12, the advantages of [1] and [2] described in the operation example 5 can be obtained.

Operation Example 14

An operation example (operation example 14) corresponding to item No. 14 in the table in FIG. 2 is almost the same as the operation example 13. In S128, the processor 21 displays a corresponding page of an instruction manual of the electronic musical instrument 10 on the guide screen as operation support information. This also makes it possible to provide useful information to a user.

Operation Example 15

An operation example (operation example 15) corresponding to item No. 15 in the table in FIG. 2 relates to an operation of controlling on and off of a specific function of the electronic musical instrument 10 according to a distance from the terminal 20. FIG. 21 is a flowchart illustrating a process example of the electronic musical instrument 10 in the operation example 15.

Since the processes in S001 to S008 and S008A in FIG. 21 are the same as the processes of the electronic musical instrument 10 in the operation example 5 (FIG. 5), the description thereof will not be repeated. However, in the operation example 15, in a case where the determination is Yes in S002 and the determination is NO in S006, S007, and S008, the specific function provided in the electronic musical instrument 10 is invalidated (disabled). (S025).

In a case where the determination is Yes in S008, the process proceeds to S022. In S022, the MCU 11 receives user authentication information from the terminal 20. In S023, the MCU 11 determines whether the user authentication information is information regarding a person who is permitted to use the electronic musical instrument 10 (whether the user authentication information is appropriate (OK)). In a case where it is determined that the user authentication information is appropriate, the MCU 21 validates (enables) the specific function provided in the electronic musical instrument 10 (S024). On the other hand, in a case where it is determined that the user authentication information is not appropriate, the process proceeds to S025 and the specific function is invalidated.

FIG. 22 is a flowchart illustrating a process example of the terminal 20 in the operation example 15. Since the processes in S101 to S106 illustrated in FIG. 12 are the same as the processes in the operation example 5 (FIG. 6), the description thereof will not be repeated. When the determination is Yes in S104 or S106, the process proceeds to S106F.

In S106F, the processor 21 checks, for example, details of information indicating a user authentication state stored in the storage device 22. The processor 21 refers to information indicating an electronic musical instrument of which the user can use a specific function (for example, stored in the storage device 22), and sets an authentication state parameter (indicating a musical instrument of which the user can use the specific function).

The processes in S107, S108, and S108A are the same as those in the operation example 5 (FIG. 6). When the determination is Yes in S108A, the process in S129 is performed. In S129, the processor 21 determines whether or not user authentication for the electronic musical instrument 10 that is a communication partner has been completed. In a case where it is determined that the authentication has not been completed, the processor 21 transmits the user authentication information (including the authentication state parameter set in S106F) to the electronic musical instrument 10. In a case where it is determined in S129 that the authentication has been completed, and in a case where the process in S130 is finished, the processor 21 returns the process to S107.

According to the operation example 15, by transmitting the user authentication information from the terminal 20 to the electronic musical instrument 10 by using NFC communication, it is possible to invalidate the specific function of the electronic musical instrument 10. In other words, personal authentication of the electronic musical instrument 10 is possible. According to the operation example 15, the advantages of [1] and [2] described in the operation example 5 can be obtained.

Operation Example 16

An operation example (operation example 16) corresponding to item No. 16 in the table in FIG. 2 relates to an operation of remotely controlling the electronic musical instrument 10 by using the terminal 20. As illustrated in FIG. 1, the terminal 20 can communicate with the terminal 50 via the network 1, and the terminal 20 can be remotely controlled via the network 1 by operating the terminal 50. In the operation example 16, remote control of the terminal 20 is performed in a state in which the terminal 20 is in close proximity to the electronic musical instrument 10. FIG. 23 is a flowchart illustrating a process example of the electronic musical instrument 10 in the operation example 16.

Since the processes in S001 to S008 and S008A in FIG. 23 are the same as the processes in the operation example 5 (FIG. 5), the description thereof will not be repeated. In S026, the MCU 11 receives data from the terminal 20. In S027, the MCU 11 determines whether the operation information is included in the data received in S026. In a case where the operation information is not included, the process returns to S007, and in a case where the operation information is included, the MCU 11 controls an operation or a state of the electronic musical instrument 10 according to the operation information (S029).

FIG. 24 is a flowchart illustrating a process example of the terminal 20 in the operation example 16. Since the processes in S101 to S106, S107, S108, and S108A illustrated in FIG. 24 are the same as the processes in the operation example 5 (FIG. 6), the description thereof will not be repeated.

In FIG. 24, when the determination is Yes in each of S104 and S106, the process proceeds to S106G. In S106G, the processor 21 of the terminal 20 brings the terminal 20 into a state in which the operation information (remote control information) of the electronic musical instrument 10 is accepted from a terminal (for example, the terminal 50 in FIG. 1) different from the terminal 20 via the network 1.

The processor 21 of the terminal 20 receives and accepts the operation information transmitted from the terminal 50 via the network 1 (S107A), and transmits the operation information to the electronic musical instrument 10 by using the NFC module 26. The electronic musical instrument 10 receives the operation information (S131), and performs control based on the operation information.

According to the operation example 16, the electronic musical instrument 10 can be remotely controlled via the network 1 by using the terminal 20. Consequently, it is possible to improve a user's convenience and the usefulness of the electronic musical instrument 10. According to the operation example 16, the advantages of [1] and [2] described in the operation example 5 can be obtained.

Operation Example 17

An operation example (operation example 17) corresponding to item No. 17 in the table in FIG. 2 relates to an operation of transmitting time information stored in the terminal 20 to the electronic musical instrument 10. FIG. 25 is a flowchart illustrating a process example of the electronic musical instrument 10 in the operation example 17.

The processes illustrated in FIG. 25 are the same as the processes in the operation example 5 (FIG. 5) except for the process in S030. Thus, with respect to FIG. 25, the description of the processes other than S030 will not be repeated. In S030, time information is received from the terminal 20, and a predetermined process using the time information is performed, such as a process of updating an application in the electronic musical instrument 10 using the time information.

FIG. 26 is a flowchart illustrating a process example of the terminal 20 in the operation example 17. The processes illustrated in FIG. 26 are the same as the processes in the operation example 5 (FIG. 6) except for the process in S132. Therefore, with respect to FIG. 26, the description of the processes other than S132 will not be repeated. In S132, the processor 21 of the terminal 20 transmits time information indicated by a built-in clock mounted on the terminal 20 to the electronic musical instrument 10 by using the NFC module 26.

According to the operation example 17, in a case where the electronic musical instrument 10 does not have a clock, time information can be supplied from the terminal 20 to update or correct the time used by an application of the electronic musical instrument 10. This saves the user the trouble of adjusting the time of the electronic musical instrument 10, and thus it is possible to improve a user's convenience and the usefulness of the electronic musical instrument 10. According to the operation example 17, the advantages of [1] and [2] described in the operation example 5 can be obtained.

Operation Example 18

An operation example (operation example 18) corresponding to item No. 18 in the table in FIG. 2 relates to an operation of sending sensor data such as a physical quantity detected by the sensor 29 (FIG. 1) included in the terminal 20 to the electronic musical instrument 10. The sensor 29 includes, for example, at least one of an acceleration sensor, a gyro sensor, and a geomagnetic sensor, and the processor 21 may calculate an amount of change in a physical quantity obtained from each sensor per unit time. An amount of change is handled as an amount of operation on the performance operator of the electronic musical instrument 10. In other words, MIDI data for outputting a musical sound corresponding to a difference between sensor values is generated and transmitted to the electronic musical instrument 10. FIG. 27 is a flowchart illustrating a process example of the electronic musical instrument 10 in the operation example 18.

The processes illustrated in FIG. 27 are the same as the processes in the operation example 5 (FIG. 5) except for the process in S031. Therefore, with respect to FIG. 27, the description of the processes other than S031 will not be repeated. In S031, the MCU 11 receives the performance information from the terminal 20, and performs an operation corresponding to the performance information, for example, generation of a musical sound signal according to the performance information and output of a musical sound based on the musical sound signal.

FIG. 28 is a flowchart illustrating a process example of the terminal 20 in the operation example 18. Among the processes illustrated in FIG. 28, the processes in S101 to S108 and S108A are the same as the processes in the operation example 5 (FIG. 6), and thus the description thereof will not be repeated. The process in S107B is executed in a case where the determination is Yes in S107, and the processor 21 obtains a sensor value by using the sensor 29 of the terminal 20. In S133, a sensor value obtained in the past is compared with the sensor value acquired this time, and performance information corresponding to a difference (amount of change per unit time) is generated. In S134, the performance information is transmitted to the electronic musical instrument 10, and the sensor value of this time is stored in the storage device 22 for comparison in the next S133. This sensor value will be used as a past sensor value in the next S133.

According to the operation example 18, performance information corresponding to an amount of change in the sensor value of the sensor 29 of the terminal 20 is transmitted to the electronic musical instrument 10, and a musical sound corresponding to the performance information is output. As described above, the terminal 20 can be used as a performance operator of the electronic musical instrument 10, and thus it is possible to improve a user's convenience and the usefulness of the electronic musical instrument 10. According to the operation example 18, the advantages of [1] and [2] described in the operation example 5 can be obtained. Instead of the performance information, control information of the electronic musical instrument 10 according to an amount of change may be generated and transmitted to the electronic musical instrument, and the electronic musical instrument 10 may also perform an operation according to the control information.

Operation Example 19

An operation example (operation example 19) corresponding to item No. 19 in the table in FIG. 2 relates to an operation of performing imaging using the camera 30 of the terminal 20 in response to an operation on the electronic musical instrument 10. FIG. 29 is a flowchart illustrating a process example of the electronic musical instrument 10 in the operation example 19.

The processes illustrated in FIG. 29 are the same as the processes in the operation example 5 (FIG. 5) except for the process in S032. Thus, with respect to FIG. 29, the description of the processes other than S032 will not be repeated. In S032, the MCU 11 transmits the operation information (control information) of the camera 30 corresponding to the operation on the electronic musical instrument 10 to the terminal 20. A predetermined operation on the predetermined electronic musical instrument 10 such as an operation of the performance operator 15 of the electronic musical instrument 10 is associated with operation details (control details) of the camera 30 in advance, and when detecting the predetermined operation on the electronic musical instrument 10, the MCU 11 acquires the corresponding operation information of the camera 30 from the storage device and performs a process of transmitting the operation information to the terminal 20. However, operation information for the camera 30 may be input to the electronic musical instrument 10 and this operation information may be transmitted to the terminal 20. The operation information may be operation information generated in real time in response to an operation on the input device 13 in S032, or may be information stored in the storage device of the electronic musical instrument 10 and read through an operation on the input device 13 in S032.

FIG. 30 is a flowchart illustrating a process example of the terminal 20 in the operation example 19. Among the processes illustrated in FIG. 29, the processes in S101 to S108 and S108A are the same as the processes of the terminal 20 in the operation example 5 (FIG. 6), and thus the description thereof will not be repeated. In S106H, the processor 21 executes an application for imaging, displays an imaging screen using the camera 30 on the display 25, and is brought into a state in which operation information of the camera 30 is accepted from the electronic musical instrument 10. In a case where the processor 21 receives data transmitted from the electronic musical instrument 10 (S135) and determines that the data includes the operation information of the camera 30 (Yes in S136), the processor 21 performs control (focus adjustment, flash on/off, shutter release, and the like) corresponding to the operation information of the camera 30 (S137).

According to the operation example 19, an operation of the camera 30 of the terminal 20 can be controlled by operating the electronic musical instrument 10. Consequently, it is possible to improve a user's convenience and the usefulness of the electronic musical instrument 10. According to the operation example 19, the advantages of [1] and [2] described in the operation example 5 can be obtained.

Operation Example 20

An operation example (operation example 20) corresponding to item No. 20 in the table in FIG. 2 relates to an operation in which position information of the terminal 20 acquired by using the GPS receiver of the terminal 20 is transmitted to the electronic musical instrument 10, and control or an operation according to the position information is performed by the electronic musical instrument 10. FIG. 31 is a flowchart illustrating a process example of the electronic musical instrument 10 in the operation example 20.

The processes illustrated in FIG. 31 are the same as the processes in the operation example 5 (FIG. 5) except for the process in S033. Thus, the description of the processes other than S033 with respect to FIG. 31 will not be repeated. In S033, the MCU 11 performs predetermined control and operation according to the position information of the terminal 20 received from the terminal 20. For example, the MCU 11 turns on and off a predetermined function of the electronic musical instrument 10 or contents of the electronic musical instrument 10 such that the electronic musical instrument 10 has a specification corresponding to a destination (an export (distribution) place of the electronic musical instrument 10) on the basis of a correspondence relationship between a position indicated by the position information and the destination.

FIG. 32 is a flowchart illustrating a process example of the terminal 20 in the operation example 20. Among the processes illustrated in FIG. 32, the processes in S101 to S108 and S108A are the same as the processes of the terminal 20 in the operation example 5 (FIG. 6), and thus the description thereof will not be repeated. In S107C, the processor 21 uses the GPS receiver 31 to acquire information indicating the current position of the terminal 20. In S138, the position information acquired in S107C is transmitted to the electronic musical instrument 10.

According to the operation example 20, the electronic musical instrument 10 obtains the position information from the terminal 20 and sets a state of the electronic musical instrument 10 according to a destination (changes the state to a specification corresponding to the destination). That is, an operation or control based on the position information is performed. Consequently, it is possible to improve a user's convenience and the usefulness of the electronic musical instrument 10. According to the operation example 20, the advantages of [1] and [2] described in the operation example 5 can be obtained.

Operation Example 21

An operation example (operation example 21) corresponding to item No. 21 in the table in FIG. 2 relates to an operation of operating the electronic musical instrument 10 by transmitting control information based on a voice assistant function of the terminal 20 to the electronic musical instrument 10. FIG. 33 is a flowchart illustrating a process example of the electronic musical instrument 10 in the operation example 21.

Since the processes illustrated in FIG. 33 are the same as the processes of the electronic musical instrument 10 (FIG. 5) in the operation example 5 except for the process in S034, the description of the processes other than S034 will not be repeated. In S034, the MCU 11 receives the control information based on the voice assistant function of the terminal 20 received from the terminal 20, and performs predetermined control or operation according to the control information. For example, the MCU 11 turns on and off a function, changes a state, changes a parameter, and the like according to control information.

FIG. 34 is a flowchart illustrating a process example of the terminal 20 in the operation example 21. Among the processes illustrated in FIG. 32, the processes in S101 to S107, S108, and S108A are the same as the processes in the operation example 5 (FIG. 6), and thus the description thereof will not be repeated. In S106I, the processor 21 executes an application for voice assistant, displays a voice assistant standby screen on the display 25, and is brought into a state in which a voice command (voice input) input from the MIC 32 is accepted. In S107D, the processor 21 generates control information according to a voice command. When it is determined in S139 that there is control information to be transmitted to the electronic musical instrument 10, the processor 21 transmits the control information to the electronic musical instrument 10 in S140.

According to the operation example 21, control information based on a voice command input to the terminal 20 is transmitted to the electronic musical instrument 10, and the electronic musical instrument 10 performs an operation or control according to the control information. Consequently, it is possible to improve a user's convenience and the usefulness of the electronic musical instrument 10. According to the operation example 21, the advantages of [1] and [2] described in the operation example 5 can be obtained.

Operation Example 22

An operation example corresponding to item No. 22 (operation example 22) in the table in FIG. 2 relates to an operation of starting the electronic musical instrument 10 with an electromotive force generated by an NFC transmission wave (an electric wave transmitted by the NFC module 26) of the terminal 20 and performing a sounding process. FIG. 35 is a flowchart illustrating a process example of the electronic musical instrument 10 in the operation example 22.

In S041, it is determined whether a start instruction for the electronic musical instrument 10 has been input (for example, whether a power switch has been turned on). In a case where it is determined that the start instruction has been input, the process proceeds to S043, and in a case where it is determined that the start instruction is not input, the process proceeds to S042.

In S043, the power of the electronic musical instrument 10 is powered on, and the MCU 11 produces sound (a process of generating MIDI data and outputting a musical sound based on the MIDI data) according to an operation on the performance operator 15. In S044, the MCU 11 determines whether the supply of power is stopped due to turning off of a power switch or the like. In a case where it is determined that the supply of power is stopped, the process proceeds to S046. In a case where it is determined that the supply of power is not stopped, the MCU 11 determines whether the operation stop is necessary (S045), and in a case where it is determined that the operation stop is necessary, the process proceeds to S046. In S046, the power is turned off (S046), and the process in FIG. 35 is finished. In a case where it is determined in S045 that the operation stop is not necessary, the process returns to S043.

In a case where the determination is NO in S041, it is determined in S042 whether or not the terminal 20 and the electronic musical instrument 10 are in an area where NFC communication is possible. In a case where it is determined that both are out of the area, the process returns to S041. On the other hand, in a case where it is determined that both are in the area, electric power generated by the electromotive force generated by receiving the electric wave from the NFC module 26 via the antenna 16B is supplied to the MCU 11 (S047), and the MCU 11 generates MIDI data in response to an operation on the performance operator 15, and outputs a corresponding musical sound (produces sound) from the speaker 14 (S048). In S049, it is determined whether the terminal 20 has come out of the area where the NFC communication is possible with the electronic musical instrument 10, if so, the process proceeds to S046, and if not, the process returns to S047.

FIG. 36 is a flowchart illustrating a process example of the terminal 20 in the operation example 22. In S141, it is determined whether the terminal 20 is in the area where communication is possible with the electronic musical instrument 10. In a case where it is determined that the terminal 20 is not in the area, the process returns to S141, and in a case where it is determined that the terminal 20 is in the area, the process proceeds to S142.

In S142, NFC communication with the electronic musical instrument 10 is started, and an electric wave that causes an electromotive force in the electronic musical instrument 10 is transmitted (radiated). Electric waves are transmitted continuously. Transmission and reception of data are performed as needed. In S143, it is determined whether the terminal 20 is located outside the above area. In a case where it is determined that the terminal 20 is not located outside the area, the process returns to S142, and in a case where it is determined that the terminal 20 is located outside the area, the process proceeds to S144. In S144, the transmission of the electric wave for generating the electromotive force is stopped, and the process in FIG. 36 is finished.

According to the operation example 22, in a case where the terminal 20 and the electronic musical instrument 10 are located in a predetermined area (where NFC communication is possible), the terminal 20 transmits an electric wave to the electronic musical instrument 10, and the electronic musical instrument 10 performs a predetermined operation such as outputting a musical sound with electric power generated by an electromotive force generated by receiving the electric wave. Consequently, in a case where the electronic musical instrument 10 is operated by the electric power from the battery, the power consumption of the battery can be reduced. even in a case where the electric power is not supplied to the electronic musical instrument 10 (product) or the product does not have the power supply function, the product can be started. Consequently, it is possible to improve a user's convenience and the usefulness of the electronic musical instrument 10. According to the operation example 22, the advantages of [1] and [2] described in the operation example 5 can be obtained. In the above description of the operation example 22, the operating power of the electronic musical instrument 10 is supplied by the supply of the electric wave, but the supply of the electric wave may be performed by simply powering on the electronic musical instrument 10 (in the same state as the power switch is turned on).

Operation Example 23

An operation example (operation example 23) corresponding to item No. 23 in the table in FIG. 2 relates to an operation in which the terminal 20 transmits information obtained from a cloud service to the electronic musical instrument 10. FIG. 37 is a flowchart illustrating a process example of the electronic musical instrument 10 in the operation example 23.

Since the processes illustrated in FIG. 37 are the same as the processes of the electronic musical instrument 10 (FIG. 5) in the operation example 5 except for the process in S047, the description of the processes other than S047 will not be repeated. In S047, the MCU 11 receives the control information received from the terminal 20 and performs predetermined control and operation according to the control information. For example, the MCU 11 turns on and off a function, changes a state, changes a parameter, and the like according to control information.

FIG. 38 is a flowchart illustrating a process example of the terminal 20 in the operation example 23. Among the processes illustrated in FIG. 32, the processes in S101 to S106, S107, S108, and S108A are the same as the processes of the terminal 20 in the operation example 5 (FIG. 6), and thus the description thereof will not be repeated. In S106J, the processor 21 executes an application for cloud connection, establishes connection with a predetermined server (terminal 50) via the network 1 (cloud), and is brought into a state in which data can be transmitted and received to and from the server.

In S107E, with respect to the server, the processor 21 transmits data from the electronic musical instrument 10 to the server and receives data for the electronic musical instrument 10 from the server. In S151, it is determined whether there is data to be transmitted to the electronic musical instrument 10, and in a case where it is determined that there is data to be transmitted, the data is transmitted to the electronic musical instrument 10 by using NFC communication (S152). In S152, the data to be transmitted from the electronic musical instrument 10 to the server is received by using the NFC communication.

According to the operation example 23, data can be transmitted and received between the electronic musical instrument 10 and the server by using the terminal 20 as a relay apparatus. Consequently, the electronic musical instrument 10 can use a service provided by the server. Consequently, it is possible to improve a user's convenience and the usefulness of the electronic musical instrument 10. According to the operation example 23, the advantages of [1] and [2] described in the operation example 5 can be obtained.

Application Example 1

Hereinafter, application examples will be described. FIG. 39 illustrates an application example (Application Example 1) corresponding to the operation example 8. In Application Example 1, the electronic musical instrument 10 (electronic piano) has a built-in NFC module 16 (an antenna and an NFC tag device). The electronic musical instrument 10 does not have a display. For example, when the terminal 20 is placed on the electronic piano, the NFC module 26 (an antenna and an NFC reader/writer device) of the terminal 20 and the NFC module 16 of the electronic musical instrument 10 are brought into a state of being located in an area where NFC communication is possible (proximity state). In this case, when information indicating a title of a song that is a playing target is received from the electronic musical instrument 10 as performance information to the terminal 20 by using NFC communication and is supplied to an application (processor 21), the processor displays a display screen on which a musical score corresponding to the title of the song is displayed, on the display 25. Consequently, a user can play while looking at the musical score.

In a state in which the NFC module 26 and the NFC module 16 can communicate with each other, the MCU 11 of the electronic musical instrument 10 sends information indicating a state of the electronic musical instrument 10 (information indicating a setting currently applied to the electronic musical instrument 10) to the terminal 20 by using the NFC communication, and the terminal 20 displays the information indicating the setting on the display 25. Consequently, the user can recognize the state of the electronic apparatus 10 by using the terminal 20. When the user inputs the information for changing the setting to the terminal 20 and gives an instruction for transmitting the information to the electronic musical instrument 10, the information related to the change is transmitted to the electronic musical instrument 10, and the MCU 11 performs a setting change process. Consequently, the data (change information) from the terminal 20 is reflected in the electronic musical instrument 10.

Application Example 2

(A) to (C) of FIG. 40 illustrate an application example (Application Example 2) corresponding to the operation example 5. The electronic musical instrument 10 according to Application Example 2 is an electronic saxophone, and (A) of FIG. 40 illustrates a front surface of the electronic musical instrument 10. The NFC module 16 (an antenna and an NFC tag device) is provided at the lower end of the electronic musical instrument 10 (actually, it is built-in). (B) of FIG. 40 illustrates a partially enlarged view of a back surface of the electronic musical instrument 10 in (A) of FIG. 40. A simple display 13 using a seven-segment LCD is provided on the back surface, and a state of the electronic musical instrument 10 is displayed by a code (a number or the like). (C) of FIG. 40 illustrates the terminal 20, and when the terminal 20 is brought close to the NFC module 16, the NFC module 26 (an antenna and an NFC reader/writer device) built in the terminal 20 and the NFC module 16 are brought into a state in which they can communicate with each other. The MCU 11 of the electronic musical instrument 10 transmits information indicating a state of the electronic musical instrument 10 (information indicating a setting currently applied to the electronic musical instrument 10) to the terminal 20 by using the NFC communication. The terminal 20 displays the information indicating the setting in detail on the display 25. Consequently, the user can refer to the details of the state of the electronic apparatus 10 in an easy-to-understand display form. In the same manner as in the case of Application Example 1, the user may input information for changing the setting to the terminal 20 and give an instruction for transmitting the information to the electronic musical instrument 10. Then, the information related to the change is transmitted to the electronic musical instrument 10, and the MCU 11 performs a setting change process.

Application Example 3

(A) and (B) of FIG. 41 show an application example (Application Example 3) corresponding to the operation example 10. The electronic musical instrument 10 according to Application Example 3 is a keyboard ((A) of FIG. 41). The NFC module 16 (an antenna and an NFC tag device) is provided at the left end of the electronic musical instrument 10 (actually, it is built-in). The electronic musical instrument 10 does not have a sound source module. (B) of FIG. 41 illustrates the terminal 20, and when the terminal 20 is brought close to the NFC module 16, the NFC module 26 (an antenna and an NFC reader/writer device) built in the terminal 20 and the NFC module 16 are brought into a state in which they can communicate with each other. In this state, when a user operates the performance operator 15 (keyboard) to play, the performance information (MIDI data) is transmitted from the electronic musical instrument 10 to the terminal 20 by using NFC communication. The processor 21 of the terminal 20 generates a musical sound signal based on the MIDI data by using the sound source module 28, and outputs the musical sound signal from the speaker 27. Consequently, the user can listen to musical sounds produced by the user's playing. The processor 21 displays information (graph) indicating the timbre of the performance musical sound based on the MIDI data on the display 25. Consequently, the user can listen to musical sounds related to his/her playing by using the terminal 20, and can recognize the timbre by referring to the display 25.

<Description of Operation Patterns 4 to 8>

(Operation Pattern <4>)

FIG. 42 illustrates a process example related to the operation pattern <4>. As an example, the process is mainly performed by the MCU 11 of the electronic musical instrument 10 or the processor 21 of the terminal 20. As an example, the processor 21 of the terminal 20 is used, but the MCU 11 or the like may be used.

In S201, the processor 21 receives data sent from the electronic musical instrument 10 by transmitting a reading request of data to the electronic musical instrument 10. In S202, the processor 21 determines details of the received data. In S203, the processor 21 transmits a reading request or a writing target data and a writing request according to the details of the received data. For example, the processor 21 determines a termination of the data in S202, transmits a reading request for acquiring the next data in a case where the received data does not include the termination portion, and transmits data indicating finishing of data reception and a writing request thereof in a case where the received data includes the termination portion. However, details of the data or determination based on the details of the data may be set as appropriate.

(Operation Patterns <5> and <6>)

FIG. 43 illustrates a process example related to the operation patterns <5> and <6>. As an example, the process is mainly performed by the MCU 11 of the electronic musical instrument 10 or the processor 21 of the terminal 20. As an example, the processor 21 of the terminal 20 is used, but the MCU 11 or the like may be used.

In S211 the processor 21 transmits a reading request of data, or writing target data and a writing request therefor to the electronic musical instrument 10. In S212, it is determined whether communication using the reading request or the writing request has failed or succeeded. For example, in a case where a response to the reading or writing request is not received within a predetermined period, it is determined that the communication has failed. A method for determining the success or failure in the communication is not limited to the above.

In a case where it is determined that the communication has succeeded in S212, the process is finished. On the other hand, in a case where it is determined that the communication has failed, the processor 21 transmits a reading request or a writing request. In this case, the operation may be an operation of retransmitting the request transmitted in S211 or vice versa. A case where a reading request is transmitted in S211 and a writing request is transmitted in S213 is, for example, a case where a communication partner is requested to record information indicating a failure. A case where a writing request is transmitted in S211 and a reading request is transmitted in S213 is, for example, a case where data used for generating writing request data is reacquired from a communication partner.

(Operation Pattern <7>)

FIG. 44 illustrates a process example related to the operation pattern <7>. As an example, the process is mainly performed by the MCU 11 of the electronic musical instrument 10 or the processor 21 of the terminal 20. As an example, the processor 21 of the terminal 20 is used, but the MCU 11 or the like may be used.

In S221, it is determined whether or not there is transmission target data. In a case where it is determined that there is transmission target data, the processor 21 performs a process of transmitting a writing request for using the transmission target data as writing target data (S222). On the other hand, in a case where it is determined that there is no transmission target data, the processor 21 transmits a reading request of data (S223). In S224, it is determined whether or not the process in FIG. 44 is finished, and in a case where the process is not finished, the process returns to S221.

According to the process in FIG. 44, in a situation in which there is no transmission target data, the transmission of the reading request (S223) is repeated, and when transmission target data is generated (S221, Yes), a writing request therefor is transmitted (S222). For example, a case is assumed in which the terminal 20 sends an instruction for the next operation to the electronic musical instrument 10 while receiving performance information or the like from the electronic musical instrument 10 in real time.

(Operation Pattern <8>)

FIG. 45 illustrates a process example related to the operation pattern <8>. As an example, the process is mainly performed by the MCU 11 of the electronic musical instrument 10 or the processor 21 of the terminal 20. As an example, the processor 21 of the terminal 20 is used, but the MCU 11 or the like may be used.

In S231, it is determined whether or not there is transmission target data. In a case where it is determined that there is transmission target data, the processor 21 determines whether or not a data reading timing has arrived (S232). The reading timing is determined, for example, by a periodic expiration of a timer. Alternatively, in S232, the processor 21 may wait for the count value to reach the threshold Th or greater, as described in S008A and S108A. In this case, when it is determined that the reading timing has not arrived, the processor 21 transmits transmission target data and a writing request therefor (S233).

On the other hand, in a case where it is determined that there is no transmission target data, or in a case where it is determined that a reading timing has arrived, the processor 21 transmits a reading request of data (S234). In S235, it is determined whether or not the process in FIG. 45 is finished, and in a case where it is determined that the process is not finished, the process returns to S231.

As described above, in the operation pattern <8>, in a case where there is transmission target data, transmission of the transmission target data and a writing request therefor is repeatedly executed. However, when a predetermined reading timing arrives during such repeated transmission, a reading request of data is transmitted. The operation pattern <8> is used, for example, in a case where the next instruction is acquired during writing of data.

The operation patterns <1> to <8> may be combined as appropriate. The operation patterns <4> to <8> can be appropriately incorporated into the above operation examples 5 to 23.

<Changing of Frequency of Reading Request>

First Example

Hereinafter, a first example of a process of changing the frequency of reading requests will be described. The periodic timing determination (S232) of the reading request in the above operation pattern <8> has been described as being performed, for example, when the count value is equal to or greater than the threshold Th by applying the process in S008A described with reference to FIG. 5 or the like or the process in S108A described with reference to FIG. 6 or the like.

By changing the threshold Th, the time until the count value is equal to or greater than the threshold can be changed. This means that, in a case where the processes in S008A and 5108A arrive periodically, the frequency of data transmission and reception between the electronic musical instrument 10 and the terminal 20 can be changed by changing a length of the threshold Th.

The frequency (the magnitude of the threshold Th) may be determined, for example, according to the type of application installed in the terminal 20 and performing a target process by using data acquired from the electronic musical instrument 10. For example, when the data acquired by the application from the electronic musical instrument 10 has high real-time property, a high frequency is set. In contrast, in a case where the data handled by the application is data with low real-time property such as the current setting parameter of the electronic musical instrument 10, a low frequency may be set. The frequency (the magnitude of the threshold) may be changed by a user's manual operation on the terminal 20.

For example, in Application Example 1 corresponding to the operation example 8, the threshold Th for determining the frequency of a reading request is set to the minimum value or a small value as a default value with respect to the application installed in the terminal 20 in order to display a musical score in real time. On the other hand, reading data from the electronic musical instrument 10 at a high frequency means that a remaining amount of power of the battery 33 decreases faster than in a case where the frequency is low.

Therefore, the processes in S301 to S304 illustrated in FIG. 46 may be performed between S108 and S108A in FIG. 12. In S301, the processor 21 determines whether a remaining amount of power of the battery 33 (FIG. 1) (obtained by measuring a battery voltage) is less than a threshold Th2. In a case where it is determined that the residual quantity is less than the threshold Th2, the process proceeds to S302, and in other cases, the process proceeds to S303.

In S302, the processor 21 displays a low battery level and a screen for asking whether or not the frequency is required to be changed (for example, the frequency is reduced) on the display 25. The user refers to the display 25 and inputs whether or not the change is necessary.

In S303, the processor 21 determines whether or not there is input indicating a change in S302. In a case where it is determined that there is input indicating a change, the processor 21 changes the threshold Th (S304). For Application Example 1, the magnitude of the threshold Th is increased by at least one step. As the value of the threshold Th is increased, the time until the count value reaches the threshold Th becomes longer, and thus the frequency is reduced. Thereafter, the process proceeds to S108A. Even in a case where it is determined in S303 that there is input indicating that the change is unnecessary, the process proceeds to S108A. In this case, the threshold is not changed.

According to the process in FIG. 46, in Application Example 1, when a remaining amount of power of the battery 33 is less than the threshold while the terminal 20 performs a process of displaying the musical score, the screen (box) for inquiring about whether or not the frequency (threshold) is required to be changed is displayed on the display 25, and when a change is input on the screen, the threshold is changed to a greater value and thus the frequency is reduced. Consequently, the frequency of updating the musical score displayed on the display 25 is reduced, but a rate of decrease in a remaining amount of power of the battery 33 slows down, and thus a service can be continuously received.

The process in FIG. 46 is not limited to the application to Application Example 1 (operation example 8, FIG. 12). The processes in S301 to S304 may be inserted between S108 and S108A in the operation examples other than the operation example 8. The processes in S301 to S304 may be applied in a case where a transmission side of a reading request is the electronic musical instrument 10. In other words, the processes in S301 to S304 may be inserted between S008 and S008A in FIG. 5 or the like. The threshold may be changed not only in a case of increasing the threshold but also in a case of decreasing the threshold. For example, in a case where the frequency is recovered to exceed the threshold Th2, the threshold Th may be reduced by one step or more to increase the frequency. As described above, a configuration may be employed in which the terminal 20 changes the frequency of issuing a reading request of data on the basis of a remaining amount of power of the battery 33 of the terminal 20.

Second Example

A second example of the process of changing the frequency of reading requests will be described. In the first example, it has been described that the frequency (threshold Th) can be changed according to the real-time property of data. Whether or not the data has real-time property may be related to a screen of an application for operating or controlling the electronic musical instrument 10, displayed on the terminal 20.

For example, one of applications installed in the terminal 20 is an application that receives information indicating an operation instruction of a performer according to the rhythm and tempo of a musical piece to be performed from the electronic musical instrument 10 and displays the information on the display 25 of the terminal 20. The operation instruction displays, for example, a screen (musical score display screen) for displaying a musical score of the musical piece on the display 25, and displays a part of the displayed musical score corresponding to the current playing position in a special manner (for example, changing a color). In this case, since the information (operation instruction) indicating the part of which a color is changed in the musical score is required to have real-time property, a request for reading data to the electronic musical instrument 10 is made at a high frequency.

On the other hand, it may be possible to perform setting of a state parameter (configuration setting) of the electronic musical instrument 10 by using the application. In this case, the application displays a configuration screen on the display 25, reads information indicating the current state parameter from the electronic musical instrument 10, and displays the information on the configuration screen. The real-time property is not required for such information indicating a state parameter.

As described above, there are two states (modes) in one application of the terminal, and the two modes may be a musical score display screen (mode 1) that requires high frequency and a screen for transmitting and receiving setting information (configuration screen: mode 2) between the terminal 20 and the electronic musical instrument 10, which has no problem at a low frequency. That is, a reading speed (the frequency of a reading request) of data related to the display may differ depending on the screen displayed on the display 25. In the second example, an example of changing the frequency according to a screen operation of the user, that is, an example of changing the frequency of a reading request according to the screen will be described.

FIG. 47 illustrates an example of a table used for changing the frequency. The table is stored in the storage device 22 and referred to by the processor 21. In the application according to the second example, the frequency of reading request (threshold Th) is managed for each screen. That is, the table indicating a correspondence relationship between each of screens (for example, the musical score display screen and the configuration screen) and the threshold Th is stored in the storage device 22. In the example of the table illustrated in FIG. 47, screen identifiers (SC1, SC2, SC3, . . . ) and thresholds Th (Th001, Th002, Th003, . . . ) respectively corresponding to the screens are stored in association with each other. As the screen identifier, a number assigned to the screen, an address in which screen display data is stored, or the like is used. A value corresponding to the screen is set as the threshold Th. In the second example, the threshold Th (Th002) corresponding to the configuration screen (identifier: SC2) is set to a value smaller than the threshold Th (Th001) corresponding to the musical score display screen (identifier SC1).

FIG. 48 is a flowchart illustrating a process example according to the second example of frequency change, and illustrates the processes in S401 to S404 executed between S008 or S108 and S008A and S108A. It is assumed that the musical score display screen (SC1) is displayed on the display 25 at the start of S401. In S401, the processor 21 determines whether or not a screen switching instruction has been input through an operation or the like on the input device 23. In this case, in a case where it is determined that the screen switching instruction has been input, the process proceeds to S402, and in other cases, the process proceeds to S403.

In S402, the processor 21 performs a screen switching process. For example, the processor 21 acquires information (screen identifier) indicating a screen that is a switching destination obtained due to inputting of the screen switching instruction, and reads data of the corresponding screen and performs control of displaying the screen on the display 25. As an example, it is assumed that the musical score display screen that has been displayed so far is switched to the configuration screen.

In S403, the processor 21 refers to the correspondence table between the screen and the threshold Th (FIG. 47), acquires the threshold Th (Th002) corresponding to the screen identifier SC2 of the configuration screen, and performs comparison with the current threshold Th (Th001) to determine whether or not the threshold Th is required to be changed. In a case where it is determined that the threshold Th is required to be changed, the process proceeds to S404, and in other cases, the process proceeds to S008A (S108A).

In S404, the threshold Th (Th002) read from the correspondence table is set as a new threshold Th. Thereafter, the process proceeds to S008A (S108A). This reduces the frequency of a reading request while the configuration screen is displayed. In a case where a switching instruction from the configuration screen to the musical score display screen is input in S401, the threshold Th is changed to the value (Th001) corresponding to the musical score display screen (SC1) through the processes in S402 and S403 (return to the original value). This increases the frequency of a reading request.

According to the second example, the frequency (threshold Th) at which the terminal 20 issues a reading request is changed according to switching between the screens displayed by the terminal 20. Consequently, data can be read at a frequency according to a function provided to the user via the screen. By changing the frequency according to the screen switching, the frequency of reading data can be set according to a level of real-time property, and thus it is possible to avoid the issuance of unnecessary reading requests of data and reduce power consumption.

The second example relates to an example in which the frequency is changed when switching between two screens of which display is controlled in one application. However, the two screens may be those of which display is controlled by different applications (another application is started by generation of a trigger of screen switching, and the application displays a screen after switching). The process in S402 may be performed after S404, and the screen may be switched after the threshold Th is changed.

Third Example

FIG. 49 is a flowchart illustrating a third example of changing the frequency (threshold Th) of a reading request. The flowchart of FIG. 49 (S501 to S505) is inserted after, for example, S008 or S108.

In S501, the processor 21 determines whether or not there is an input to the terminal 20. In a case where it is determined that there is an input, the process proceeds to S505. On the other hand, in a case where it is determined that there is no input, the process proceeds to S502.

In S502, the processor 21 increments (adds 1) a count value of the counter for counting a non-input time. In S503, the processor 21 determines whether or not the count value is equal to or greater than a predetermined threshold Th3 (threshold of non-input time). In a case where it is determined that the count value is equal to or greater than the threshold Th3, the process proceeds to S504, and in a case where it is determined that the count value is not equal to or greater than the threshold Th3, the process returns to S501.

In a case where the process proceeds to S504, the processor 21 reduces a value of the threshold Th related to the frequency of a reading request to a predetermined value. No input may mean that the user is not using the application. In a case where the application is not used, it is not necessary to read data at a normal frequency, and thus the frequency is reduced to reduce power consumption due to the issuance of a reading request. The process in S504 is performed by rewriting the current value (set value) of the threshold Th with a value of the threshold Th at the time of decrease stored in a certain storage area. In this case, the processor 21 saves the original value in a predetermined storage area (save location).

When S504 is finished, the process proceeds to the next step. The next step is, for example, one of S008A, S108A, S301, and S401. The same applies to a case where the determination is No in S506, which will be described later, and a case where the process in S507 is finished.

In a case where the process proceeds to S505, the processor 21 resets the counter. In S506, the processor 21 determines whether or not the current value of the threshold Th is the value reduced in S504. This determination may be performed, for example, on the basis of whether or not there is the original value saved in the save location (or NULL if not). However, other methods may be used.

In a case where it is determined that the current value of the threshold Th is the value reduced in S504, the processor 21 returns the value of the threshold Th to the original value (S507). This process is performed, for example, by rewriting the current value of the threshold Th with the saved original value. In a case where the process in S507 is finished and in a case where it is determined that the current value of the threshold Th is not the reduced value (for example, in a case where the value of the save location is NULL) (No in S506), the process in S506 is finished. Then, the process proceeds to the next step.

As described above, in the third example, the frequency (threshold Th) at which the terminal 20 issues a reading request is changed according to a period of non-input to the terminal 20. That is, when the non-input time is equal to or more than the threshold Th3, the frequency is reduced to save power. On the other hand, when there is an input, the reduced threshold is returned (raised) to the original value to obtain a desired frequency of a reading request. The configurations illustrated in the embodiments may be combined as appropriate within the scope without departing from the objective.

What is claimed is:

1. An information processing method comprising: causing one of an electronic musical instrument and a terminal capable of bidirectional short-range wireless communication with the electronic musical instrument to perform an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible; and causing the other of the electronic musical instrument and the terminal to perform a process of transmitting corresponding data when the reading request corresponding to the operation pattern is received, and perform a process of writing the writing target data when the writing target data and the writing request for the writing target data corresponding to the operation pattern are received.

2. The information processing method according to claim 1, wherein the predetermined pattern is repeating the transmission of the reading request of data, or repeating the transmission of the writing target data and the writing request for the writing target data.

3. The information processing method according to claim 1, wherein the predetermined pattern is to alternately repeat the transmission of the reading request of data N times and the transmission of the writing target data and the writing request for the writing target data M times.

4. The information processing method according to claim 1, wherein the operation pattern includes performing one of the transmission of the reading request of data and the transmission of the writing target data and the writing request for the writing target data according to details of data obtained by transmitting the reading request of data.

5. The information processing method according to claim 1, wherein the operation pattern includes performing one of the transmission of the reading request of data and the transmission of the writing target data and the writing request for the writing target data in a case where a failure in communication using one of the transmission of the reading request of data and the transmission of the writing target data and the writing request for the writing target data is detected.

6. The information processing method according to claim 1, wherein the operation pattern includes transmitting the writing target data and the writing request for the writing target data in a case where there is transmission target data, and repeatedly transmitting the reading request of data in a case where there is no transmission target data.

7. The information processing method according to claim 1, wherein the operation pattern includes transmitting the reading request of data at a predetermined timing during repeated transmission of the writing target data and the writing request for the writing target data in a case where there is transmission target data, and repeatedly transmitting the reading request of data in a case where there is no transmission target data.

8. The information processing method according to claim 1, wherein the electronic musical instrument performs a predetermined process on the basis of control information received from the terminal.

9. The information processing method according to claim 8, wherein the terminal transmits control information for changing an appearance of the electronic musical instrument to the electronic musical instrument, and wherein the electronic musical instrument performs a process of changing the appearance of the electronic musical instrument according to the control information received from the terminal.

10. The information processing method according to claim 8, wherein the terminal transmits authentication information of the terminal to the electronic musical instrument, and wherein, in a case where the authentication information of the terminal is determined as being valid, the electronic musical instrument sets a predetermined function to be available while the electronic musical instrument and the terminal are in a state in which the short-range wireless communication is possible, and the electronic musical instrument sets the predetermined function to be unavailable in a case where the electronic musical instrument and the terminal are not in the state in which the short-range wireless communication is possible.

11. The information processing method according to claim 8, wherein the terminal transmits control information of the electronic musical instrument received via a network to the electronic musical instrument.

12. The information processing method according to claim 8, wherein the terminal transmits time information included in the terminal to the electronic musical instrument.

13. The information processing method according to claim 8, wherein an amount of change in a sensor value detected by a sensor of the terminal per unit time, or control information based on the amount of change is transmitted to the electronic musical instrument.

14. The information processing method according to claim 8, wherein position information detected by the terminal is transmitted to the electronic musical instrument, and wherein the electronic musical instrument performs a process of changing a state of the electronic musical instrument to a state corresponding to a destination according to the position information.

15. The information processing method according to claim 8, wherein the terminal transmits control information of the electronic musical instrument acquired through voice input to the electronic musical instrument.

16. The information processing method according to claim 1, wherein the terminal performs a process of providing a user interface serving as a performance operator of the electronic musical instrument to a user, and transmits performance information obtained by operating the user interface to the electronic musical instrument, and wherein the electronic musical instrument performs a predetermined process using the performance information received from the terminal.

17. The information processing method according to claim 1,
   wherein the electronic musical instrument performs a predetermined process by using an electromotive force generated by an electric wave of the writing request or the reading request as a power source.
18. The information processing method according to claim 1,
   wherein the terminal receives information indicating a state of the electronic musical instrument from the electronic musical instrument and displays the information on a display device.
19. The information processing method according to claim 1,
   wherein the terminal receives performance information from the electronic musical instrument and displays musical score information corresponding to the performance information on a display device.
20. The information processing method according to claim 1,
   wherein the terminal receives performance information from the electronic musical instrument and outputs a musical sound corresponding to the performance information.
21. The information processing method according to claim 1,
   wherein the terminal receives performance information from the electronic musical instrument and displays information for evaluating a performance specified by the performance information on a display device.
22. The information processing method according to claim 1,
   wherein the terminal receives information indicating firmware installed in the electronic musical instrument from the electronic musical instrument, and displays information indicating whether or not the firmware of the electronic musical instrument is required to be updated on the basis of information indicating latest firmware on a display device.
23. The information processing method according to claim 1,
   wherein the terminal receives information related to an operation of the electronic musical instrument from the electronic musical instrument, and displays information associated with the information related to the operation and for supporting the operation of the electronic musical instrument on a display device.
24. The information processing method according to claim 1,
   wherein the terminal receives information related to an operation of the electronic musical instrument from the electronic musical instrument, and performs an operation associated with the information related to the operation of the electronic musical instrument on a camera of the terminal.
25. The information processing method according to claim 1,
   wherein the terminal edits data received from the electronic musical instrument and transmits the edited data to the electronic musical instrument.
26. The information processing method according to claim 1,
   wherein the electronic musical instrument edits data received from the terminal and transmits the edited data to the terminal.
27. The information processing method according to claim 1,
   wherein the terminal changes a frequency of issuing the reading request on the basis of a remaining amount of power of a battery of the terminal.
28. The information processing method according to claim 1,
   wherein the terminal changes a frequency of issuing the reading request according to switching between screens displayed by the terminal.
29. The information processing method according to claim 1,
   wherein the terminal changes a frequency of issuing the reading request according to a period of non-input to the terminal.
30. The information processing method according to claim 1,
   wherein the electronic musical instrument transmits data to the terminal by using energy of an electric wave received from the terminal.
31. An electronic musical instrument comprising: a communication unit capable of performing bidirectional short-range wireless communication with a terminal; and a processing unit that, in a case where the terminal performs an operation according to an operation pattern including an operation of repeating, in a predetermined pattern, at least one of transmission of a reading request of data and transmission of writing target data and a writing request for the writing target data while the electronic musical instrument and the terminal are in a state in which the short-range wireless communication is possible, performs a process of transmitting corresponding data when the reading request corresponding to the operation pattern is received using the communication unit, and performs a process of writing the writing target data when the writing target data and the writing request for the writing target data corresponding to the operation pattern are received via the communication unit.

* * * * *